US007801329B2

(12) United States Patent
Miyamaki et al.

(10) Patent No.: US 7,801,329 B2
(45) Date of Patent: Sep. 21, 2010

(54) INFORMATION PROCESSING SYSTEM, INFORMATION PROCESSING APPARATUS AND INFORMATION PROCESSING METHOD, PROGRAM, AND RECORDING MEDIUM

(75) Inventors: Hideo Miyamaki, Tokyo (JP); Masaharu Suzuki, Kanagawa (JP); Asako Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1254 days.

(21) Appl. No.: 11/354,830

(22) Filed: Feb. 16, 2006

(65) Prior Publication Data

US 2006/0221185 A1 Oct. 5, 2006

(30) Foreign Application Priority Data

Feb. 28, 2005 (JP) ............................. 2005-054394

(51) Int. Cl.
*G06K 9/00* (2006.01)
*H04N 7/18* (2006.01)
*H04N 5/225* (2006.01)

(52) U.S. Cl. ........................ 382/103; 348/159; 348/169

(58) Field of Classification Search ................. 382/103, 382/107, 149, 236, 287; 348/47–50, 73, 348/94, 143, 137, 152, 154, 169–172, 208.1, 348/208.2, 208.14, 208.16, 211.1, 211.14, 348/267, 347, 352, 353, 558, 155, 161; 712/231, 712/300
See application file for complete search history.

(56) References Cited

U.S. PATENT DOCUMENTS 6,125,145 A * 9/2000 Koyanagi et al. ...... 375/240.16
6,377,309 B1 * 4/2002 Ito et al. ..................... 348/554
6,753,902 B1 * 6/2004 Kashiwazaki ............... 348/119
7,433,494 B2 * 10/2008 Niwa .......................... 382/103
2002/0063711 A1 5/2002 Park et al.
2004/0008773 A1 1/2004 Itokawa
2004/0189801 A1 9/2004 Chang

FOREIGN PATENT DOCUMENTS

EP 0 967 584 A2 12/1999
JP 2000-224542 8/2000
JP 2001-333422 11/2001
JP 2004-23373 1/2004
JP 2004-201231 7/2004
WO WO 02/093916 A2 11/2002

* cited by examiner

*Primary Examiner*—Abolfazl Tabatabai
(74) *Attorney, Agent, or Firm*—Oblon, Spivak, McClelland, Maier & Neustadt, L.L.P.

(57) ABSTRACT

An information processing system, apparatus and method is disclosed wherein an image of a predetermined region and an image of moving bodies in the region can be picked up and any of images obtained by such image pickup which is desired by a user can be reproduced readily. Sensor images of the predetermined region are stored, and an image of the moving bodies in the region is picked up separately and stored together with reproduction information relating to reproduction of the sensor image from which the moving bodies are detected. When an instruction to reproduce the sensor image is issued, the reproduction information corresponding to the moving body is read out, and the sensor image is reproduced based on the read out reproduction information. The invention can be applied, for example, to a monitoring system.

6 Claims, 36 Drawing Sheets

FIG. 9

| DATE AND TIME OF APPEARANCE | MOVING BODY ID | APPEARANCE POSITION |
|---|---|---|
| 2004/1/10 10:00 | 1 | (1,2) (1,5) (2,5) (2,2) |
| 2004/1/10 10:05 | 2 | (3,5) (3,9) (5,9) (5,5) |

FIG. 10

| DATE AND TIME OF APPEARANCE | DATE AND TIME OF DISAPPEARANCE | APPEARANCE POSITION | MOVING BODY ID | REPRODUCTION STARTING POSITION | CAMERA ID |
|---|---|---|---|---|---|
| 2004/1/10 10:00 | 2004/1/10 11:00 | (1,2) (1,5) (2,5) (2,2) | 1 | FRAME #1 | 1 |
| 2004/1/10 10:05 | 2004/1/10 10:30 | (3,5) (3,9) (5,9) (5,5) | 2 | FRAME #2 | 1 |

| MOVING BODY ID | ZOOM STILL IMAGE |
|---|---|
| 1 | ZOOM STILL IMAGE #1, ZOOM STILL IMAGE #2 |
| 2 | ZOOM STILL IMAGE #10 |

| TIME ZONE | ZOOM FLAG | SENSOR FLAG |
|---|---|---|
| 2004/1/10 10:00 | 1 | 1 |
| 2004/1/10 11:00 | 0 | 0 |

INFORMATION PROCESSING SYSTEM, INFORMATION PROCESSING APPARATUS AND INFORMATION PROCESSING METHOD, PROGRAM, AND RECORDING MEDIUM

CROSS REFERENCES TO RELATED APPLICATIONS

The present invention contains subject matter related to Japanese Patent Application JP 2005-054394 filed with the Japanese Patent Office on Feb. 28, 2005, the entire contents of which being incorporated herein by reference.

BACKGROUND OF THE INVENTION

This invention relates to an information processing system, an information processing apparatus and an information processing method, a program, and a recording medium, and more particularly to an information processing system, an information processing apparatus and an information processing method, a program and a recording medium wherein an image of a predetermined region and an image of moving bodies in the region can be picked up and any of images obtained by such image pickup can be reproduced.

In recent years, in order to assure the security, a multi-point camera monitoring system (multi camera system) is frequently installed, for example, in a bank, a parking area, a house and so forth in which an automatic teller machine (ATM) is placed.

Such a multi camera system as described above includes a plurality of video cameras and a recording apparatus for recording images acquired by the video cameras. An apparatus for use with such a multi camera system as described above has been proposed wherein a plurality of images are reduced in scale and combined into a one-frame image as disclosed for example, in Japanese Patent Laid-Open No. Hei 10-108163 (hereinafter referred to as Patent Document 1). Also a device has been proposed wherein images from a plurality of video cameras are collected and recorded on a recording medium such as a video tape as disclosed, for example, in Japanese Patent Laid-Open No. 2000-243062 (hereinafter referred to as Patent Document 2).

FIG. 1 shows an appearance of an example of a conventional multi camera system.

Referring to FIG. 1, the multi camera system 1 shown includes four cameras 11-1 to 11-4. The cameras 11-1 to 11-4 are stationary cameras whose photographing direction is fixed or pan tilt zoom cameras whose photographing direction is variable. The cameras 11-1 to 11-4 monitor a region 21 of a circular wide area of a diameter of 40 m, for example, in a parking area.

FIG. 2 shows an example of a configuration of the multi camera system shown in FIG. 1.

Referring to FIG. 2, each of the cameras 11-1 to 11-4 picks up an image. The cameras 11-1 to 11-4 are individually connected to a recording apparatus 41 and supply analog signals of images obtained by image pickup to the recording apparatus 41. The recording apparatus 41 records image data which are digital signals of images obtained by A/D conversion of the analog signals of the images supplied from the cameras 11-1 to 11-4. Further, the recording apparatus 41 is connected to a display apparatus 42 and causes the display apparatus 42 to display an image corresponding to the image data.

However, in the multi camera system 1 in FIG. 2, the cameras which can be connected to the recording apparatus 41 are limited to only four cameras 11-1 to 11-4, and therefore, the extensibility of the multi camera system 1 is poor.

FIG. 3 shows another example of the configuration of the multi camera system 1 in FIG. 1.

Referring to FIG. 3, the cameras 11-1 to 11-4 are connected to a personal computer (PC) 52 through a network 51. Each of the cameras 11-1 to 11-4 picks up an image and transmit image data obtained by the image pickup to the PC 52 through the network 51 in accordance with the IP (Internet Protocol). The PC 52 records the image data and displays an image corresponding to the image data.

Now, the image data to be recorded in the recording apparatus 41 shown in FIG. 2 or the PC 52 shown in FIG. 3 is described with reference to FIG. 4.

As seen in FIG. 4, the recording apparatus 41 or the PC 52 records all of the image data obtained by the cameras 11-1 to 11-4. Accordingly, where the multi camera system 1 is used for monitoring, even if the image data are compressed in accordance with a predetermined compression method, the amount of the image data to be recorded in the recording apparatus 41 or the PC 52 is very great.

For example, where image data compressed under predetermined conditions (50 KB/frame, 10 frame/sec) in accordance with the JPEG (Joint Photographic Experts Group) system are recorded for 24 hours, in the multi camera system 1 formed from four cameras 11-1 to 11-4, the amount of image data to be recorded in the recording apparatus 41 or the PC 52 is approximately 164 GB. Further, where the multi camera system 1 is formed from eight cameras, the amount of image data is approximately 328 GB, and where the multi camera system 1 is formed from sixteen cameras, the amount of image data is approximately 656 GB.

In this manner, in the multi camera system 1, the four cameras 11-1 to 11-4 are required in order to monitor the region 21. Therefore, installation of the cameras is cumbersome, and the cost of the multi camera system 1 is high. Further, where high definition images are acquired, image pickup must be performed under a condition of a high image pickup magnification. Therefore, a greater number of cameras are required. Further, where the number of the cameras is not increased while it is intended to acquire high definition images, it is difficult to acquire high definition images regarding the entire region 21. Therefore, it is necessary for the operator to usually monitor normal images and designate a desired region to acquire a high definition image of the region.

Thus, a monitoring camera is available which can monitor a situation over a wide range by means of a single camera by successively picking up an image of an object while the photographing direction is successively shifted to obtain a panorama image of the entire object formed from a plurality of unit images.

SUMMARY OF THE INVENTION

However, with such a monitoring system as described above, in order to produce an image of an entire subject, it is necessary to acquire all unit images which form the image of the entire subject, and much time is required to produce an image of the entire subject. Accordingly, it is difficult to completely capture any small variation in situation which occurs within a short period of time within a range of image pickup.

In particular, a moving body (moving subject) which moves at a high speed sometimes moves out of the range of image pickup in a period of time after an image of the entire image pickup range is acquired until a next image of the entire image pickup range is acquired.

In the present invention, it is desirable to provide an information processing system, an information processing apparatus and an information processing method, a program, and a recording medium wherein an image of a predetermined region and an image of moving bodies in the region can be picked up and any of images obtained by such image pickup which is desired by a user can be reproduced readily.

In order to attain the desire described above, according to an embodiment of the present invention, there is provided an information processing system, including a region image pickup section for picking up an image of a predetermined region, a detection section for detecting moving bodies existing in the predetermined region based on a region image obtained by the image pickup by the region image pickup section, a moving body image pickup section for picking up an image of the moving bodies detected by the detection section, a region image storage section for storing a region image obtained by the region image pickup section, an information storage section for storing, based on a result of the detection by the detection section, moving body information representative of the moving bodies and reproduction information relating to reproduction of the region image from which the moving bodies are detected in a coordinated relationship with each other, a moving body image storage section for storing moving body images obtained as a result of the image pickup of the moving bodies by the moving body image pickup section in a coordinated relationship with moving body information representative of the moving bodies, and a reproduction section for reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

According to another embodiment of the present invention, there is provided an information processing apparatus for controlling image pickup of a subject, including a region image pickup control section for controlling a region image pickup section, which picks up an image of a predetermined region, to pick up an image of the predetermined region, a detection section for detecting moving bodies existing in the predetermined region based on a region image obtained by the image pickup by the region image pickup section, a moving body image pickup control section for controlling a moving body image pickup section, which picks up an image of the moving bodies detected by the detection section, to pick up an image of the moving bodies, a region image storage section for storing a region image obtained by the region image pickup section, an information storage section for storing, based on a result of the detection by the detection section, moving body information representative of the moving bodies and reproduction information relating to reproduction of the region image from which the moving bodies are detected in a coordinated relationship with each other, a moving body image storage section for storing moving body images obtained as a result of the image pickup of the moving bodies by the moving body image pickup section in a coordinated relationship with moving body information representative of the moving bodies, and a reproduction section for reading out, when one of the moving body images which corresponds to a region image of an object of reproduction is designated, the moving body information corresponding to the designated moving body image from the moving body image storage section, reading out the reproduction information corresponding to the readout moving body information from the information storage section and reproducing the region image stored in the region image storage section based on the read out reproduction information.

The information processing apparatus may further include a display control section for controlling a display section, which is provided for displaying a predetermined image, to display the moving body images, and a designation section for designating one of the moving bodies displayed on the display section as a moving body image corresponding to the region image of the object of reproduction, the reproduction section reproducing, when the moving body image corresponding to the region image of the object of reproduction is designated by the designation section, the region image.

According to a further embodiment of the present invention, there is provided an information processing method for an information processing apparatus, which includes a region image storage section and a moving body image storage section for storing images and an information storage section for storing information, for controlling image pickup of a subject, including a region image pickup control step of controlling a region image pickup section, which picks up an image of a predetermined region, to pick up an image of the predetermined region, a detection step of detecting moving bodies existing in the predetermined region based on a region image obtained by the image pickup by the region image pickup section, a moving body image pickup control step of controlling a moving body image pickup section, which picks up an image of the moving bodies detected by the process at the detection step, to pick up an image of the moving bodies, a region image storage control step of causing a region image obtained by the region image pickup section to be stored into the region image storage section, an information storage control step of causing, based on a result of the detection by the process at the detection step, moving body information representative of the moving bodies and reproduction information relating to reproduction of the region image from which the moving bodies are detected to be stored in a coordinated relationship with each other into the information storage section, a moving body image storage control step of causing moving body images obtained as a result of the image pickup of the moving bodies by the moving body image pickup section to be stored in a coordinated relationship with moving body information representative of the moving bodies into the moving body image storage section, and a reproduction step of reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

According to a still further embodiment of the present invention, there is provided a program for being executed by a computer which controls an information processing apparatus which includes a region image storage section and a moving body image storage section for storing images and an information storage section for storing information, for controlling image pickup of a subject, including a region image pickup control step of controlling a region image pickup section, which picks up an image of a predetermined region, to pick up an image of the predetermined region, a detection step of detecting moving bodies existing in the predetermined region based on a region image obtained by the image pickup by the region image pickup section, a moving body image pickup control step of controlling a moving body image pickup section, which picks up an image of the moving bodies detected by the process at the detection step, to pick up an image of the moving bodies, a region image storage control step of causing a region image obtained by the region image pickup section to be stored into the region image storage section, an information storage control step of causing, based on a result of the detection by the process at the detection step, moving body information representative of the moving bodies and reproduction information relating to reproduction of the region image from which the moving bodies are detected to be stored in a coordinated relationship with each other into the information storage section, a moving body image storage control step of causing moving body images obtained as a result of the image pickup of the moving bodies by the moving body image pickup section to be stored in a coordinated relationship with moving body information representative of the moving bodies into the moving body image storage section, and a reproduction step of reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

According to a yet further embodiment of the present invention, there is provided a recording medium on or in which a program for being executed by a computer which controls an information processing apparatus which includes a region image storage section and a moving body image storage section for storing images and an information storage section for storing information, for controlling image pickup of a subject is recorded, the program including a region image pickup control step of controlling a region image pickup section, which picks up an image of a predetermined region, to pick up an image of the predetermined region, a detection step of detecting moving bodies existing in the predetermined region based on a region image obtained by the image pickup by the region image pickup section, a moving body image pickup control step of controlling a moving body image pickup section, which picks up an image of the moving bodies detected by the process at the detection step, to pick up an image of the moving bodies, a region image storage control step of causing a region image obtained by the region image pickup section to be stored into the region image storage section, an information storage control step of causing, based on a result of the detection by the process at the detection step, moving body information representative of the moving bodies and reproduction information relating to reproduction of the region image from which the moving bodies are detected to be stored in a coordinated relationship with each other into the information storage section, a moving body image storage control step of causing moving body images obtained as a result of the image pickup of the moving bodies by the moving body image pickup section to be stored in a coordinated relationship with moving body information representative of the moving bodies into the moving body image storage section, and a reproduction step of reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

In the information processing system, apparatus and method and the program as well as the program recorded on or in the recording medium, an image of a predetermined region is picked up, and moving bodies existing in the predetermined region are detected based on a region image obtained by the image pickup. Then, an image of the detected moving bodies is picked up. Further, the region image is stored into the region image storage section, and based on a result of the detection, moving body information representative of the moving bodies and reproduction information relating to reproduction of the region image from which the moving bodies are detected are stored in a coordinated relationship with each other into the information storage section. Further, a moving body image obtained as a result of the image pickup of any of the moving bodies is stored in a coordinated relationship with the moving body information representative of the moving body into the moving body image storage section. Then, if a moving body image corresponding to a region image of an object of reproduction is designated, then the moving body information corresponding to the moving body information is read out from the moving body image storage section, and the reproduction information corresponding to the moving body information is read out from the information storage section. Then, the region image stored in the region image storage section is reproduced based on the read out reproduction information.

With the information processing system, apparatus and method and the program as well as the recording medium, an image of a predetermined region and an image of moving bodies in the region can be picked up and any of images obtained by such image pickup which is desired by a user can be reproduced readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a view illustrating an example of tracking object information registered in a tracking object information management database shown in FIG. 8;

FIG. 10 is a view illustrating an example of moving body information registered in a moving body information database shown in FIG. 8;

DETAILED DESCRIPTION OF THE PREFERRED EMBODIMENTS

Figure 1:
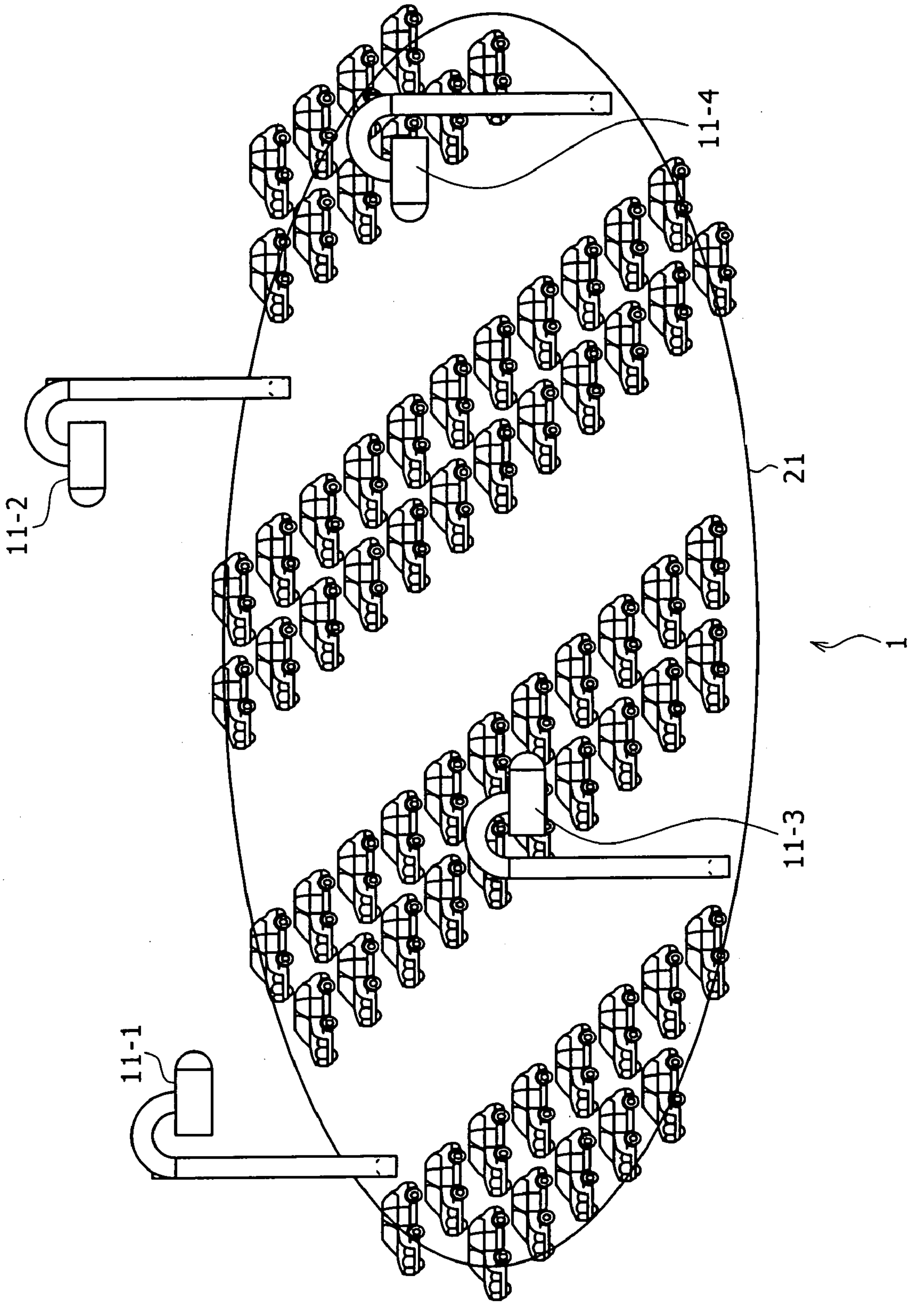
FIG. 1 is a schematic view showing an appearance of an example of a conventional multi camera system.
Figure 2:
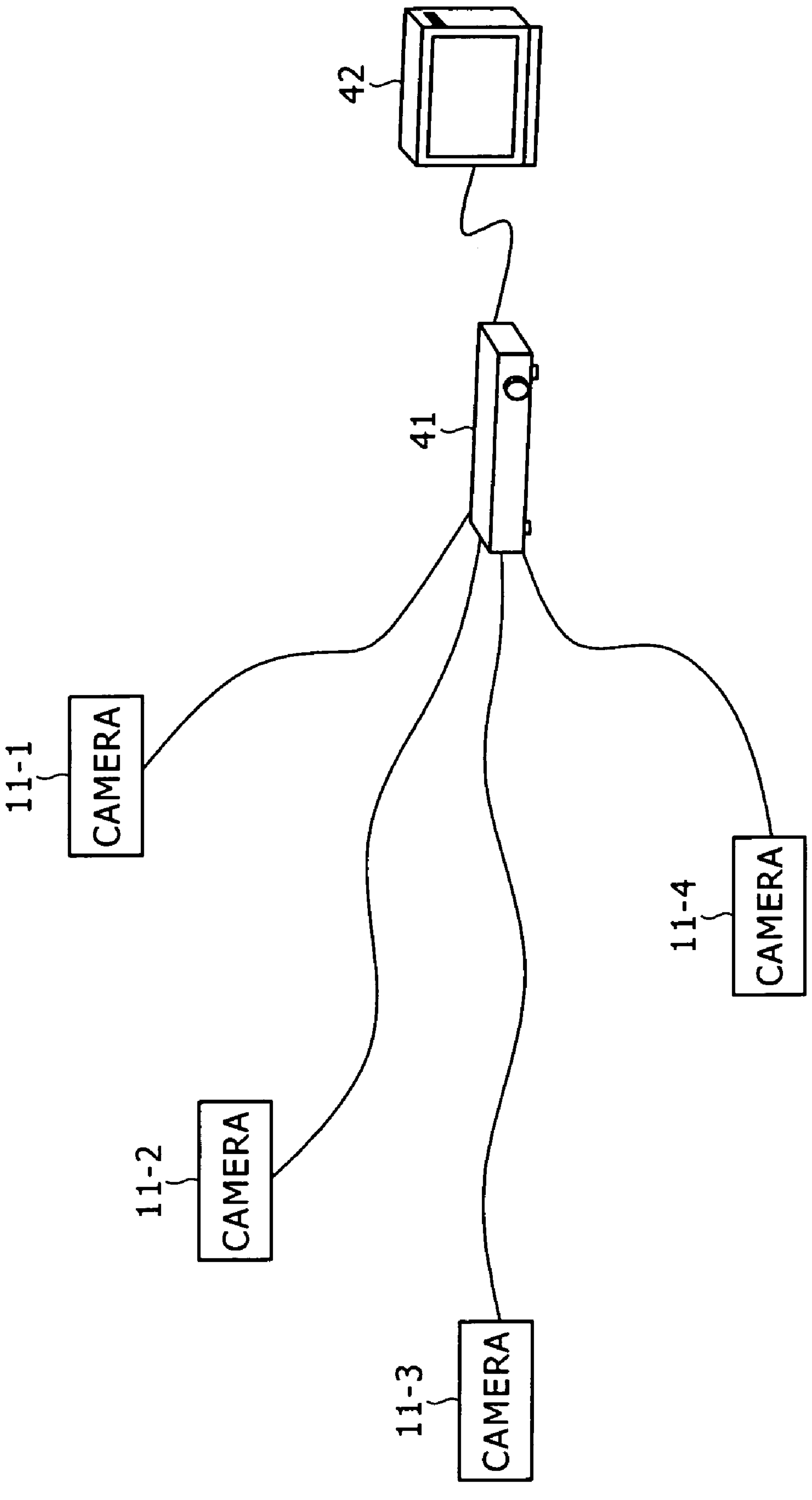
FIG. 2 is a schematic view showing an example of a configuration of the multi camera system of FIG. 1.
Figure 3:
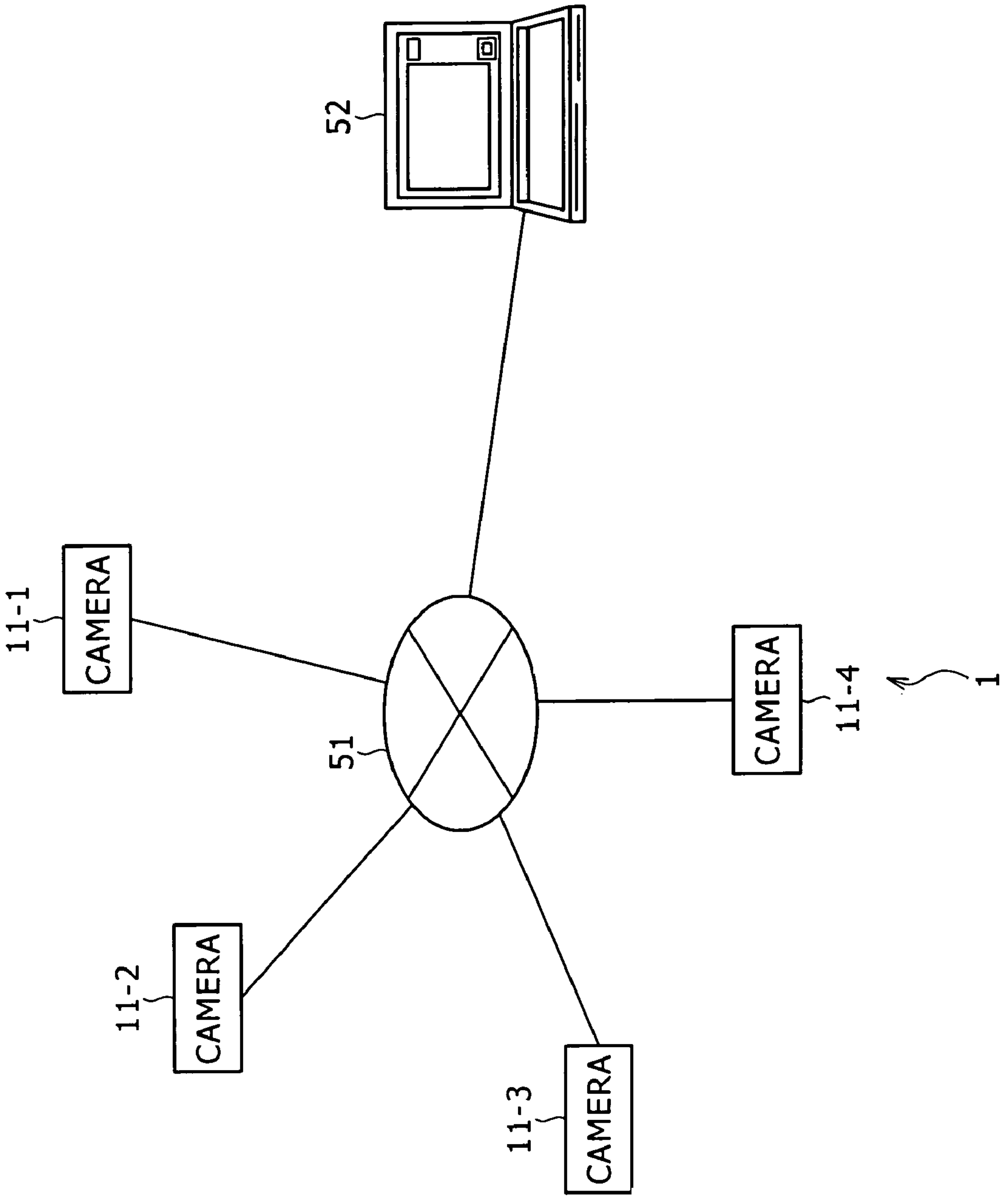
FIG. 3 is a similar view but showing another example of the configuration of the multi camera system of FIG. 1.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

An information processing system according to claim 1 is an information processing system (for example, a monitoring system 101 of FIG. 6) which includes a region image pickup section (for example, a sensor camera 121 of FIG. 6) for picking up an image of a predetermined region, a detection section (for example, a moving body detection module 222 of FIG. 8) for detecting moving bodies existing in the predetermined region based on a region image (for example, a sensor image) obtained by the image pickup by the region image pickup section, a moving body image pickup section (for example, a zoom camera 122 of FIG. 6) for picking up an image of the moving bodies detected by the detection section, a region image storage section (for example, a display information DB 226 of FIG. 8) for storing the region image obtained by the region image pickup section, an information storage section (for example, a moving body information DB 227 of FIG. 8) for storing, based on a result of the detection by the detection section, moving body information (for example, a moving body ID) representative of the moving bodies and reproduction information (for example, a reproduction starting position) relating to reproduction of the region image from which the moving bodies are detected in a coordinated relationship with each other, a moving body image storage section (for example, a moving body log information DB 228 of FIG. 8) for storing moving body images (for example, a zoom image 152) obtained as a result of the image pickup of the moving bodies by the moving body image pickup section in a coordinated relationship with moving body information representative of the moving bodies, and a reproduction section (for example, a reproduction module 231 of FIG. 8) for reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

Figure 8:
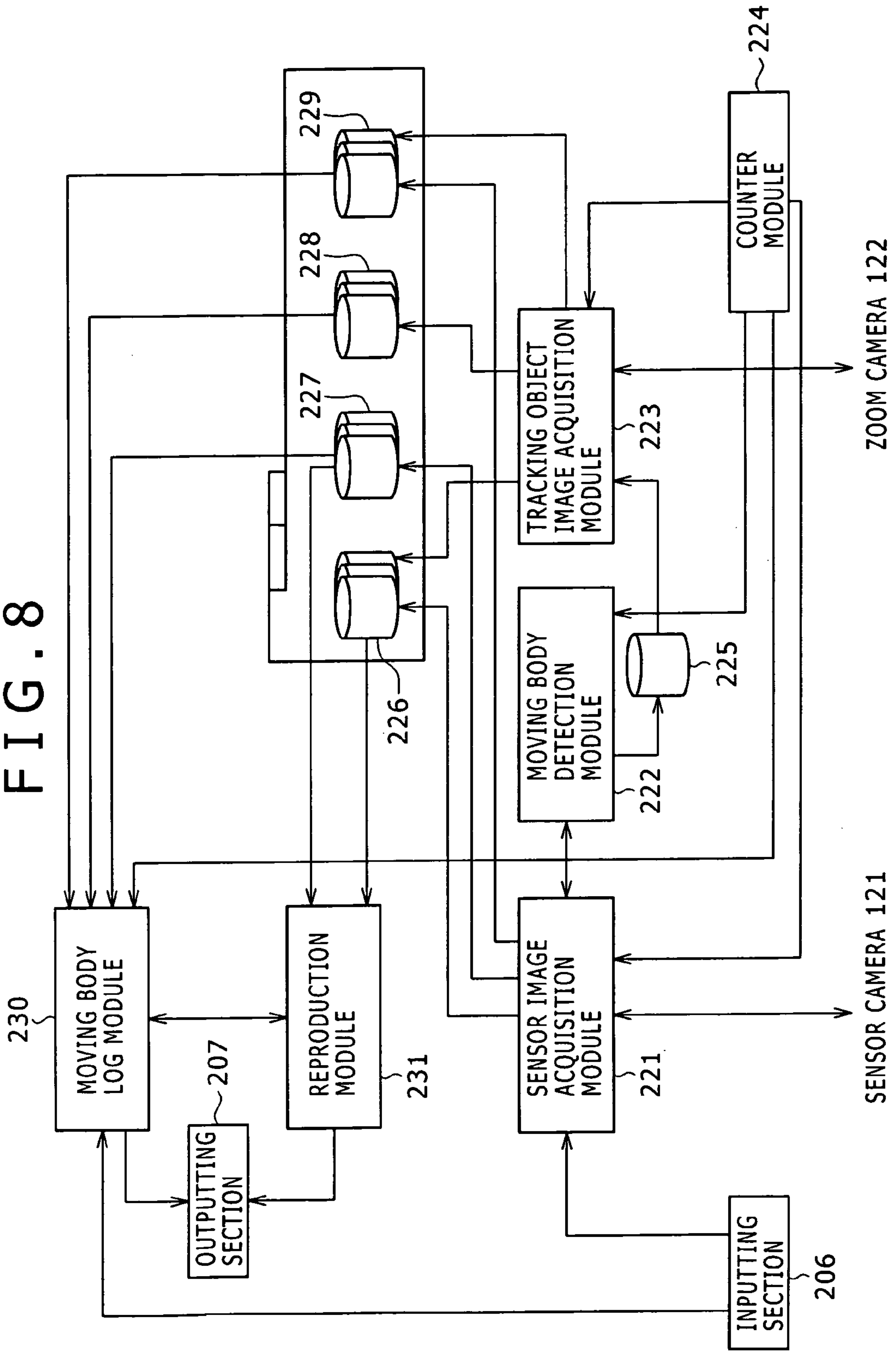
FIG. 8 is a block diagram showing an example of a functional configuration of the client shown in FIG. 6.

An information processing apparatus according to claim 2 is an information processing apparatus (for example, a client 132 of FIG. 6) for controlling image pickup of a subject, which includes a region image pickup control section (for example, a sensor image acquisition module 221 of FIG. 8) for controlling a region image pickup section (for example, a sensor camera 121 of FIG. 6), which picks up an image of a predetermined region, to pick up an image of the predetermined region, a detection section (for example, a moving body detection module 222 of FIG. 8) for detecting moving bodies existing in the predetermined region based on a region image (for example, a sensor image) obtained by the image pickup by the region image pickup section, a moving body image pickup control section (for example, a tracking object image acquisition module 223 of FIG. 8) for controlling a moving body image pickup section (for example, a zoom camera 122 of FIG. 6), which picks up an image of the moving bodies detected by the detection section, to pick up an image of the moving bodies, a region image storage section (for example, a display information DB 226 of FIG. 8) for storing the region image obtained by the region image pickup section, an information storage section (for example, a moving body information DB 227 of FIG. 8) for storing, based on a result of the detection by the detection section, moving body information (for example, a moving body ID) representative of the moving bodies and reproduction information (for example, a reproduction starting position) relating to reproduction of the region image from which the moving bodies are detected in a coordinated relationship with each other, a moving body image storage section (for example, a moving body log information DB 228 of FIG. 8) for storing moving body images (for example, a zoom image 152) obtained as a result of the image pickup of the moving bodies by the moving body image pickup section in a coordinated relationship with moving body information representative of the moving bodies, and a reproduction section (for example, a reproduction module 231 of FIG. 8 which executes a process at step S212 of FIG. 31) for reading out, when one of the moving body images which corresponds to a region image of an object of reproduction is designated, the moving body information corresponding to the designated moving body image from the moving body image storage section, reading out the reproduction information corresponding to the readout moving body information from the information storage section and reproducing the region image stored in the region image storage section based on the read out reproduction information.

Figure 30:
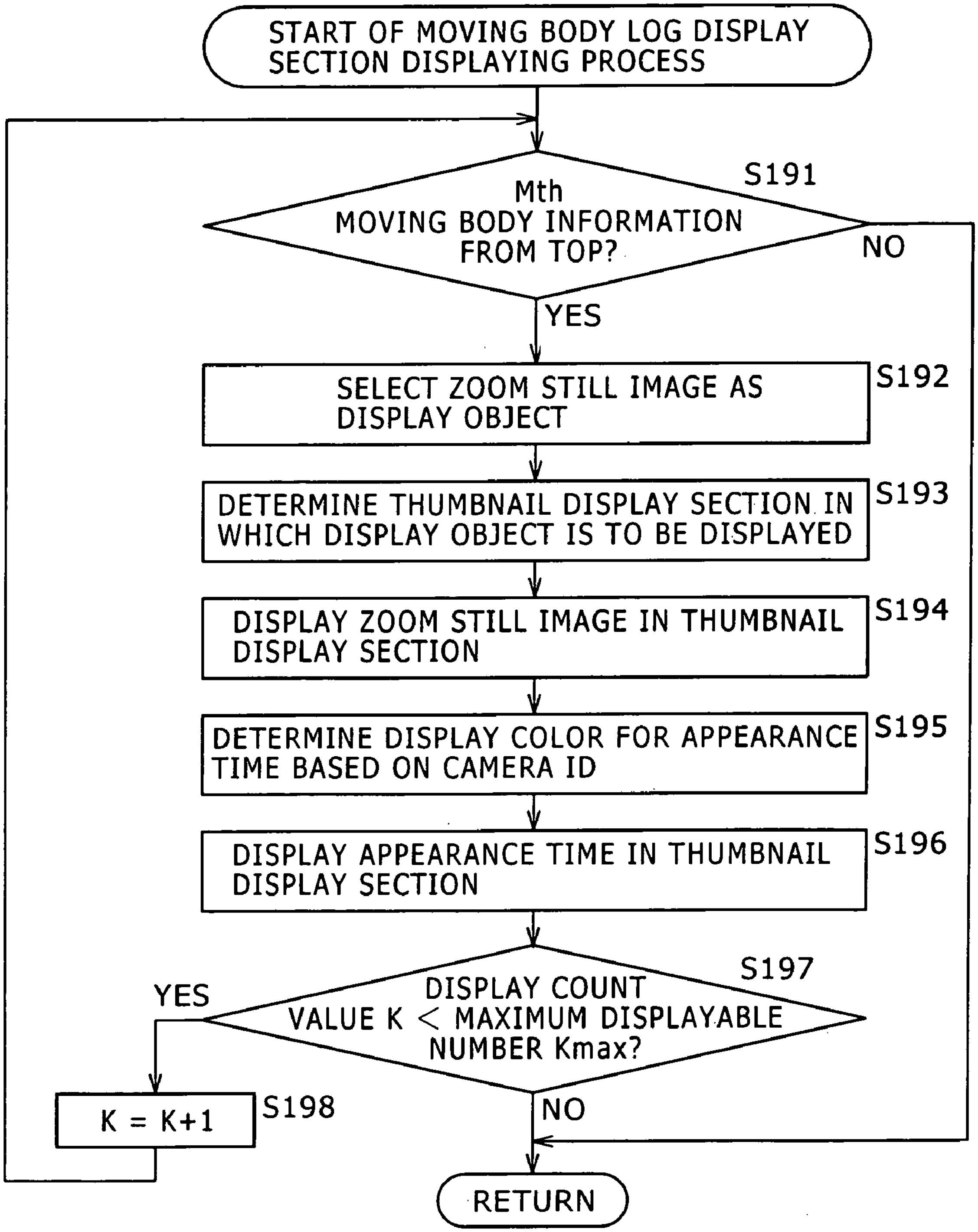
FIG. 30 is a flow chart illustrating a moving body log display section displaying process at step S126 of FIG. 26.
Figure 31:
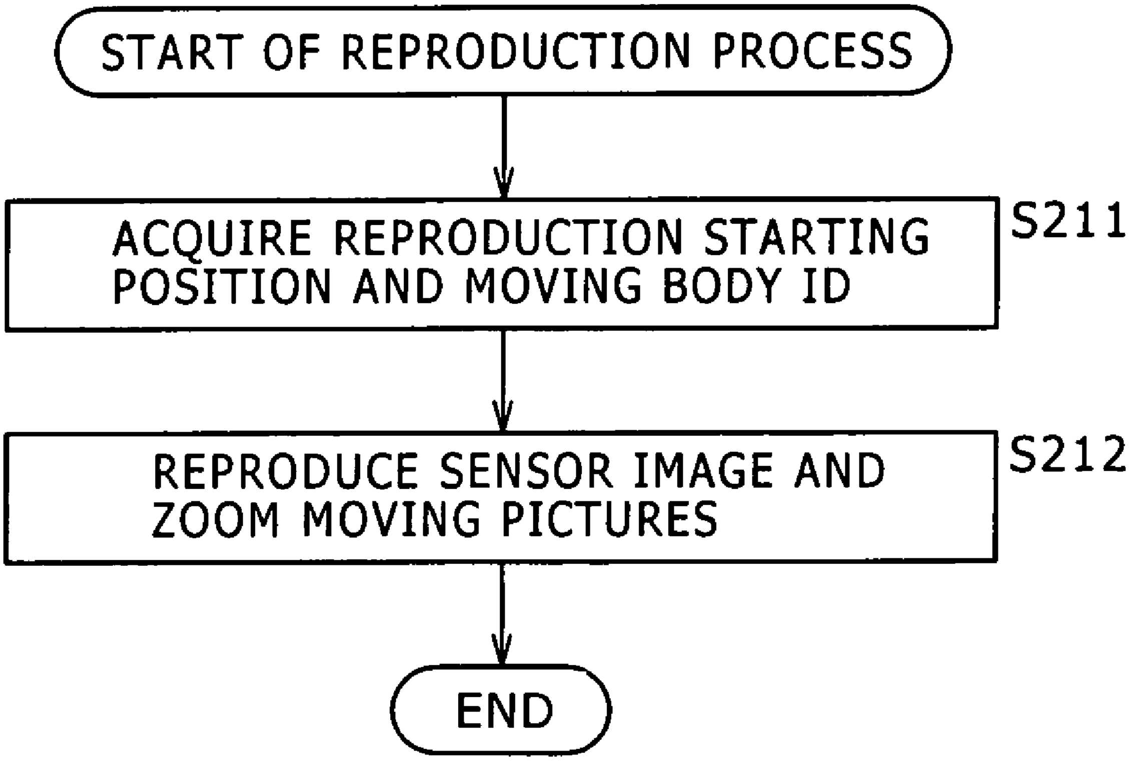
FIG. 31 is a flow chart illustrating a reproduction process of a sensor image and a zoom image by a reproduction module shown in FIG. 8.

The information processing apparatus may further comprise a display control section (for example, a reproduction module 231 of FIG. 8 which executes a process at step S194 of FIG. 30) for controlling a display section (for example, an outputting section 207 of FIG. 8), which is provided for displaying a predetermined image, to display the moving body images (for example, a zoom image), and a designation section (for example, an inputting section 206 of FIG. 8) for designating one of the moving bodies displayed on the display section as a moving body image corresponding to the region image of the object of reproduction, the reproduction section reproducing, when the moving body image corresponding to the region image of the object of reproduction is designated by the designation section, the region image (for example, a process at step S212 of FIG. 31).

An information processing method according to claim 4 is an information processing method for an information processing apparatus (for example, a client 132 of FIG. 6), which includes a region image storage section (for example, a display information DB 226 of FIG. 8) and a moving body image storage section (for example, a moving body log information DB 228 of FIG. 8) for storing images and an information storage section (for example, a moving body information DB 227 of FIG. 8) for storing information, for controlling image pickup of a subject, comprising a region image pickup control step (for example, a step S1 of FIG. 20) of controlling a region image pickup section (for example, a sensor camera 121 of FIG. 6), which picks up an image of a predetermined region, to pick up an image of the predetermined region, a detection step (for example, a step S61 of FIG. 23) of detecting moving bodies existing in the predetermined region based on a region image obtained by the image pickup by the region image pickup section, a moving body image pickup control step (for example, a step S85 of FIG. 24) of controlling a moving body image pickup section (for example, a zoom camera 122 of FIG. 6), which picks up an image of the moving bodies detected by the process at the detection step, to pick up an image of the moving bodies, a region image storage control step (for example, a step S27 of FIG. 21) of causing the region image obtained by the region image pickup section to be stored into the region image storage section, an information storage control step (for example, a step S43 of FIG. 22) of causing, based on a result of the detection by the process at the detection step, moving body information (for example, a moving body ID) representative of the moving bodies and reproduction information relating to reproduction of the region image from which the moving bodies are detected to be stored in a coordinated relationship with each other into the information storage section, a moving body image storage control step (for example, a step S104 of FIG. 25) of causing moving body images (for example, a zoom image 152) obtained as a result of the image pickup of the moving bodies by the moving body image pickup section to be stored in a coordinated relationship with moving body information representative of the moving bodies into the moving body image storage section, and a reproduction step (for example, a step S212 of FIG. 31) of reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

A program according to claim 5 and a program recorded on or in a recording medium according to claim 6 are a program for being executed by a computer which controls an information processing apparatus (for example, a client 132 of FIG. 6) which includes a region image storage section (for example, a display information DB 226 of FIG. 8) and a moving body image storage section (for example, a moving body log information DB 228 of FIG. 8) for storing images and an information storage section (for example, a moving body information DB 227 of FIG. 8) for storing information, for controlling image pickup of a subject, comprising a region image pickup control step (for example, a step S1 of FIG. 20) of controlling a region image pickup section (for example, a sensor camera 121 of FIG. 6), which picks up an image of a predetermined region, to pick up an image of the predetermined region, a detection step (for example, a step S61 of FIG. 23) of detecting moving bodies existing in the predetermined region based on a region image obtained by the image pickup by the region image pickup section, a moving body image pickup control step (for example, a step S85 of FIG. 24) of controlling a moving body image pickup section (for example, a zoom camera 122 of FIG. 6), which picks up an image of the moving bodies detected by the process at the detection step, to pick up an image of the moving bodies, a region image storage control step (for example, a step S27 of FIG. 21) of causing the region image obtained by the region image pickup section to be stored into the region image storage section, an information storage control step of causing, based on a result of the detection by the process at the detection step, moving body information (for example, a moving body ID) representative of the moving bodies and reproduction information relating to reproduction of the region image from which the moving bodies are detected to be stored in a coordinated relationship with each other into the information storage section, a moving body image storage control step (for example, a step S104 of FIG. 25) of causing moving body images (for example, a zoom image 152) obtained as a result of the image pickup of the moving bodies by the moving body image pickup section to be stored in a coordinated relationship with moving body information representative of the moving bodies into the moving body image storage section, and a reproduction step (for example, a step S212 of FIG. 31) of reading out, when one of the moving body images which corresponds to a region image of an object of reproduction is designated, the moving body information corresponding to the designated moving body image from the moving body image storage section, reading out the reproduction information corresponding to the read out moving body information from the information storage section and reproducing the region image stored in the region image storage section based on the read out reproduction information.

In the following, a particular embodiment of the present invention is described in detailed with reference to the accompanying drawings.

Figure 5:
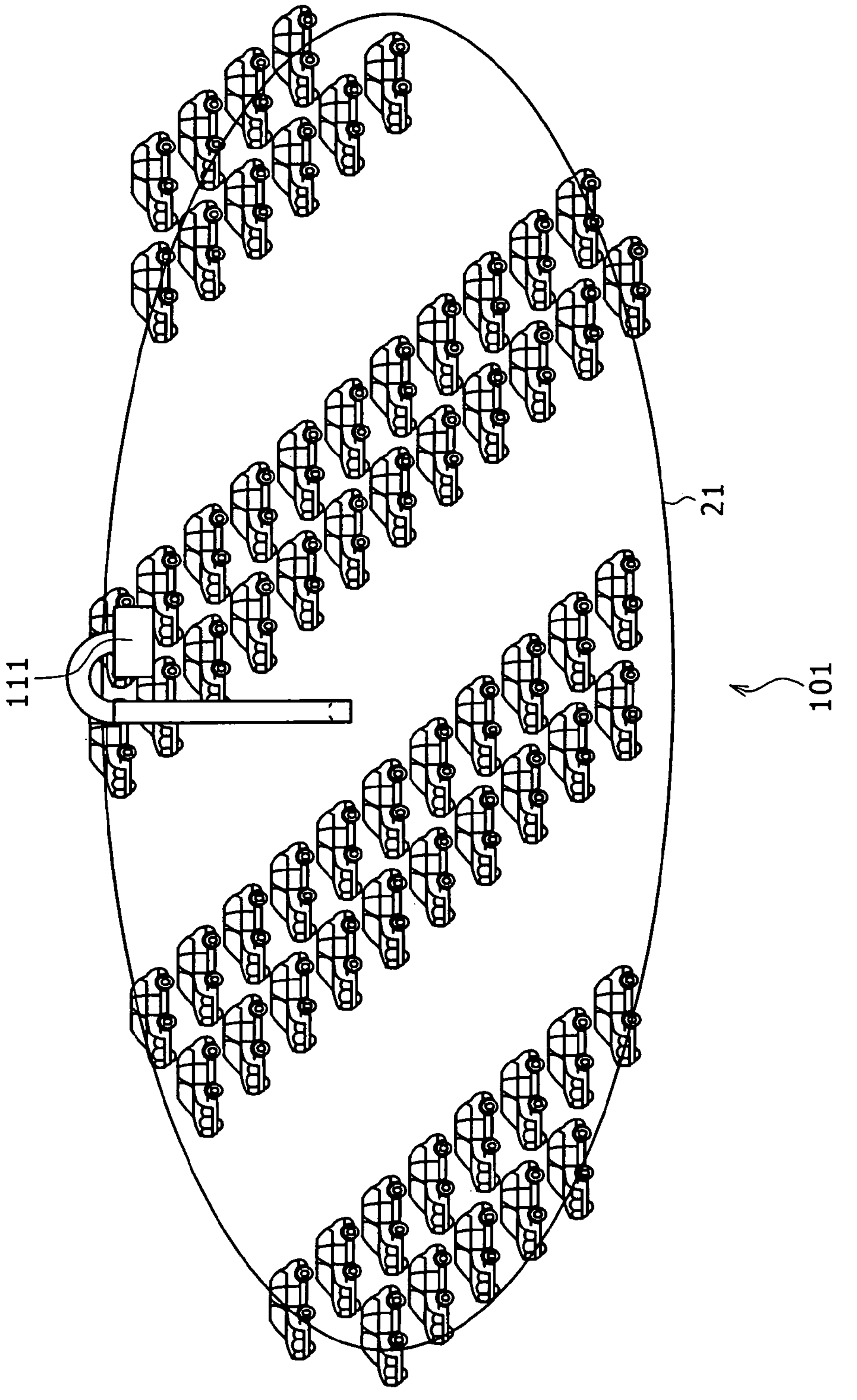
FIG. 5 is a view showing an example of an appearance of a monitoring system to which the present invention is applied.

FIG. 5 shows an example of an appearance of a monitoring system to which the present invention is applied.

Figure 6:
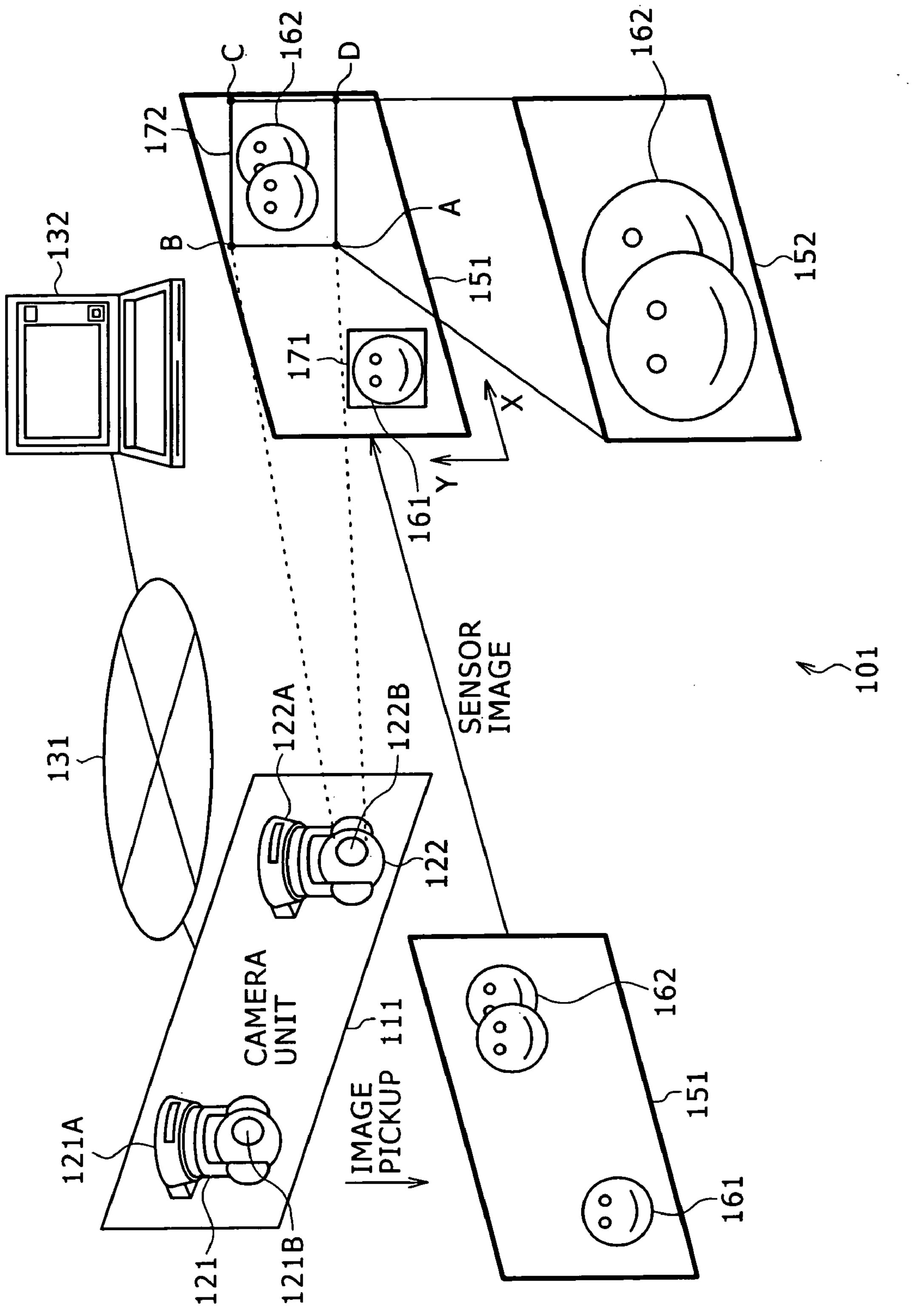
FIG. 6 is a schematic view showing an example of a configuration of the monitoring system shown in FIG. 5.

Referring to FIG. 5, the monitoring system 101 shown includes a camera unit 111. Referring to FIG. 6, the camera unit 111 includes a sensor camera 121 for picking up a region of a wide area, and a zoom camera 122 for picking up an image of a predetermined moving body in a zoomed (enlarged) state. The sensor camera 121 picks up an image of a region of a wide area, and the zoom camera 122 zooms and picks up an image of a moving body detected from within a sensor image 151 obtained by the image pickup by the sensor camera 121. Consequently, according to the monitoring system 101 shown in FIG. 5, a region 21 of a cylindrical wide area, for example, of a diameter of 40 m in a parking area can monitored.

As a result, the monitoring system 101 shown in FIG. 5 requires a reduced number of cameras when compared with the multi camera system 1 shown in FIG. 1 and can be installed readily and produced at a reduced cost.

FIG. 6 shows an example of a configuration of the monitoring system 101.

Referring to FIG. 6, the monitoring system 101 includes a camera unit 111 which includes a sensor camera 121 and a zoom camera 122, a network 131, and a client 132. The monitoring system 101 records a sensor image 151 acquired by the sensor camera 121 and a zoom image 152 obtained by image pickup by means of the zoom camera 122 into the client 132 through the network 131 and reproduces the thus recorded sensor image 151 and zoom image 152 by means of the client 132.

The sensor camera 121 of the camera unit 111 includes a pan tilt section 121A and a camera section 121B which are formed as a unitary member. The pan tilt section 121A is formed as a rotatable table for changing the image pickup direction freely, for example, with regard to two axes for panning and tilting (horizontal direction and vertical direction). The camera section 121B is disposed on the rotatable table which forms the pan tilt section 121A and controls the pan tilt section 121A under the control of the client 132 to adjust the horizontal or vertical direction of the image pickup direction and change the angle of view of image pickup to expand or reduce the image pickup magnification to pick up an image of (a subject of) a wide area as moving pictures. In particular, for example, the camera section 121B successively shifts the image pickup direction to pick up an image of a subject thereby to acquire a plurality of unit images and produces a sensor image 151 of a panorama image composed of the plural unit images.

The camera section 121B supplies the sensor image 151 obtained by the image pickup to the client 132 through the network 131. In FIG. 6, the sensor camera 121 picks up an image of a wide area including moving bodies 161 and 162 to acquire a sensor image 151 in which the moving bodies 161 and 162 are included.

The zoom camera 122 includes a pan tilt section 122A and a camera section 122B which are formed as a unitary member similarly to the sensor camera 121. The pan tilt section 122A is formed as a rotatable table for changing the image pickup direction freely, for example, with regard to the two axes for panning and tilting similarly as in the sensor camera 121. The camera section 122B is disposed on the rotatable table which forms the pan tilt section 122A and controls the pan tilt section 122A under the control of the client 132 to adjust the horizontal or vertical direction of the image pickup direction and change the angle of view of image pickup to increase or decrease the image pickup magnification to pick up a predetermined moving body as zoomed moving pictures.

The client 132 detects the moving bodies 161 and 162 included in the sensor image 151 supplied thereto from the sensor camera 121 and determines a predetermined region (for example, a rectangular region) surrounding each of the moving bodies 161 and 162 as a moving body framework 171 or 172.

The client 132 supplies, for example, coordinates of the four vertices A to D of the moving body framework 172 on the X axis (axis in the horizontal direction in FIG. 6) and the Y axis (axis in the vertical direction) on the sensor image 151 to the zoom camera 122. The zoom camera 122 performs zoom image pickup of (the moving body framework 172 of) the moving body 162 based on the coordinates to acquire the zoom image 152. It is to be noted that, in the following description, the sensor image 151 and the zoom image 152 are acquired in a unit of a frame. The zoom camera 122 supplies the zoom image 152 to the client 132 through the network 131.

The network 131 is a communication network which allows bidirectional communication of data and may be, for example, the Internet network connected through a telephone circuit to the client 132 or an ISDN (Integrated Services Digital Network)/B (broadband)—ISDN, a LAN (Local Area Network) or the like connected to a TA (Terminal Adapter) or a modem.

The client 132 is formed, for example, from a personal computer and controls the sensor camera 121 and the zoom camera 122 through the network 131. Further, the client 132 reproduces a sensor image 151 from the sensor camera 121 and a zoom image 152 from the zoom camera 122 and reproduces the recorded sensor image 151 and zoom image 152 so as to be displayed.

Figure 7:
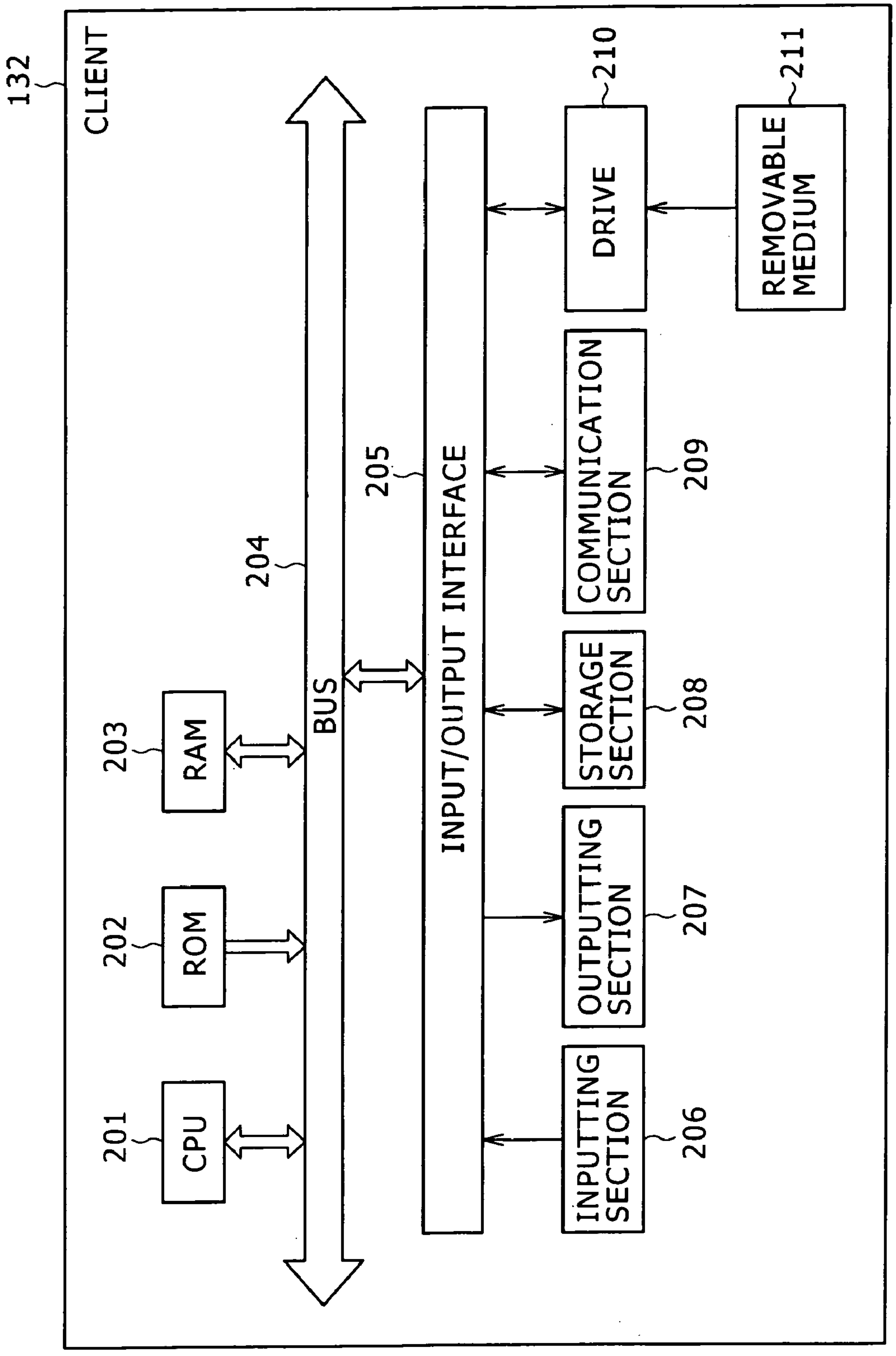
FIG. 7 is a block diagram showing an example of a configuration of a client shown in FIG. 6.

FIG. 7 shows an example of a configuration of the client 132 shown in FIG. 6.

Referring to FIG. 7, a central processing unit (CPU) 201 is connected to a read only memory (ROM) 202 and a random access memory (RAM) 203 through a bus 204. It is to be noted that the CPU 201, ROM 202 and RAM 203 form a microcomputer. Also an input/output interface 205 is connected to the bus 204.

The CPU 201 executes various processes in accordance with a program stored in the ROM 202 or a program stored in the RAM 203. The ROM 202 has various programs stored therein. The RAM 203 stores a program acquired through a communication section 209. Further, the RAM 203 suitably stores data and so forth necessary for the CPU 201 to execute various processes.

An inputting section 206 including a keyboard, a mouse, a microphone and so forth, an outputting section 207 including an liquid crystal display (LCD) unit, a speaker and so forth, a storage section 208 formed from a hard disk and so forth and a communication section 209 formed from a TA, a modem or the like are connected to the input/output interface 205. The communication section 209 is connected to the network 131 of FIG. 6 and communicates with the sensor camera 121 and the zoom camera 122 through the network 131.

A drive 210 is suitably connected the input/output interface 205 as occasion demands, and a program is read out from a removable medium 211 loaded in the drive 210 and installed into the storage section 208. The CPU 201 loads the program installed in the RAM 203, for example, into the RAM 203 and executes the program.

FIG. 8 shows an example of a functional configuration of the client 132 shown in FIG. 6.

Referring to FIG. 8, the client 132 shown includes a sensor image acquisition module 221, a moving body detection module 222, a tracking object image acquisition module 223, a timer module 224, a moving body log module 230 and a reproduction module 231 which correspond, for example, to the CPU 201 shown in FIG. 7. The client 132 further includes a tracking object information management database (DB) 225, a display information DB 226, a moving body information DB 227, a moving body log information DB 228 and a recording actual result information DB 229 which correspond, for example, to the storage section 208 of FIG. 7.

An instruction to acquire a sensor image 151 is supplied from the inputting section 206 to the sensor image acquisition module 221 in response to an operation of a user. The sensor camera 121 picks up an image of the region 21 of a wide area under the control of the sensor image acquisition module 221 and supplies a resulting sensor image 151 and an ID (hereinafter referred to as camera ID) unique to the sensor camera 121 and representing the sensor camera 121 itself to the sensor image acquisition module 221. The sensor image acquisition module 221 further supplies the sensor image 151 from the sensor camera 121 to the moving body detection module 222.

The sensor image acquisition module 221 produces a predetermined file in the display information DB 226 and registers, into the file, the sensor image 151 and display information including an appearance position of a moving body represented by the coordinates of the vertices A to D of a moving body framework 172 supplied from the moving body detection module 222. Further, the sensor image acquisition module 221 changes recording actual result information representative of presence/absence of storage (record) of a sensor image 151 and a zoom image 152 registered in the recording actual result information DB 229 based on date information representative of the date and time at present supplied from the timer module 224.

Further, the sensor image acquisition module 221 produces a predetermined file in the moving body information DB 227 and registers moving body information into the file. The moving body information includes information of the date and time of appearance, the date and time of disappearance, the appearance position and the moving body ID of a moving body supplied from the moving body detection module 222, a reproduction starting position which is reproduction information relating to reproduction, and a camera ID supplied from the sensor camera 121.

The moving body detection module 222 detects appearance of any moving body existing in the image pickup region of the sensor image 151 supplied from the sensor image acquisition module 221 based on the sensor image 151, and applies an ID (hereinafter referred to as moving body ID) to the moving body whose appearance is detected. Further, the moving body detection module 222 recognizes, based on a result of the detection, the position of the frame of the sensor image 151 when the appearance of the moving body is detected from the top frame as a reproduction starting position when the sensor image 151 corresponding to the moving body is to be reproduced. Furthermore, the moving body detection module 222 determines a moving body frame 172 (171) of the moving body whose appearance is detected and supplies the coordinates of the vertices A to D of the moving body frame 172 as the appearance position of the moving body to the sensor image acquisition module 221.

The moving body detection module 222 recognizes the date and time of appearance which is the date and time at which appearance of any moving body is detected based on the date and time information from the counter module 224. The moving body detection module 222 registers the date and time of appearance, moving body ID and appearance position of the moving body as tracking object information which is information of a moving body of an object of tracking whose image is to be picked up as a zoom image (tracking image pickup) by the zoom camera 122 into the tracking object information management DB 225.

Furthermore, the moving body detection module 222 detects disappearance of any moving body whose appearance has been detected from the sensor image 151 and recognizes the date and time at which the disappearance is detected as the date and time of disappearance based on the date and time information from the counter module 224. The counter module 224 supplies the date and time of appearance, date and time of disappearance, appearance position and moving body ID of the moving body and the reproduction starting position to the sensor image acquisition module 221.

The tracking object image acquisition module 223 acquires tracking object information from the tracking object information management DB 225. The tracking object image acquisition module 223 controls the zoom camera 122 based on the tracking object information to pick up a zoom image of a moving body as moving pictures. The tracking object image acquisition module 223 produces a predetermined file in the display information DB 226 and registers a zoom image 152 obtained as a result of the zoom image pickup in a coordinated relationship with the moving body ID of the moving body of the tracking object included in the tracking object information into the file.

The tracking object image acquisition module 223 registers a still image (hereinafter referred to as zoom still image) 272C (hereinafter described with reference to FIG. 15) produced by capturing the zoom image 152 in the form of moving pictures at a predetermined timing and the moving body ID of the moving body of the tracking object as moving body log information for displaying a moving body log. It is to be noted that the moving body log is a log of a moving body detected by the moving body detection module 222. The tracking object image acquisition module 223 changes the recording actual result information registered in the recording actual result information DB 229 based on the date and time information from the counter module 224.

The counter module 224 counts the date and time at present and supplies date and time information representing the date and time to the sensor image acquisition module 221, moving body detection module 222, tracking object image acquisition module 223 and moving body log module 230.

The tracking object information management DB 225 stores tracking object information from the moving body detection module 222 as a predetermined file. The display information DB 226 stores display information and a sensor image 151 from the sensor image acquisition module 221 as a predetermined file. Further, the display information DB 226 stores a zoom image 152 from the tracking object image acquisition module 223 in a coordinated relationship with the moving body ID as a predetermined file.

The moving body information DB 227 stores moving body information from the sensor image acquisition module 221 as a predetermined file. The moving body log information DB 228 stores moving body log information from the tracking object image acquisition module 223 as a predetermined file. The recording actual result information DB 229 stores registration actual result information.

The moving body log module 230 receives an instruction to display a moving body log supplied thereto from the inputting section 206 in response to an operation of the user. The moving body log module 230 causes the outputting section 207 to display a moving body log in accordance with the instruction. More particularly, the moving body log module 230 causes the outputting section 207 to display a moving body log based on the date and time information supplied from the counter module 224, moving body information stored in the moving body information DB 227, moving body log information stored in the moving body log information DB 228 and recording actual result information stored in the recording actual result information DB 229.

Further, the moving body log module 230 receives a reproduction instruction supplied thereto from the inputting section 206 in response to an operation of the user and supplies the date and time corresponding to the sensor image 151 designated as a reproduction object by the user to the reproduction module 231.

The reproduction module 231 reads out, based on the date and time of appearance from the moving body log module 230 to read out the moving body ID and the reproduction starting position corresponding to the date and time of appearance from the moving body information DB 227. The reproduction module 231 reproduces a sensor image 151 and a zoom image 152 from the display information DB 226 based on the moving body ID and the reproduction starting position thus read out and causes the outputting section 207 to display the sensor image 151 and the zoom image 152.

FIG. 9 illustrates an example of the tracking object information stored in the tracking object information management DB 225 shown in FIG. 8.

Referring to FIG. 9, the tracking object information includes information of the date and time of appearance, moving body ID and appearance position of moving bodies.

In FIG. 9, the moving body detection module 222 detects a moving body at each of 10:00 and 10:05 of Jan. 10, 2004 and applies "1" of a moving body ID to the moving body detected at 10:00 and "2" of another moving body ID to the moving body detected at 10:05. Further, the moving body detection module 222 determines a moving body frame 172 for the moving body of the moving body ID "1" and recognizes the coordinates (1, 2), (1, 5), (2, 5) and (2, 2) of the vertices A to D of the moving body frame 172 as an appearance position of the moving body. It is to be noted that i of (i, j) represents the value of the X coordinate on the XY coordinate system whose origin is a predetermined position of the sensor image 151, and j represents the value of the Y coordinate.

Furthermore, the moving body detection module 222 decides a moving body frame 172 for the moving body of the moving body ID "2" and recognizes the coordinates (3, 5), (3, 9), (5, 9) and (5, 5) of the vertices A to D of the moving body frame 172 as an appearance position. Then, the moving body detection module 222 registers the date and time of appearance, moving body ID and appearance position of the moving bodies of the moving body IDs "1" and "2" as tracking object information into the tracking object information management DB 225.

FIG. 10 illustrates an example of moving body information stored in the moving body information DB 227 shown in FIG. 8.

Referring to FIG. 10, the moving body information includes information of the date and time of appearance, date and time of disappearance, appearance position and moving body ID of a moving body, the reproduction starting position and the camera ID. In other words, in the moving body information DB 227, moving body IDs, the date and time of appearance, date and time of disappearance and appearance position of each of moving bodies of the moving body IDs, reproduction starting positions and camera IDs are stored in a coordinated relationship as moving body information in the moving body information DB 227. A file is produced for each management time zone in the moving body information DB 227, and moving body information is registered in a file corresponding to a management time zone which includes the date and time of appearance of the moving body information. It is to be noted that the management time zone in the following description is defined as a unit of one hour when one day is delimited by one hour in order from 9:00 for each date. However, the definition of the management time zone is not limited to this.

Further, FIG. 10 illustrates an example of the moving body information registered in a file for the management time zone from 10:00 to 11:00 of Jan. 10, 2004 in the moving body information DB 227. As seen in FIG. 10, the moving body detection module 222 detects disappearance of the moving body, whose appearance is detected at 10:00 of Jan. 10, 2004 and to which the moving body ID "1" is applied, at 11:00 of the same day. Further, the moving body detection module 222 determines a moving body frame 172 of the moving body whose moving body ID is "1" and recognizes the coordinates (1, 2), (1, 5), (2, 5) and (2, 2) of the vertices A to D of the moving body frame 172 whose moving body ID is "1" as an appearance position.

Further, the frame of the sensor image 151 in which the appearance of the moving body whose moving body ID is "1" is detected is the frame #1 which is the first frame from the top of the frames, and the moving body detection module 222 recognizes the frame #1 as a reproduction starting position. It is to be noted that, in the following description, the first frame from the top of frames is referred to as frame #1. Further, the sensor image acquisition module 221 receives "1" supplied thereto as the camera ID of the sensor camera 121 by which the sensor image 151 in which the appearance of the moving body whose moving body ID is "1" is detected is acquired.

Further, the moving body detection module 222 detects disappearance of the moving body, whose appearance is detected at 10:05 of Jan. 10, 2004 and to which the moving body ID "2" is applied, at 10:30 of the same day. The moving body detection module 222 determines a moving body frame 172 of the moving body whose moving body ID is "2" and recognizes the coordinates (3, 5), (3, 9), (5, 9) and (5, 5) of the vertices A to D of the moving body frame 172 whose moving body ID is "2" as an appearance position.

Furthermore, the frame of the sensor image 151 in which the appearance of the moving body whose moving body ID is "2" is detected is the frame #2, and the moving body detection module 222 recognizes the frame #2 as a reproduction starting position. Further, the sensor image acquisition module 221 receives "1" supplied thereto as the camera ID of the sensor camera 121 by which the sensor image 151 in which the appearance of the moving body whose moving body ID is "2" is detected is acquired.

When disappearance of any of the bodies to which the moving body IDs "1" and "2" are applied is detected, the sensor image acquisition module 221 registers the moving body information including the date and time of appearance, date and time of disappearance, appearance position and moving body ID of the moving body, the reproduction starting position and the camera ID into the moving body information DB 227.

Figures 11, 12, 13:
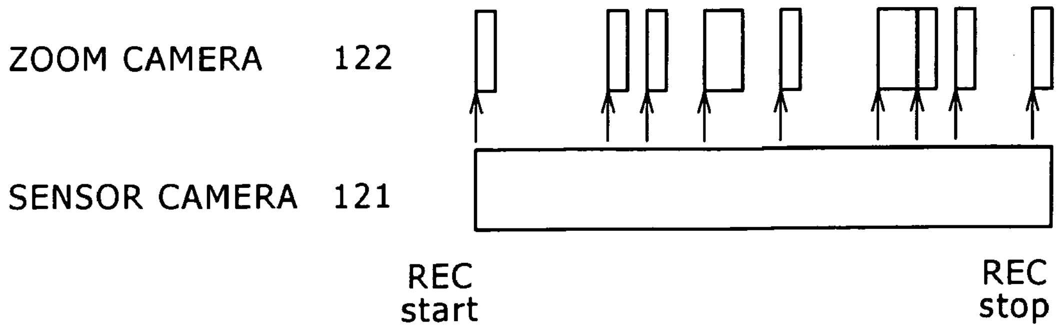
FIG. 11 is a view illustrating an example of moving body log information registered in a moving body log information database shown in FIG. 8.
FIG. 12 is a view illustrating an example of recording actual result information registered in a recording actual result information database shown in FIG. 8.
FIG. 13 is a diagrammatic view illustrating the capacities of sensor images and zoom images stored in a display information database shown in FIG. 8.

FIG. 11 illustrates an example of the moving body log information registered in the moving body log information DB 228 shown in FIG. 8.

Referring to FIG. 11, the moving body log information includes moving body IDs and a 272C obtained by capturing a zoom image including each of the moving bodies of the moving body IDs. It is to be noted that numbers beginning with 1 are applied to the zoom still images 272C, for example, in the order in which the zoom still images 272C are acquired, and in the following description, a zoom still image 272C to which the number p is applied is referred to as zoom still image #p. Further, in the moving body log information DB 228, a file is produced for each management time zone, and moving body log information is registered into a file corresponding to a management time zone including the date and time at which the zoom still image 272C of the moving log information is acquired.

In FIG. 11, the tracking object image acquisition module 223 acquires a zoom still image 272C obtained by capturing the zoom image 152 of the moving body whose moving body ID is "1" for two frames of the zoom still images #1 and #2. Further, the tracking object image acquisition module 223 acquires the zoom still image 272C of the moving body whose moving body ID is "2" for one frame of the zoom still image #10.

The tracking object image acquisition module 223 registers the moving body ID "1" and the zoom still image 272C of the moving body of the moving body ID "1" as well as the moving body ID "2" and the zoom still image 272C of the moving body of the moving body ID "2" as moving body log information into the moving body log information DB 228.

FIG. 12 illustrates an example of the recording actual result information registered in the recording actual result information DB 229.

Referring to FIG. 12, the recording actual result information includes sensor flags each representative of presence or absence of storage of a sensor image 151 and zoom flags each representative of presence or absence of storage of a zoom image 152 and is registered in a coordinated relationship with the management time zones.

In FIG. 12, the sensor image acquisition module 221 acquires and registers a sensor image 151 into the display information DB 226 and the tracking object image acquisition module 223 acquires and registers a zoom image 152 into the display information DB 226 within the management time zone from 10:00 to 11:00 of Jan. 10, 2004. In other words, the sensor flag is "1" which represents the presence of storage of a sensor image 151, and the zoom flag is, for example, "1" which represents the presence of storage of a zoom image 152.

On the other hand, the sensor image acquisition module 221 acquires none of a sensor image 151 and a zoom image 152 within the management time zone from 11:00 to 12:00 of Jan. 10, 2004. In other words, the sensor flag is "0" which represents the absence of storage of a sensor image 151, and the zoom flag is, for example, "0" which represents the absence of storage of a zoom image 152.

Now, the data amounts of the sensor image 151 and the zoom image 152 stored in the display information DB 226 are described with reference to FIG. 13.

As seen in FIG. 13, in the display information DB 226, all sensor images 151 acquired by the sensor camera 121 and zoom images 152 each acquired by the zoom camera 122 when appearance of a moving body is detected are recorded.

Figure 4:
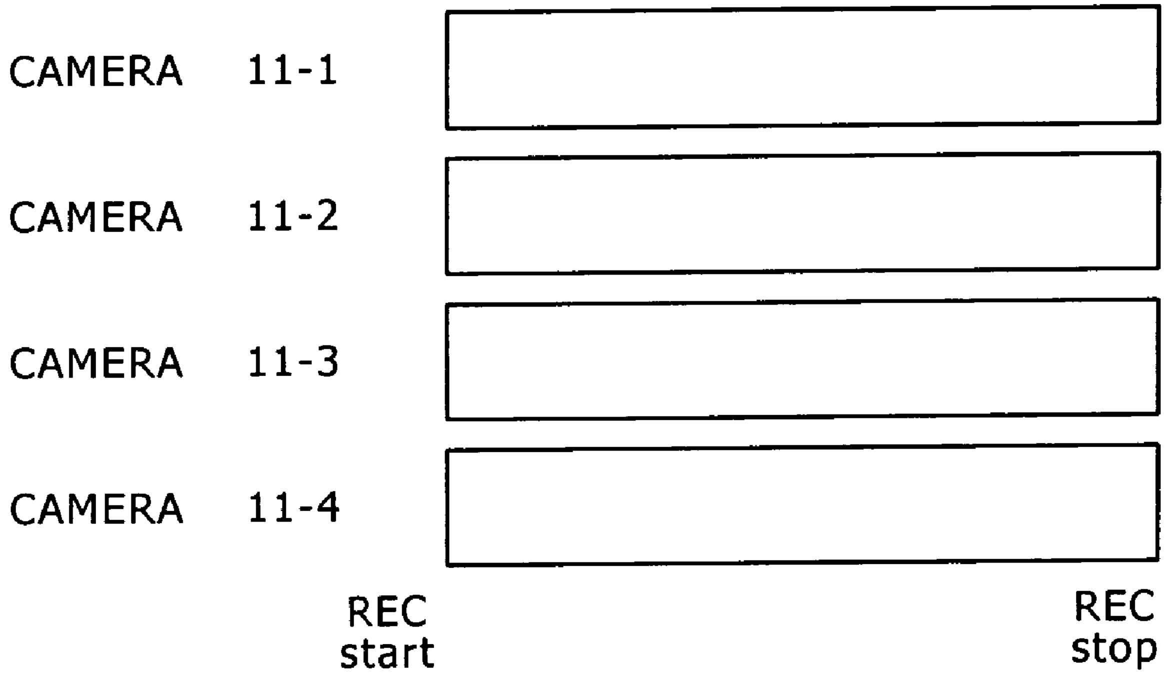
FIG. 4 is a diagrammatic view illustrating image data recorded in a recording apparatus shown in FIG. 2 or a PC shown in FIG. 3.

Since, in the monitoring system 101, a zoom image 152 is acquired and recorded only when appearance of a moving body is detected in such a manner as described above, when compared with an alternative case wherein all of images acquired from the cameras 11-1 to 11-4 described hereinabove with reference to FIG. 4 are recorded, the storage capacity of the display information DB 226 necessary to monitor the region 21 can be reduced.

For example, where sensor images 151 and zoom images 152 are recorded in a state wherein they are compressed in accordance with the JPEG (Joint Photographic Experts Group) system under predetermined conditions (50 KB/frame, 10 frames/sec), the data amount of the sensor image 151 and the zoom image 152 necessary to monitor the region 21 for 24 hours is approximately 51 GB. In particular, the capacity of the display information DB 226 necessary to monitor the region 21 is reduced to less than 1/60 to 1/3 when compared with that of the multi camera system 1 described hereinabove with reference to FIG. 4.

As a result, when the sensor images 151 and the zoom images 152 are reproduced to perform a monitoring act, the user (operator) can reproduce not the zoom images 152 at all points of time but only every one of the zoom images 152 at which any moving body which must be monitored is detected. Therefore, the time and labor (quantitative man-hours) for the monitoring act can be reduced.

Further, since the data amount of the sensor images 151 and the zoom images 152 stored in the display information DB 226 is reduced, the reproduction module 231 can readily search for a sensor image 151 and a zoom image 152 which make an object of reproduction.

Examples of a screen to be displayed on the outputting section 207 of FIG. 7 are shown in FIGS. 14 to 19.

Figure 14:
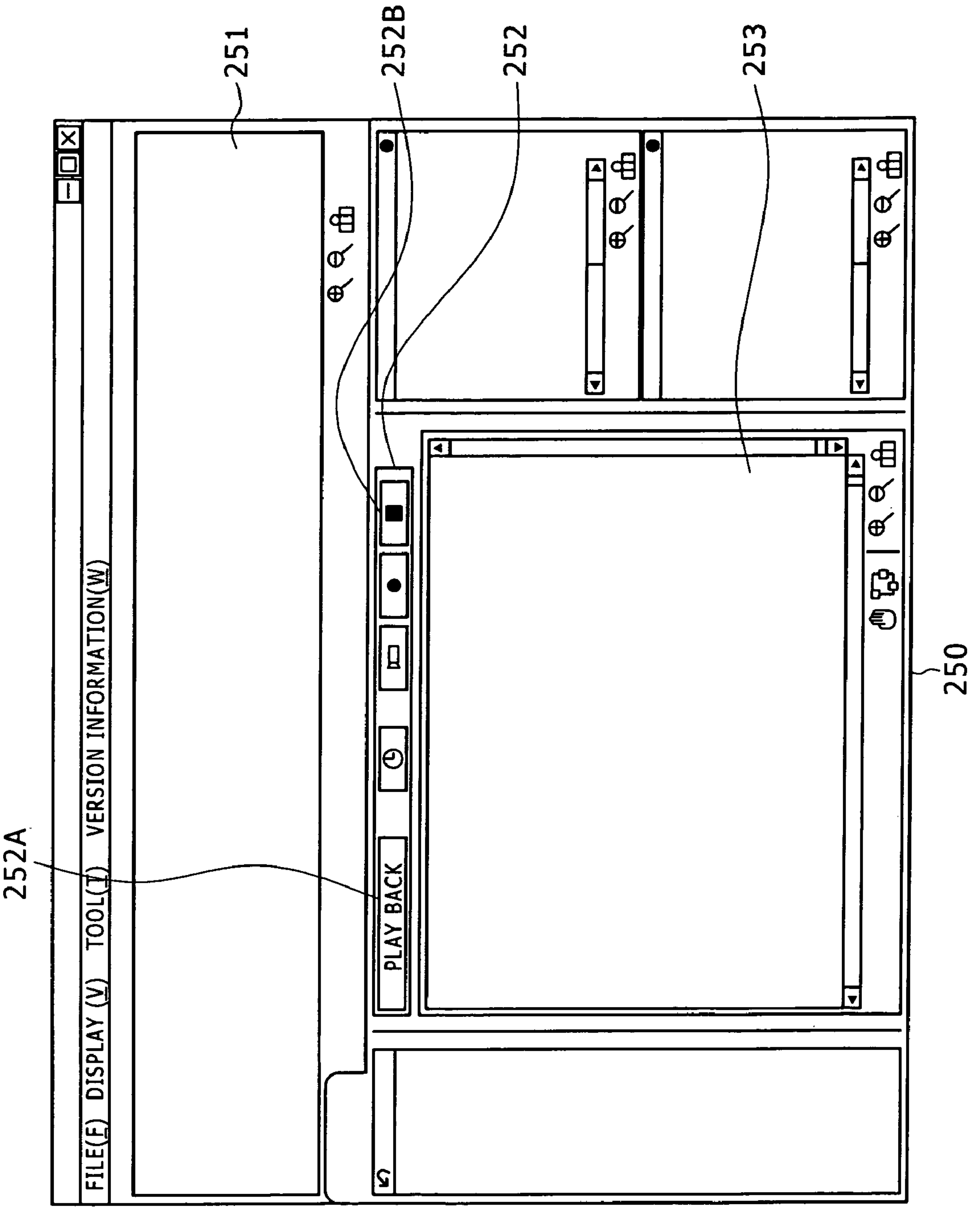
FIGS. 14 to 19 are schematic views showing different examples of a screen displayed on an outputting section shown in FIG. 7.

When the user operates the inputting section 206 to issue an instruction to acquire a sensor image 151, a screen 250 shown in FIG. 14 is displayed on the outputting section 207.

The screen 250 of FIG. 14 includes a sensor image display section 251 for displaying a sensor image 151, an operation section 252 for displaying a GUI (Graphical User Interface) through which an instruction to perform an operation relating to recording (picture recording) of the sensor image 151 and the zoom image 152 is to be issued, a zoom image display section 253 for displaying moving pictures of the zoom image 152, and so forth.

The sensor image acquisition module 221 causes the sensor image display section 251 to display a sensor image 151 being currently acquired. Meanwhile, the tracking object image acquisition module 223 causes the zoom image display section 253 to display moving pictures of a zoom image 152 being currently acquired.

In the operation section 252, for example, a playback button 252A, a stop button 252B and so forth are displayed. The playback button 252A is operated in order to display (a screen 270 (FIG. 15) of) a moving body log. Meanwhile, the stop button 252B is operated in order to end the acquisition of a sensor image 151. When the user operates the inputting section 206 to select the playback button 252A, the inputting section 206 accepts the operation of the user and supplies an instruction to the moving body log module 230 to display a moving body log in response to the operation. The moving body log module 230 causes the outputting section 207 to display the screen 270 as seen in FIG. 15 in accordance with the instruction.

Figure 15:
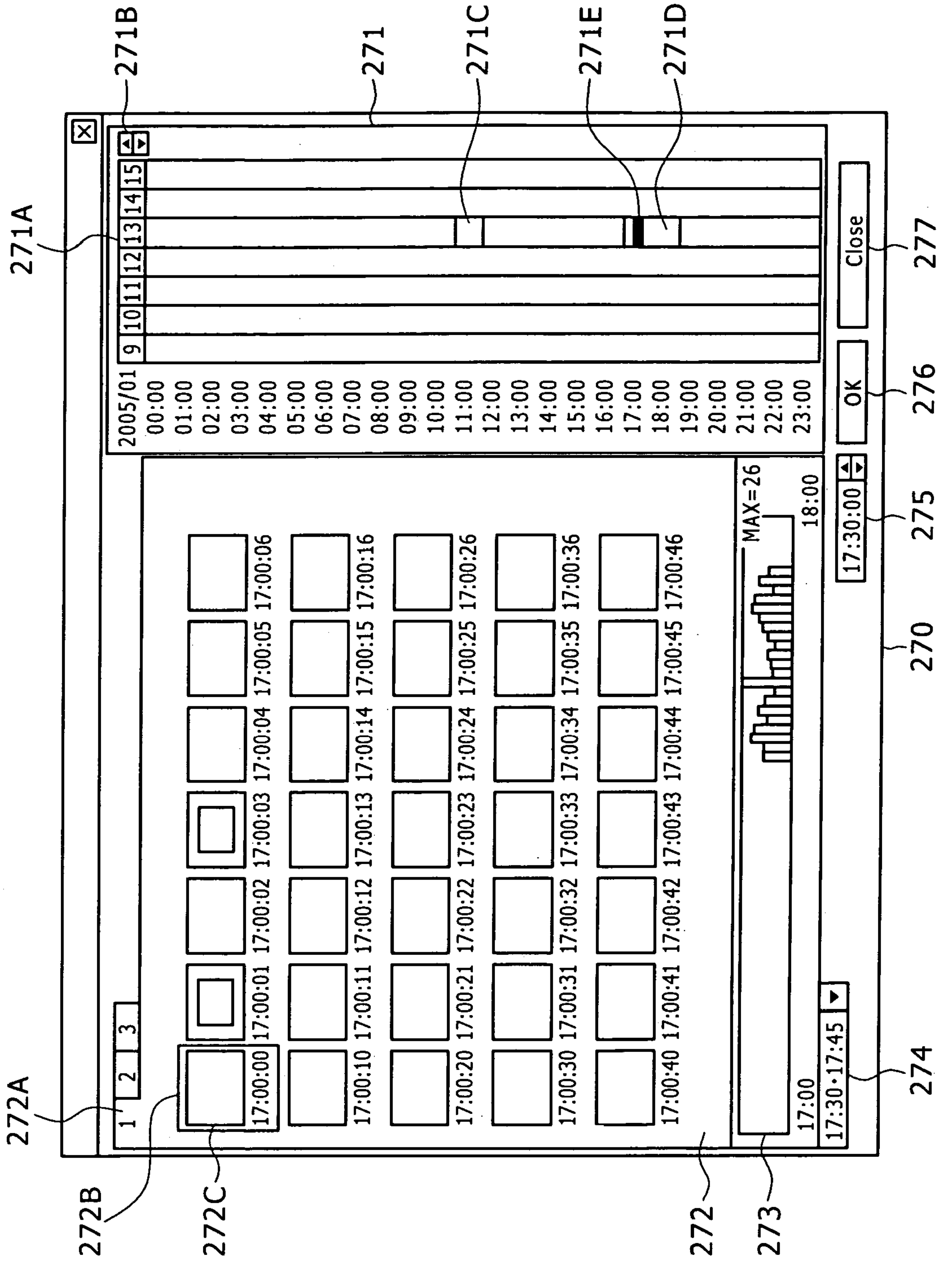

Referring to FIG. 15, the screen 270 includes a recording actual result display section 271 for displaying a recording actual result based on recording actual result information, a moving body log display section 272 for displaying a moving body log based on moving body log information, and a moving body number graph display section 273 for indicating the number of moving bodies which appear within a predetermined management time zone. The screen 270 further includes a target time zone selection section 274, a reproduction time selection section 275, an OK button 276, a close button 277, and so forth. It is to be noted that a target time band is a predetermined time zone (for example, 15 minutes) including the date and time of appearance of a moving body corresponding to a zoom still image 272C which is made a display object by the moving body log display section 272.

The recording actual result display section 271 has a date display section 271A and a target week selection section 271B displayed therein. The date display section 271A displays dates of a target week which is one week including the date of the target time zone. The target week selection section 271B is operated in order to change the target week.

The moving body log module 230 causes, based on the sensor flag and the zoom flag of the recording actual result information, a color representing that "there exists no record of a sensor image 151 and a zoom image 152", that "there exists a record only of a sensor image 151" or that "there exists a record of both of a sensor image 151 and a zoom image 152" to be displayed at positions of the day of the date display section 271A and the time of a time display section 271C representing the date and time corresponding to the recording actual result information. For example, that "there exists no record of a sensor image 151 and a zoom image 152" is represented by transparency; that "there exists a record only of a sensor image 151" is represented by pale-blue; and that "there exists a record of both of a sensor image 151 and a zoom image 152" is represented by blue. In FIG. 15, for example, pale-blue is displayed in the time display section 271C, and blue is displayed in a color display section 271D.

Where that "there exists no record of a sensor image 151 and a zoom image 152", that "there exists a record only of a sensor image 151" and that "there exists a record of both of a sensor image 151 and a zoom image 152" are displayed in different colors in this manner, the user can decide readily whether or not a record of a sensor image 151 and/or a zoom image 152 exists from the recording actual result display section 271.

The moving body log module 230 causes a color (for example, yellow), which represents that the present point of time is included in a target time zone, to be displayed at the positions of the date of the date display section 271A and the time of the time display section 271C which represent the target time zone of the recording actual result information.

The moving body log display section 272 has a tab 272A and thumbnail display sections 272B displayed therein. The tab 272A represents the number of a page of the moving body log display section 272. It is to be noted that not the tab 272A but a scroll bar may be displayed in the moving body log display section 272 such that the page of an object of display can be changed by the scroll bar. The thumbnail display sections 272B are displayed, for example, in the form of a matrix in the moving body log display section 272, and a zoom still image 272C of each moving body appearing within the target time zone and the appearance time of the moving body corresponding to the zoom still image 272C are displayed as a moving body log in a thumbnail display section 272B. It is to be noted that the appearance time displayed in any thumbnail display section 272B has a color different, for example, for every camera ID of the sensor camera 121 from which the sensor image 151 corresponding to the appearance time is acquired.

Since only the zoom still image 272C of every moving body appearing within the target time zone is displayed on the moving body log display section 272, the user can search for a zoom still image 272C of a desired moving body readily.

The moving body number graph display section 273 displays a moving body number graph the axis of ordinate of which represents the management time zone including a target time zone and the axis of abscissa of which represents the number of moving bodies which appear within the management time zone. Since the moving body number graph is displayed in this manner, even if the user does not reproduce any sensor image 151, it can readily recognize the number of moving bodies which appear within the management time zone. Further, the moving body number graph display section 273 displays also a maximum number (26 in the example of FIG. 15) of moving bodies which appear within the management time zone including the target time zone.

The target time zone selection section 274 is displayed when a target time zone is to be selected. The reproduction time selection section 275 is displayed when (the time of) date and time of appearance of a moving body which corresponds to a sensor image 151 or a zoom image 152 of an object of reproduction is to be selected. The OK button 276 is operated in order to determine the time selected by the reproduction time selection section 275. The close button 277 is operated in order to stop the display of the screen 270.

Since the recording actual result display section 271, moving body log display section 272 and moving body number graph display section 273 are displayed on the screen 270 in such a manner as described above, the user can simultaneously recognize presence or absence of a record of a sensor image 151 and a zoom image 152 for each time in a unit of a week including a target time zone, zoom still images 272C of moving bodies appearing within the target time zone and the number of moving bodies appearing within management time zones including the target time zone.

Further, the user can designate a position on the recording actual result display section 271 corresponding to a desired date and time to display a moving body log of a moving body appearing at the desired date and time on the moving body log display section 272. As a result, the user can designate a desired date and time so as to display a moving body log of a moving body appearing at the desired date and time more readily than in an alternative case wherein the month, day, hour and minute of desired date and time are successively inputted.

Further, the user can operate, for example, the inputting section 206 to select a desired zoom still image 272C on the screen 270 to reproduce and display a desired sensor image 151 and zoom image 152.

Figure 16:
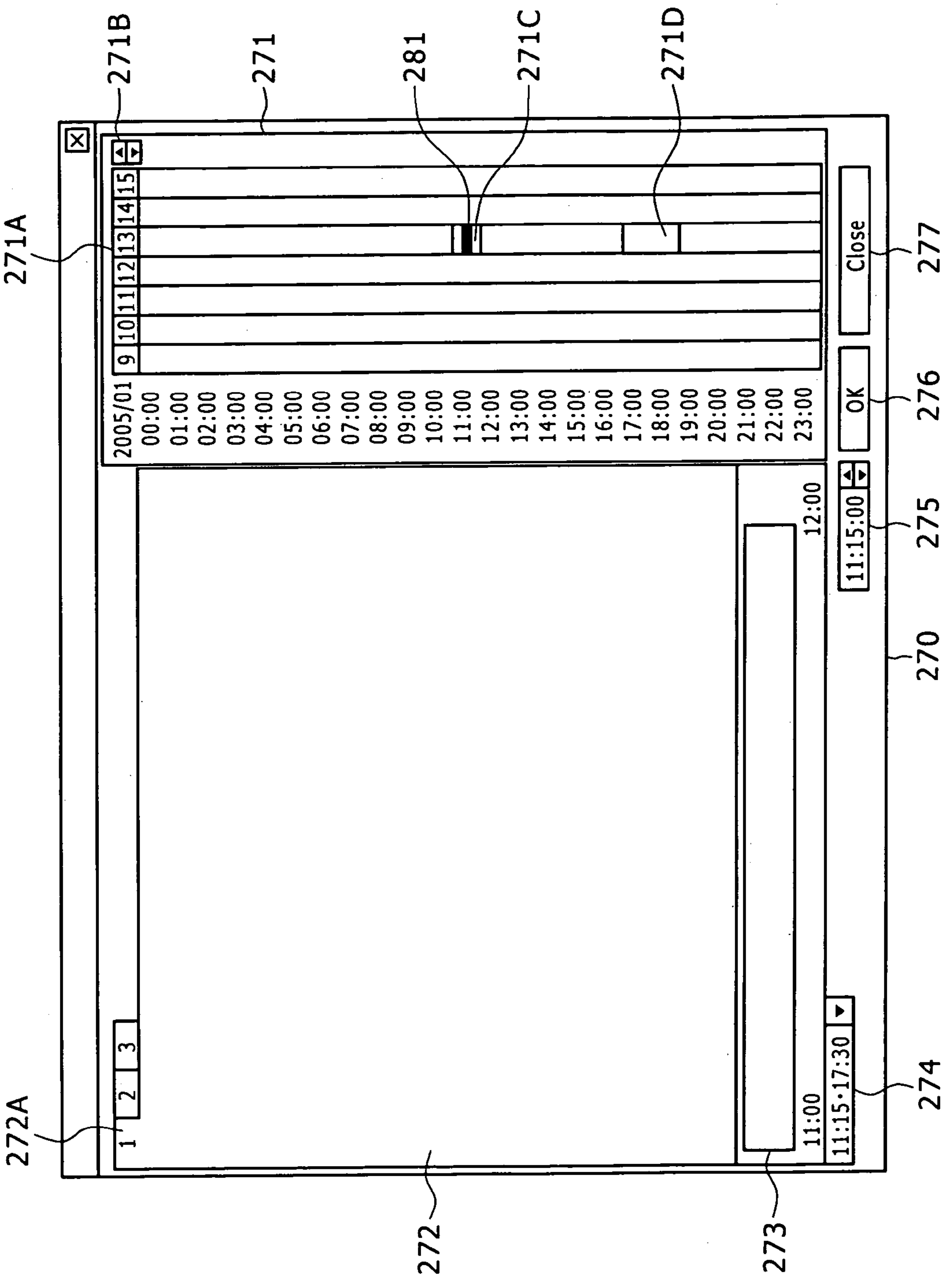

For example, if the user designates a position in the time display section 271C of the recording actual result display section 271, the screen 270 shown in FIG. 15 is changed to another screen 270 shown in FIG. 16.

Referring to FIG. 16, pale-blue representing that "there exists a record only of a sensor image 151" is displayed in the time display section 271C. In particular, since a zoom still image 272C is not acquired but only a sensor image 151 is acquired at the date and time corresponding to the time display section 271C, the thumbnail display section 272B is not displayed in the moving body log display section 272.

On the other hand, when the user operates the inputting section 206 to select a thumbnail display section 272B in which a desired zoom still image 272C is displayed on the screen 270 of FIG. 15, the moving body log module 230 supplies the date and time of appearance displayed in the thumbnail display section 272B to the reproduction module 231. The reproduction module 231 reads out a reproduction starting position and a moving body ID corresponding to the date and time of appearance based on the date and time of appearance from the moving body information DB 227. The reproduction module 231 reproduces the sensor image 151 and the zoom image 152 from the display information DB 226 based on the read out reproduction starting position and moving body ID and causes the outputting section 207 to display a screen 300 shown in FIG. 17. As described above, the user can designate a reproduction starting position of a sensor image 151 by selecting the thumbnail display section 272B.

Figure 17:
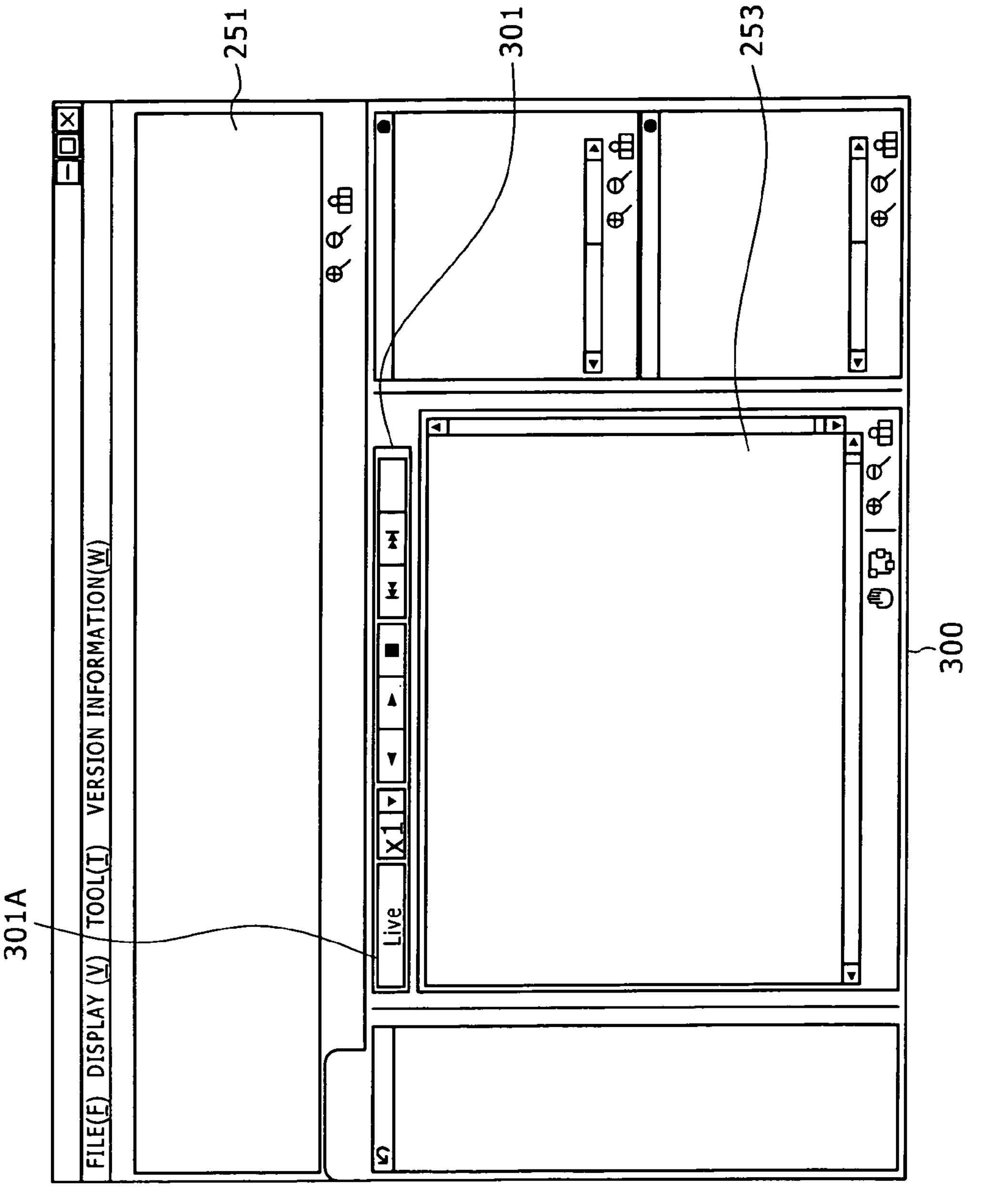

The screen 300 of FIG. 17 includes a sensor image display section 251, a zoom image display section 253, an operation section 301 formed from a GUI for allowing an operation relating to reproduction to be performed, and so forth.

The sensor image display section 251 displays a sensor image 151 reproduced from the display information DB 226, and the zoom image display section 253 displays a zoom image 152 reproduced from the display information DB 226.

The operation section 301 displays a live button 301A to be operated in order to display the screen 270 shown in FIG. 15 or 16.

Figure 18:
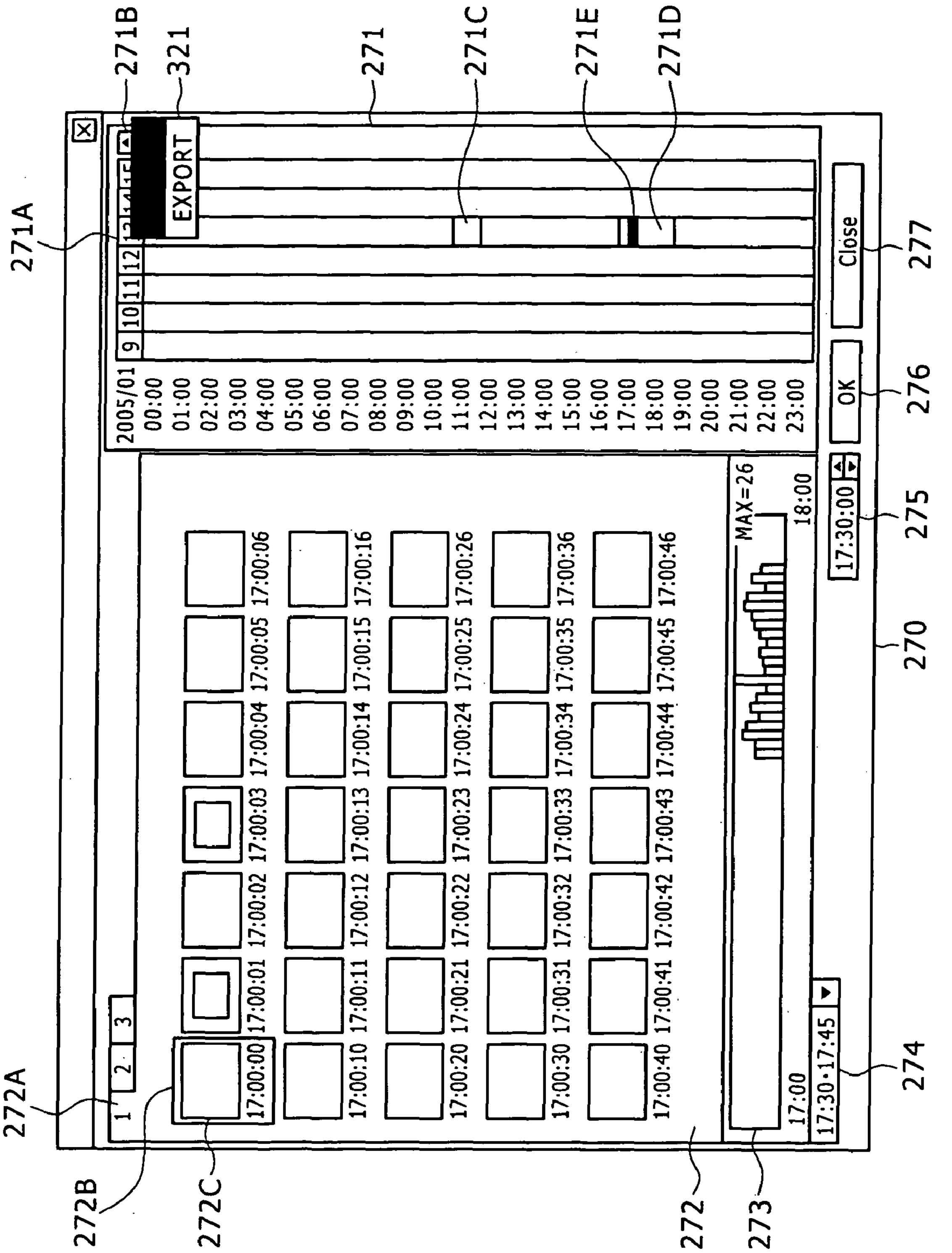

FIG. 18 shows an example of the screen 270 displayed when the date display section 271A is selected on the screen 270 of FIG. 15 or 16.

If the user selects the date display section 271A while the screen 270 of FIG. 15 or 16 is displayed, then the screen 270 of FIG. 15 or 16 is updated to the screen 270 shown in FIG. 18. In particular, a selection box 321 for selecting deletion or export of a sensor image 151 and a zoom image 152 is displayed. When the user selects deletion of the selection box 321, the moving body log module 230 causes the outputting section 207 to display a confirmation screen 340 shown in FIG. 19.

Figure 19:
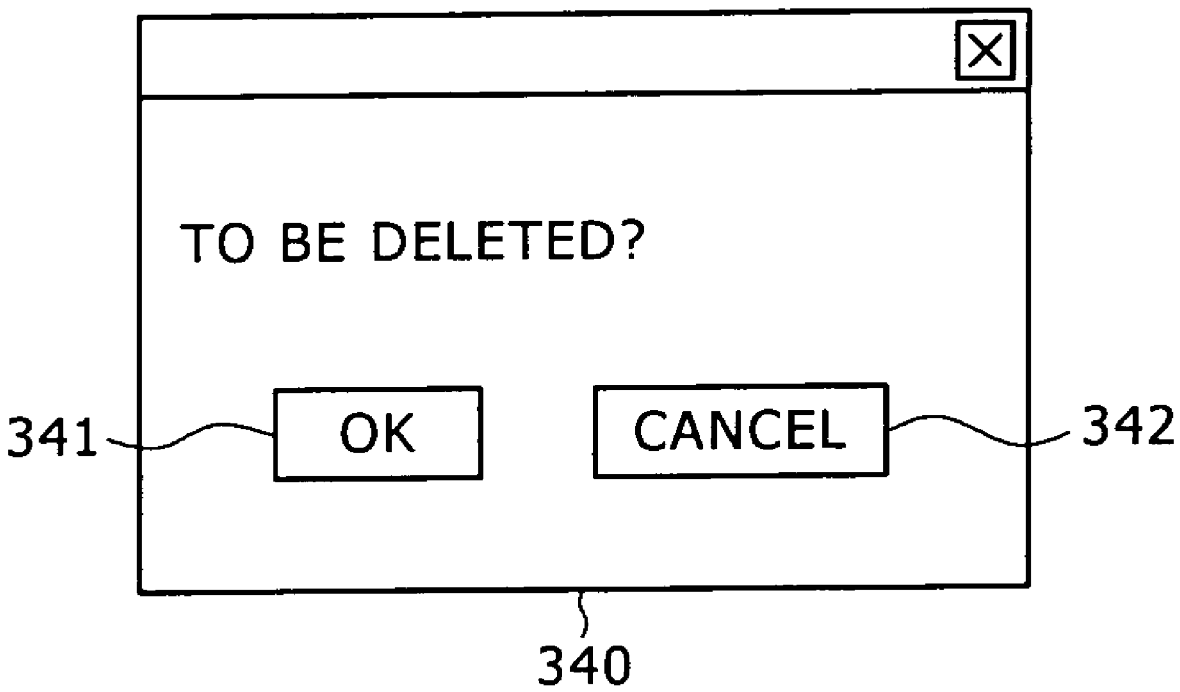

Referring to FIG. 19, the confirmation screen 340 displays a message of "To be deleted?", an OK button 341 and a cancel button 342. The OK button 341 is operated in order to issue a deletion instruction. The cancel button 342 is operated in order to issue an instruction to cancel the deletion.

It is to be noted that, when the user selects the export of the selection box 321 in FIG. 18, a confirmation screen 340 similar to that of FIG. 19 is displayed on the outputting section 207. The message to be displayed in this instance is "To be exported?".

Now, a sensor image acquisition process by the sensor image acquisition module 221 shown in FIG. 8 is described with reference to FIG. 20. The sensor image acquisition process is started, for example, when the user operates the inputting section 206 to issue an instruction to acquire a sensor image 151.

At step S1, the sensor image acquisition module 221 issues a request to the sensor camera 121 to acquire a sensor image 151. The camera section 122A of the sensor camera 121 controls the pan tilt section 121A to pick up an image of a region of a wide area as moving pictures with a predetermined image pickup magnification while the horizontal direction or vertical direction of the image pickup direction is adjusted. Then, the camera section 122A stores the sensor image 151 in the form of moving pictures obtained by the image pickup into a client returning buffer not shown. The sensor camera 121 supplies the sensor image 151 stored in the client returning buffer and the camera ID of the sensor camera 121 itself to the sensor image acquisition module 221 in response to the request from the sensor image acquisition module 221.

After the process at step S1, the processing advances to step S2, at which the sensor image acquisition module 221 acquires the sensor image 151 and the camera ID from the sensor camera 121. Thereafter, the processing advances to step S3. At step S3, the sensor image acquisition module 221 inputs the sensor image 151 from the sensor camera 121 to the moving body detection module 222. Thereafter, the processing advances to step S4.

At step S4, the sensor image acquisition module 221 acquires the moving body IDs, appearance positions, appearance dates and times of moving bodies corresponding to the sensor image 151 inputted at step S3 and a reproduction starting position. Thereafter, the processing advances to step S5.

Figure 21:
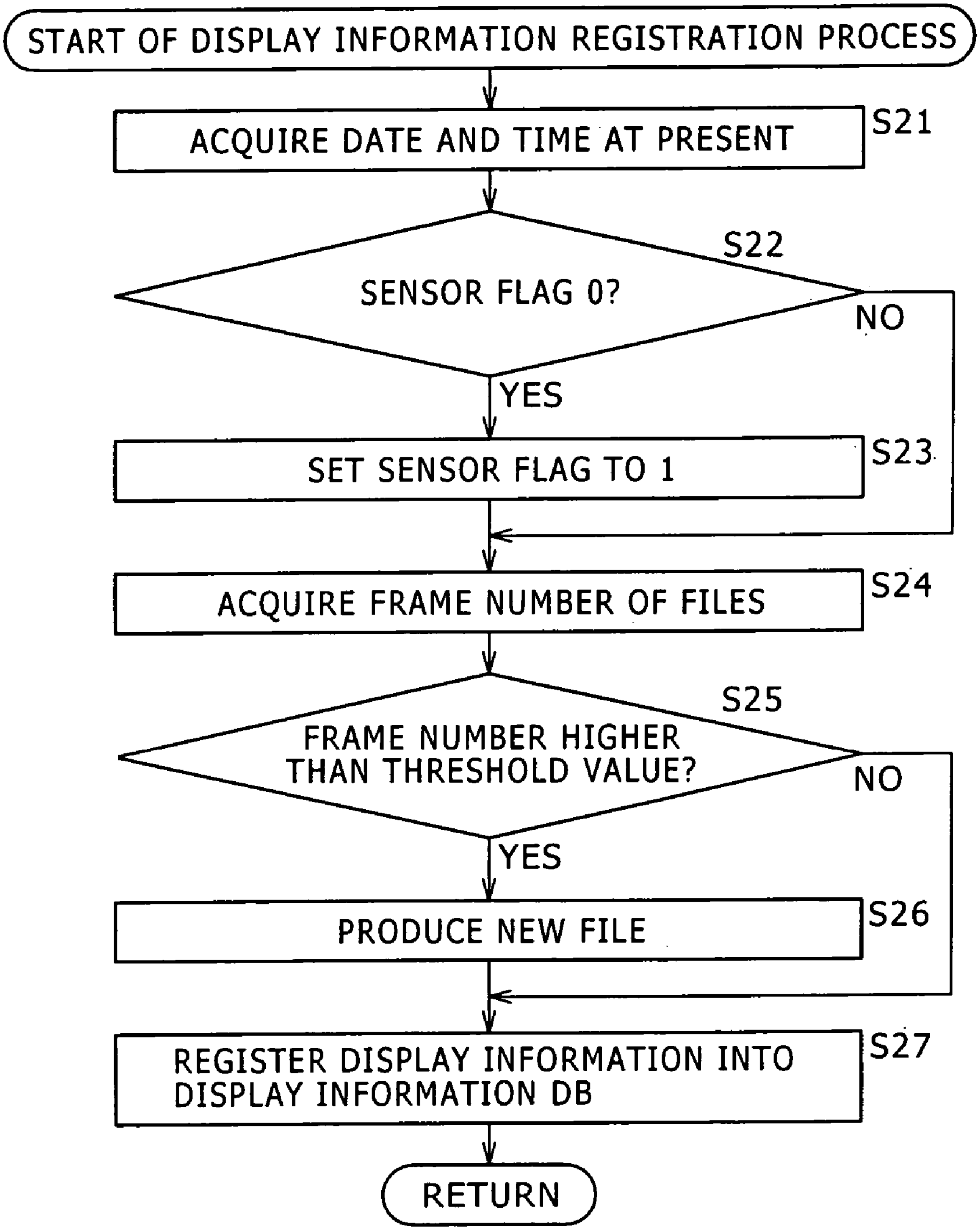
FIG. 21 is a flow chart illustrating a display information registration process at step S5 of FIG. 20.

At step S5, the sensor image acquisition module 221 performs a display information registration process illustrated in FIG. 21 for registering display information, which includes the appearance positions of the moving bodies, and the sensor image 151 into the display information DB 226.

After the process at step S5, the processing advances to step S6, at which the sensor image acquisition module 221 updates the client returning buffer of the sensor camera 121. Thereafter, the processing advances to step S7. At step S7, the sensor image acquisition module 221 decides whether or not all of the moving bodies remain in the sensor image 151, that is, whether or not the moving body ID and the disappearance date and time of a moving body whose disappearance is detected are supplied from the moving body detection module 222 to the sensor image acquisition module 221.

If it is decided at step S7 that not all of the moving bodies remain in the sensor image 151, then the processing advances to step S8. At step S8, the sensor image acquisition module 221 performs a moving body information registration process illustrated in FIG. 22 for registering the moving body information including the moving ID and the disappearance time of each disappearing moving body supplied from the moving body detection module 222, the corresponding appearance date and time, appearance position and reproduction starting position acquired at step S4 and the camera ID supplied from the sensor camera 121 into the moving body information DB 227.

On the other hand, if it is decided at step S7 that all of the moving bodies remain in the sensor image 151, or after the process at step S8, the processing advances to step S9. At step S9, the sensor image acquisition module 221 decides whether or not a request to end the acquisition of a sensor image 151 and a zoom image 152 is received from the inputting section 206, that is, whether or not the user operates the inputting section 206 to select the stop button 252B. If the request to end the acquisition is not received, then the processing returns to step S1 to repeat the processes described above.

On the other hand, if it is decided at step S8 that a request to end the acquisition of a sensor image 151 and a zoom image 152 is received from the inputting section 206, then the processing is ended.

Figure 20:
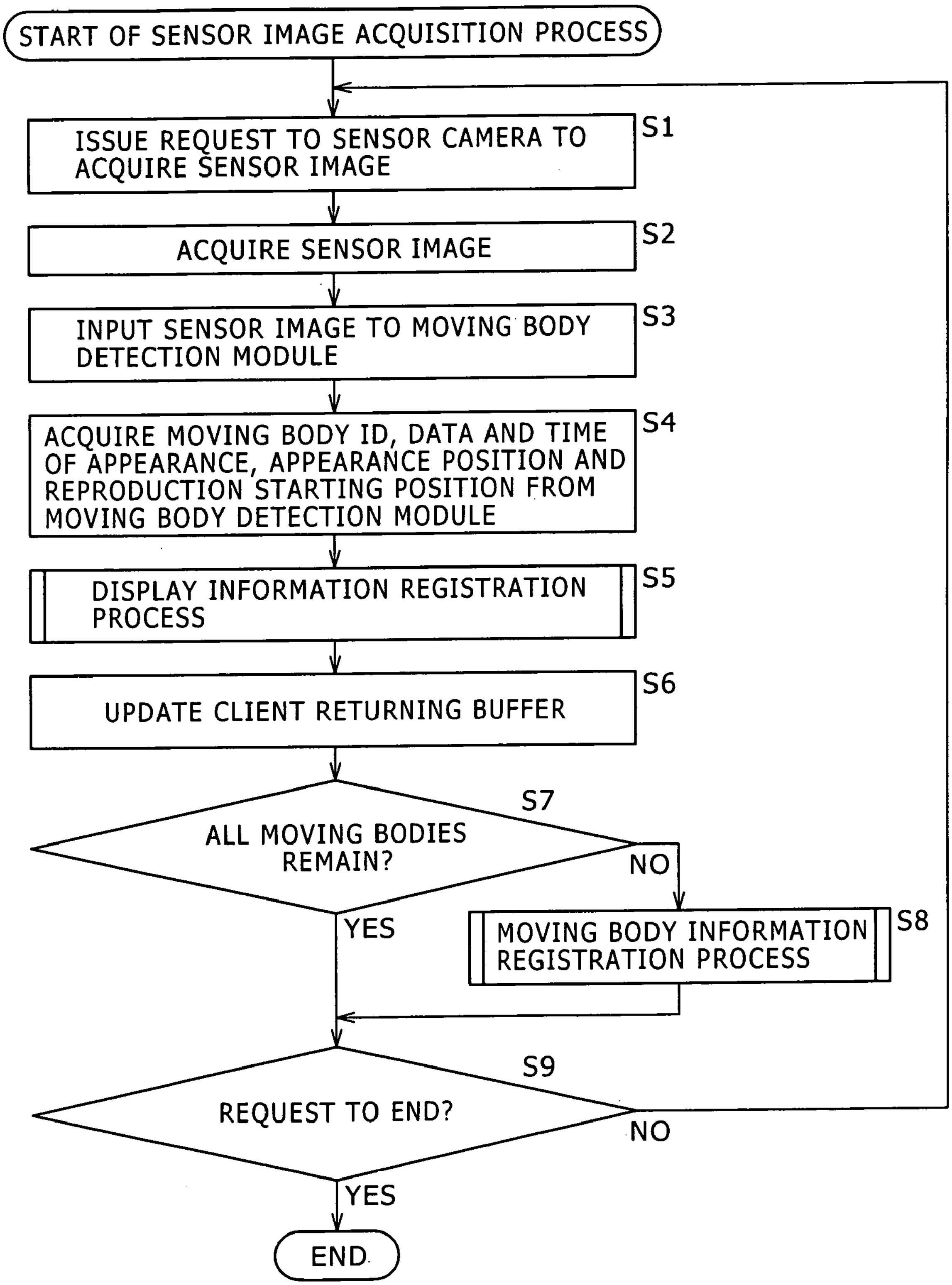
FIG. 20 is a flow chart illustrating a sensor image acquisition process by a sensor image acquisition module shown in FIG. 8.

Now, the display information registration process at step S5 of FIG. 20 is described with reference to FIG. 21.

At step S21, the sensor image acquisition module 221 acquires date and time information representative of the date and time at present from the counter module 224. Thereafter, the processing advances to step S22. At step S22, the sensor image acquisition module 221 reads out a sensor flag corresponding to the date and time represented by the date and time information acquired at step S21 from the recording actual result information DB 229 and decides whether or not the sensor flag is 0 which represents that there exists no record of a sensor image 151.

If it is decided at step S22 that the sensor flag is 0, then the processing advances to step S23, at which the sensor image acquisition module 221 changes the sensor flag from 0 to 1 which represents that there exists a record of a sensor image 151. Thereafter, the processing advances to step S24.

On the other hand, if it is decided at step S22 that the sensor flag is not 0, that is, the sensor flag is 1, then the processing advances to step S24 skipping the step S23.

At step S24, the sensor image acquisition module 221 acquires the frame number of the sensor image 151 registered in a file of the display information DB 226 produced at step S26 hereinafter described. It is to be noted that, since no file is produced in the display information DB 226 at step S21 to which the processing advances for the first time, the sensor image acquisition module 221 does not acquire the frame number but produces a file in the display information DB 226. Further, where a new file is not produced at step S26 as yet, the sensor image acquisition module 221 acquires the frame number of the sensor image 151 registered in the file produced at step S21 to which the processing advances for the first time.

At step S25, the sensor image acquisition module 221 decides whether or not the frame number acquired at step S24 exceeds a predetermined threshold value set in advance, for example, by the user. If it is decided that the frame number exceeds the predetermined threshold value, then the processing advances to step S26, at which the sensor image acquisition module 221 produces a new file in the display information DB 226.

However, when it is decided at step S25 that the frame number acquired at step S24 does not exceed the predetermined threshold value, or after the process at step S25, the processing advances to step S27. At step S27, the sensor image acquisition module 221 registers the display information in a coordinated relationship with the sensor image 151 into the latest file of the display information DB 226 produced at step S26. In other words, in the display information DB 226, display information corresponding to the sensor image 151 is recorded as a file for each predetermined number of frames of the sensor image 151. Then, the processing returns to step S5 of FIG. 20 and then advances to step S6.

Since display information corresponding to a sensor image 151 is stored as a file for each frame number of the sensor image 151 in such a manner as described above, the reproduction module 231 can search out a sensor image 151 of an object reproduction rapidly.

Figure 22:
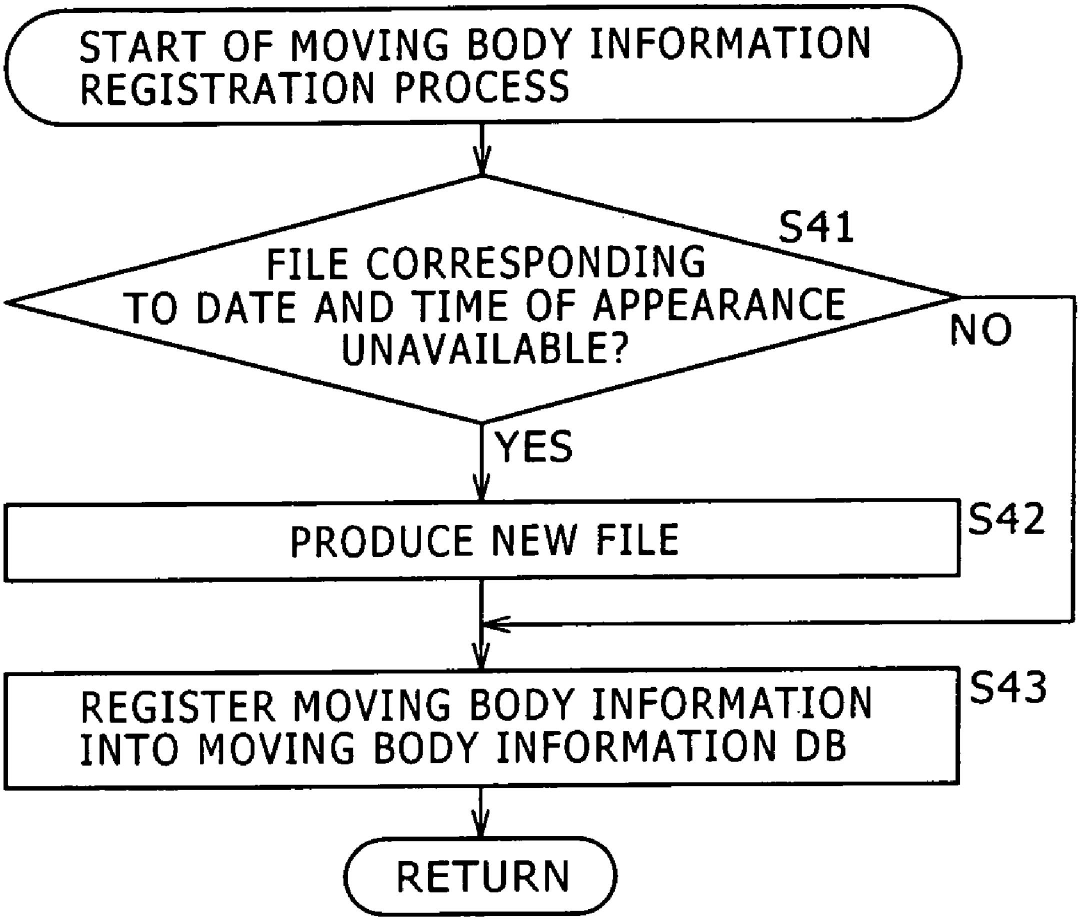
FIG. 22 is a flow chart illustrating a moving body information registration process at step S8 of FIG. 20.

Now, the moving body information registration process at step S8 of FIG. 20 is described with reference to FIG. 22.

At step S41, the sensor image acquisition module 221 decides whether or not the moving body information DB 227 includes a file corresponding to a management time zone of the appearance date and time acquired at step S4 of FIG. 20, that is, whether or not a file corresponding to a management time zone of the appearance date and time is produced at step S42 hereinafter described. If it is decided that the moving body information DB 227 includes a file corresponding to the management time zone of the appearance date and time, then the processing advances to step S42.

At step S42, the sensor image acquisition module 221 produces a file corresponding to the management time zone of the appearance date and time. For example, where the appearance date and time is 10:00 of Jan. 10, 2004, the sensor image acquisition module 221 produces a file corresponding to the management time zone from 10:00 to 11:00 of Jan. 10, 2004 in the moving body information DB 227.

On the other hand, if it is decided at step S41 that a file corresponding to the management time zone of the appearance date and time is included in the moving body information DB 227, then the processing advances to step S43 skipping the step S42.

At step S43, the sensor image acquisition module 221 registers the moving body information into the file corresponding to the management time zone of the appearance date and time of the moving body information DB 227. Thereafter, the processing returns to step S8 of FIG. 20 and advances to step S9.

Figure 23:
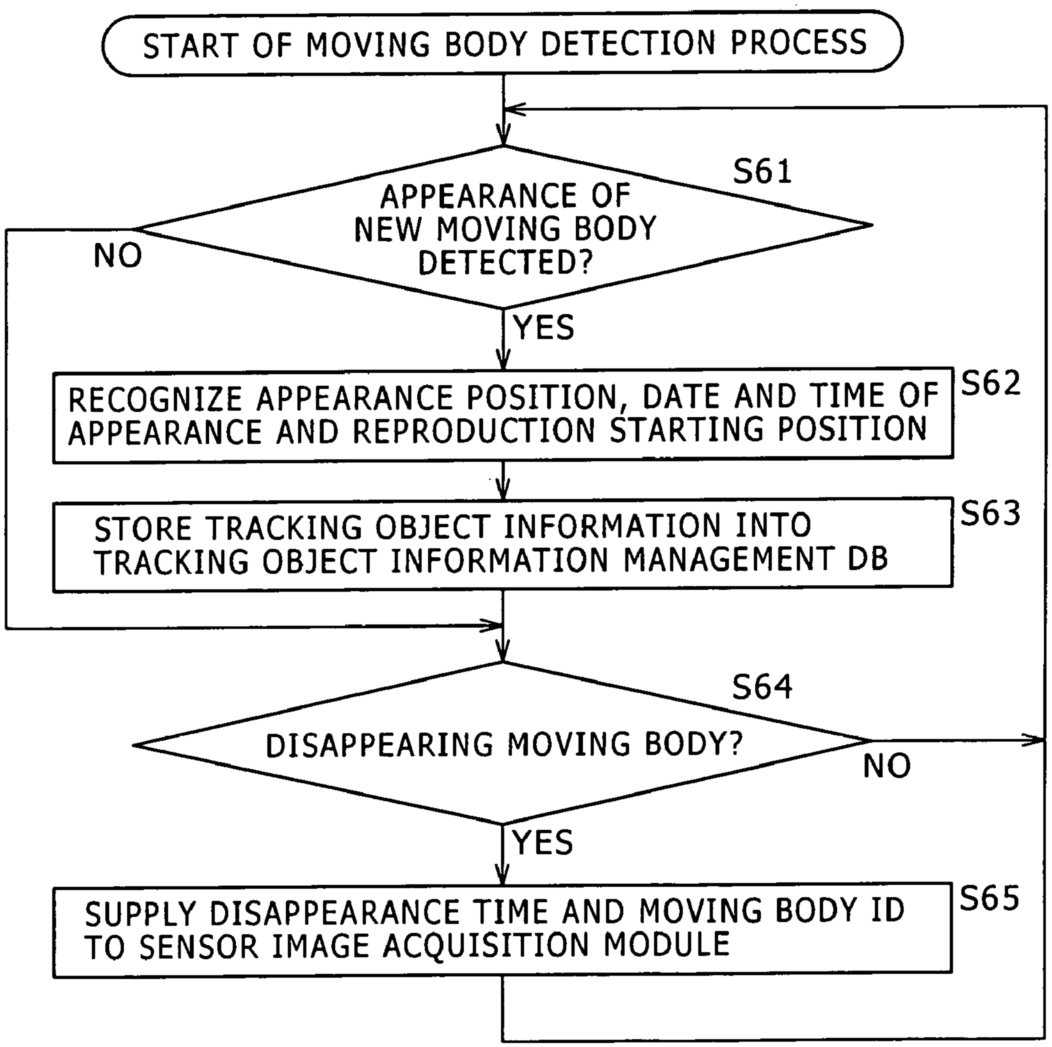
FIG. 23 is a flow chart illustrating a moving body detection process by a moving body detection module shown in FIG. 8.

Now, a moving body detection process by the moving body detection module 222 is described with reference to FIG. 23. The moving body detection process is started when a sensor image 151 is supplied from the sensor image acquisition module 221 to the moving body detection module 222 at step S3 of FIG. 20.

At step S61, the moving body detection module 222 decides whether or not appearance of a new moving body is detected from within the sensor image 151 received from the sensor image acquisition module 221. In particular, the moving body detection module 222 decides difference values in luminance level between the sensor image 151 supplied from the sensor image acquisition module 221 and another sensor image 151 acquired in the preceding cycle. Then, if the difference values in luminance level exceed a threshold value set upon manufacture by the manufacturer, then the moving body detection module 222 decides any aggregate of pixels which form the sensor image 151 and corresponds to the luminance levels as a moving body. Further, the moving body detection module 222 decides, for example, based on the difference values in luminance level and the aggregate of the pixels detected as a moving body, whether or not the moving body detected now is a new moving body which has not been detected till then.

If appearance of a new moving body is detected at step S61, then the moving body detection module 222 applies a moving body ID to the new moving body and advances the processing to step S62. At step S62, the moving body detection module 222 decides a moving body framework 172 from the aggregate of the pixels detected as a moving body at step S61 and recognizes the coordinates of the vertices A to D of the moving body framework 172 as an appearance position. Further, the moving body detection module 222 recognizes, based on the date and time information supplied from the counter module 224, the date and time when the moving body is detected at step S61 as an appearance date and time.

Furthermore, the moving body detection module 222 recognizes the position of the frame of the sensor image 151, in which the appearance of the new moving body is detected, from the top frame as a reproduction starting position when the sensor image 151 corresponding to the moving body is to be reproduced. The moving body detection module 222 supplies the moving body ID, appearance date and time and appearance position of the new moving body whose appearance is detected and the reproduction starting position to the sensor image acquisition module 221. The sensor image acquisition module 221 acquires the moving body ID, appearance date and time and appearance position and the reproduction starting position at step S4 of FIG. 20.

After the process at step S62, the processing advances to step S63, at which the moving body detection module 222 stores tracking object information formed from the moving body ID applied to the detected moving body, the appearance date and time and the appearance position into the tracking object information management DB 225. In other words, the moving body detection module 222 updates the tracking object information management DB 225.

Here, the moving body detection module 222 decides priority ranks for zoom image pickup of the detected moving bodies and stores the tracking object information in the descending order of the priority ranks into the tracking object information management DB 225 from the top.

The following six methods are available for the moving body detection module 222 to determine the priority ranks.

The first method determines a priority rank such that the priority rank of a moving body whose appearance is detected newly is higher than that of any moving body detected already. In this instance, since the zoom image 152 of the moving body whose appearance is detected newly is acquired preferentially, for example, it becomes easier to acquire a zoom image 152 of an invader. Consequently, an invader can be found readily.

The second method determines a priority rank such that the priority rank of a moving body which is positioned at a higher position has a higher priority rank than that of another moving body which is positioned at a lower position. In this instance, since the zoom image 152 of a moving body positioned at a higher position is acquired preferentially, zoom image pickup of the face of a human being which generally is positioned at a high position is likely to be acquired. Consequently, an invader can be specified readily.

The third method determines a priority rank such that the priority rank of a moving body which is positioned at a lower position has a higher priority rank than that of another moving body which is positioned at a higher position. In this instance, since the zoom image 152 of a moving body positioned at a lower position is acquired preferentially, where the sensor camera 121 is installed at a high position such as on a building outdoors, the zoom image 152 of a human being or a vehicle which is positioned at a comparatively near position than a high place such as the sky or buildings can be acquired readily.

The fourth method determines a priority rank such that the priority rank of a moving body which has a comparatively great size has a higher priority rank than that of another moving body which has a comparatively small size. In this instance, since the zoom image 152 of a moving body having a great size is acquired preferentially, the zoom image 152 of a moving body which is located nearby can be acquired more likely than that of another moving body which is located remotely.

The fifth method determines a priority rank such that the priority rank of a moving body which has a comparatively small size has a higher priority rank than that of another moving body which has a comparatively large size. In this instance, since the zoom image 152 of a moving body having a small size is acquired preferentially, the zoom image 152 of a moving body which is located remotely can be acquired more likely than that of another moving body which is located nearby.

The sixth method determines a priority rank such that a vertically elongated moving body has a higher priority rank. In this instance, since the zoom image 152 of a vertically elongated moving body is acquired preferentially, the zoom image 152 of the whole body of a human being which generally is a vertically elongated moving body is acquired more likely.

One of such first to sixth methods for determining a priority rank as described above can be selected, for example, in response to an operation of the inputting section 206 by the user. The angle-of-view calculation module 224 determines the priority ranks of the detected moving bodies in zoom image pickup in accordance with one of the first to sixth methods selected by the user.

After the process at step S63, the processing advances to step S64, at which the moving body detection module 222 decides whether or not any of the moving bodies disappears from the sensor image 151 received from the sensor image acquisition module 221. In particular, the moving body detection module 222 decides, based on difference values in luminance level between the sensor image 151 supplied from the sensor image acquisition module 221 in the present cycle and another sensor image 151 acquired in the preceding cycle, whether or not, from among those moving bodies which are detected at step S61 and whose disappearance is not detected as yet, any moving body disappears from the sensor image 151.

If it is decided at step S64 that no moving body disappears, then the sensor image acquisition module 221 returns the processing to step S61 to repeat the processes described hereinabove.

On the other hand, if it is detected at step S64 that some moving body disappears, then the processing advances to step S65, at which the moving body detection module 222 recognizes, based on the date and time information from the counter module 224, the date and time represented by the date and time information as a disappearance date and time. Then, the moving body detection module 222 supplies the disappearance date and time and the moving body ID of the disappearing moving body to the sensor image acquisition module 221, whereafter the processing returns to step S61.

A zoom image acquisition process by the tracking object information acquisition module 223 is described below with reference to FIG. 24. The zoom image acquisition process is started when the tracking object information management DB 225 is updated at step S63 of FIG. 23.

At step S81, the tracking object information acquisition module 223 acquires, from within the tracking object information stored at step S63, the tracking object information of the moving body which has the highest priority rank, that is, the piece of the tracking object information at the top, from the tracking object information management DB 225. It is to be noted that the tracking object information management DB 225 is updated when tracking object information is acquired from the tracking object information acquisition module 223, and the tracking object information is deleted from the tracking object information management DB 225. In other words, the top tracking object information in the tracking object information management DB 225 always has the highest priority rank.

After the process at step S81, the processing advances to step S82, at which the tracking object information acquisition module 223 determines the position and the magnitude of the angle of view of image pickup based on the appearance position of the moving body of the tracking object information so that an image of the region including the appearance position of the moving body may be picked up by the zoom camera 122. The tracking object information acquisition module 223 determines the image pickup magnification from the variation amount of the position (moving speed of the moving body) and the magnitude of the angle of view of image pickup.

After the process at step S82, the processing advances to step S83, at which the tracking object information acquisition module 223 determines a pan tilt value from the variation amount of the position of the angle of view of image pickup and the position of the angle of view of image pickup. Thereafter, the processing advances to step S84.

At step S84, the tracking object information acquisition module 223 issues a request to the zoom camera 122 to execute a pan tilt movement based on the pan tilt value determined at step S83. The camera section 122B of the zoom camera 122 controls the camera section 122A in accordance with the request to move the camera section 122B itself to effect a pan tilt movement.

After the process at step S84, the processing advances to step S85, at which the tracking object information acquisition module 223 issues a request to the zoom camera 122 to perform zoom image pickup based on the image pickup magnification in accordance with the image pickup magnification determined at step S82. The zoom camera 122 performs zoom image pickup in accordance with the request and supplies a sensor image 151 obtained by the zoom image pickup to the tracking object information acquisition module 223.

After the process at step S85, the processing advances to step S86, at which the tracking object information acquisition module 223 acquires the sensor image 151 supplied from the zoom camera 122. Thereafter, the processing advances to step S87.

At step S87, the tracking object information acquisition module 223 registers the sensor image 151 acquired at step S87 as a predetermined file in a coordinated relationship with the moving body ID of the tracking object information acquired at step S81 into the display information DB 226.

Figure 25:
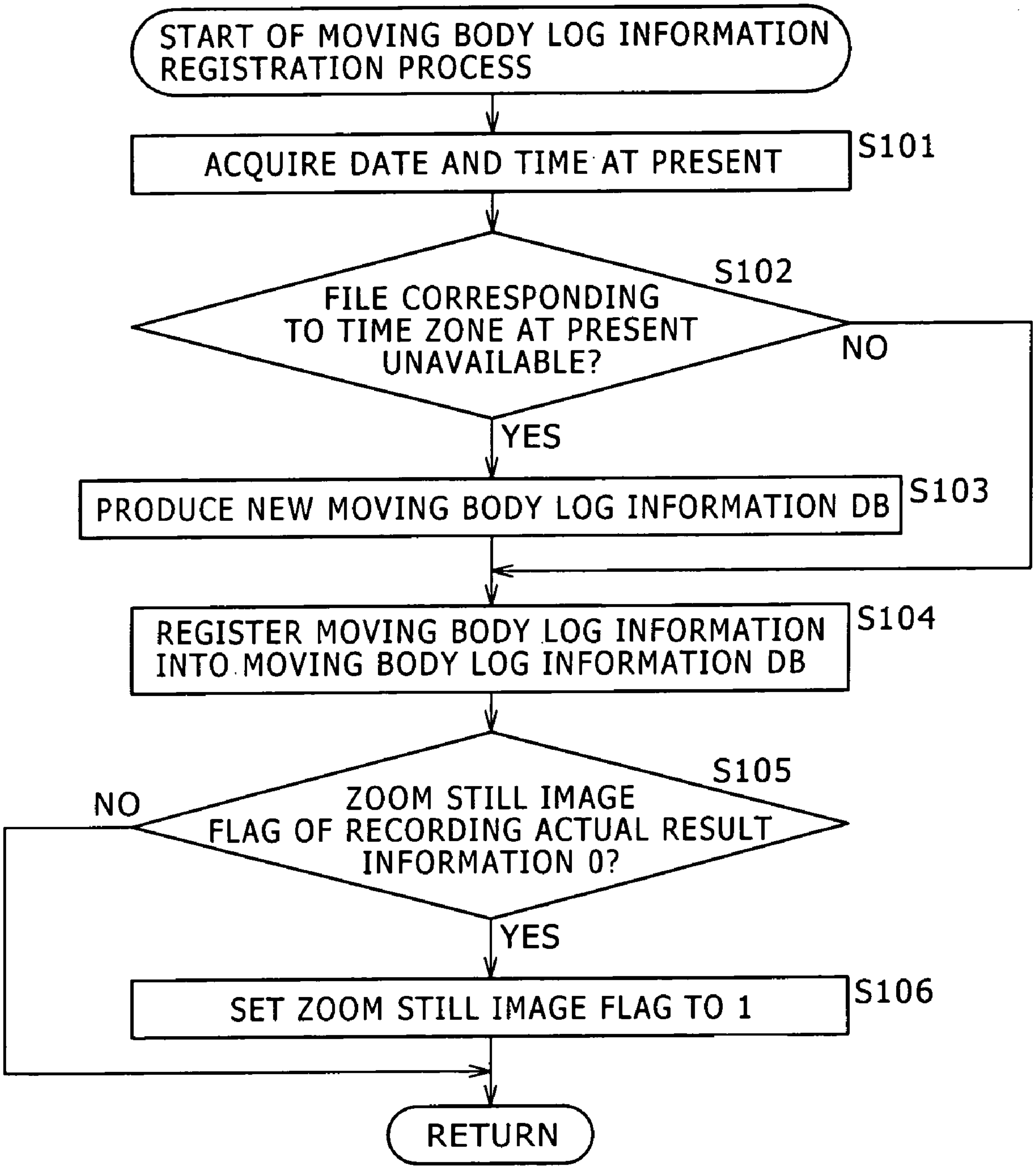
FIG. 25 is a flow chart illustrating a moving body log information registration process at step S88 of FIG. 24.

After the process at step S87, the tracking object information acquisition module 223 performs a moving body log information registration process of FIG. 25 for registering moving body log information including the moving body ID of the tracking object information acquired at step S81 and a zoom still image 272C obtained by capturing the sensor image 151 at a predetermined timing into the moving body log information DB 228. Thereafter, the processing advances to step S81.

Figure 24:
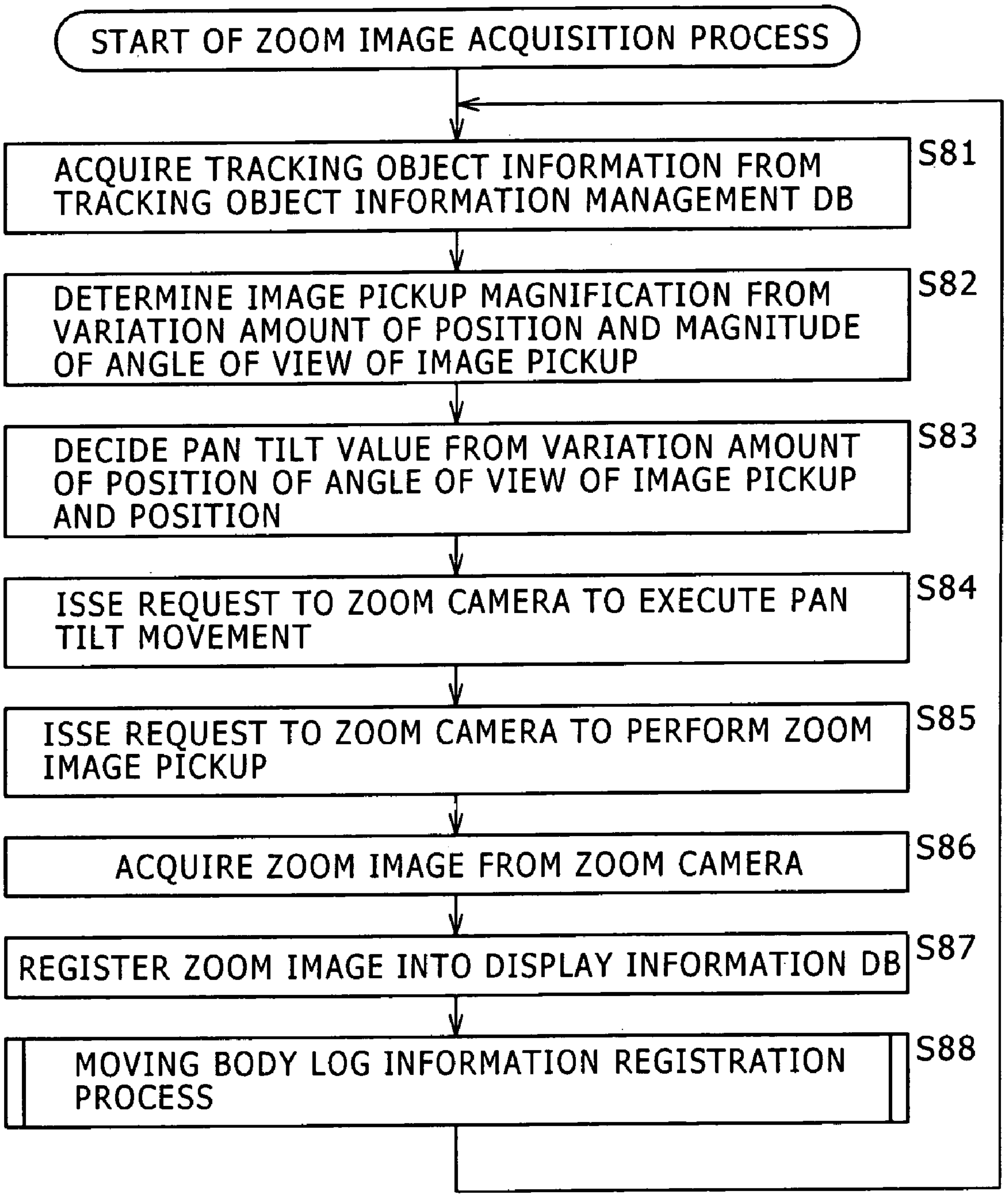
FIG. 24 is a flow chart illustrating a zoom image acquisition process by a tracking object image acquisition module shown in FIG. 8.

Referring to FIG. 25, the moving body log information registration process at step S88 of FIG. 24 is described.

At step S101, the tracking object information acquisition module 223 acquires the date and time information representing the date and time at present from the counter module 224. Thereafter, the processing advances to step S102.

At step S102, the tracking object information acquisition module 223 decides based on the date and time information acquired at step S101 whether or not a file produced at step S103 hereinafter described, which corresponds to the management time zone which includes the date and time at present, is stored in the moving body log information DB 228.

If it is decided at step S103 that the file corresponding to the management time zone including the date and time at present is not stored in the moving body log information DB 228, then the processing advances to step S103. At step S103, the tracking object information acquisition module 223 produces a file corresponding to the management time zone including the date and time at present and stores the file into the moving body log information DB 228. Then, the processing advances to step S104.

On the other hand, if it is decided at step S102 that the file corresponding to the management time zone including the date and time at present is stored in the moving body log information DB 228, then the processing advances to step S104 skipping the step S103.

At step S104, the tracking object information acquisition module 223 registers moving body log information including the moving body ID of the tracking object information acquired at step S81 of FIG. 24 and the zoom still image 272C obtained by capturing the zoom image 152 acquired at step S86 at a predetermined timing into the moving body log information DB 228. Since the zoom still image 272C is registered separately from the moving body information in this manner, the amount of data to be stored in the moving body information DB 227 is small, and predetermined moving body information can be searched out readily from within the moving body information DB 227.

After the process at step S104, the processing advances to step S105, at which the tracking object information acquisition module 223 decides whether or not the zoom flag of the recording actual result information corresponding to the management time zone including the date and time represented by the date and time information of the recording actual result information DB 229 acquired at step S101 is 0 which represents absence of a record of a zoom image 152.

If it is decided at step S105 that the zoom flag of the recording actual result information is 0, then the processing advances to step S106, at which the tracking object information acquisition module 223 changes the zoom flag to 1 which represents presence of a record of a zoom image 152. Thereafter, the processing returns to step S88 of FIG. 24.

On the other hand, if it is decided at step S105 that the zoom flag of the recording actual result information is not "0", that is, the zoom flag is "1", then the processing is ended.

Now, a display process of the screen 270 of FIG. 15 or 16 by the moving body log module 230 is described with reference to FIG. 26. This display process is started when, for example, the user operates the inputting section 206 to select the playback button 252A of FIG. 14 or the live button 301A of FIG. 17 and an instruction to display a moving body log is supplied from the inputting section 106 in response to the operation of the user.

At step S121, the moving body log module 230 performs a recording actual result information screen displaying process hereinafter described for displaying the recording actual result display section 271 of FIG. 15. Thereafter, the processing advances to step S122.

Figure 29:
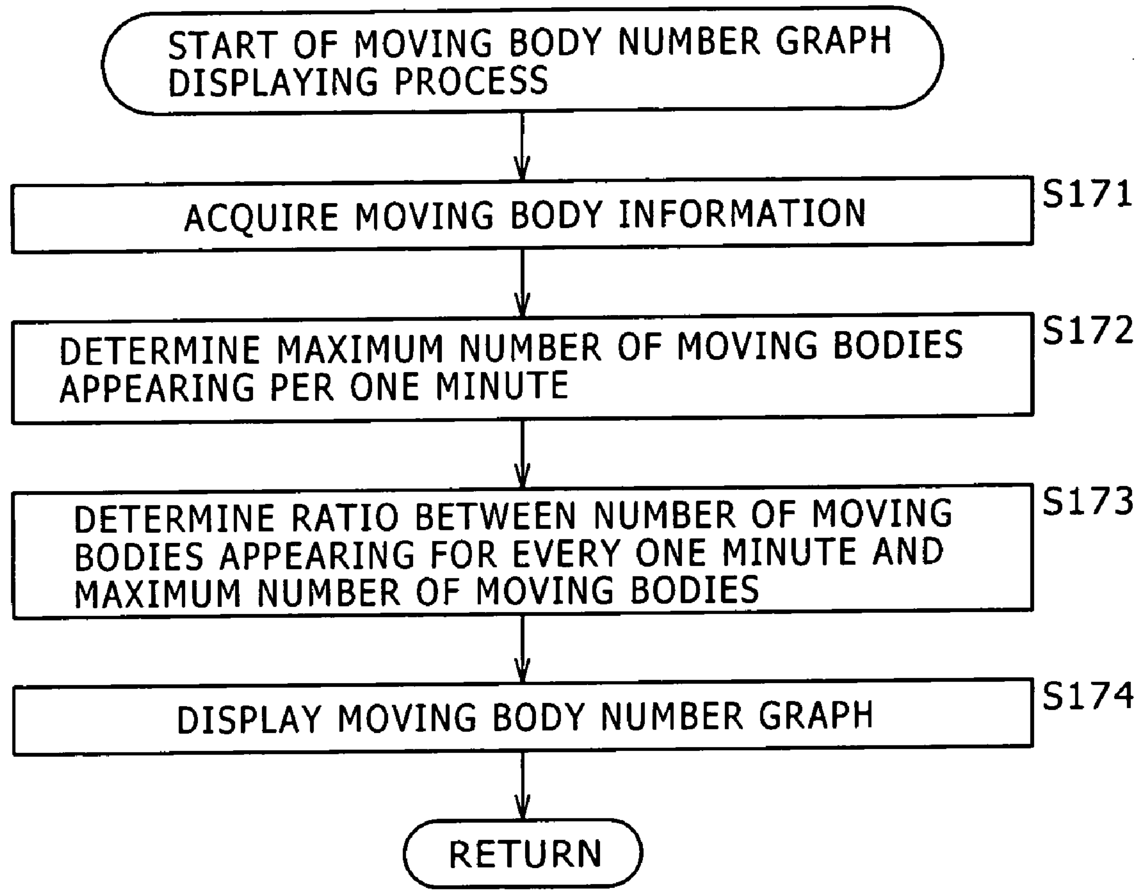
FIG. 29 is a flow chart illustrating a moving body number graph displaying process at step S122 of FIG. 26.

At step S122, the moving body log module 230 performs a moving body number graph display process of FIG. 29 hereinafter described for displaying a moving body number graph 273 on the moving body log display section 272 of FIG. 15. Thereafter, the processing advances to step S123.

At step S123, the moving body log module 230 reads out a file corresponding to the target time zone from the moving body information DB 227 and determines the number of pages represented by the tab 272A based on the number of moving bodies corresponding to the moving body information registered in the file. In particular, the moving body log module 230 divides the number Kmax of thumbnail display sections 272B which can be displayed at a time on the moving body log display section 272 (for example, in the case of the example of FIG. 15, Kmax=7×5=35), that is, the number Kmax of thumbnail display sections 272B which can be displayed on one page of the moving body log display section

272, by the number of moving bodies corresponding to the moving body information registered in the file read out from the moving body information DB 227 to determine a page number. It is to be noted that the fraction part of the value obtained by the division is rounded up.

At step S124, the moving body log module 230 sets the page number N which is the page number of the moving body log display section 272 to be displayed to 1. In other words, the first page of the moving body log display section 272 is displayed on the screen 270. After the process at step S124, the processing advances to step S125, at which the moving body log module 230 sets the display count value K to 0. Thereafter, the processing advances to step S126.

At step S126, the moving body log module 230 performs a moving body log display section displaying process of FIG. 30 hereinafter described for displaying the moving body log display section 272 of the screen 270.

At step S127, the moving body log module 230 decides whether or not an instruction to display a moving body log display section 272 is issued by the user, that is, whether or not indication information representing an indication of the moving body log display section 272 is supplied. The user would indicate a thumbnail display section 272B on which a desired zoom still image 272C is displayed to issue an instruction to reproduce a sensor image 151 and a zoom image 152 which include the moving body.

If it is decided at step S127 that a moving body log display section 272 is indicated by the user, then the processing advances to step S128, at which the moving body log module 230 recognizes the coordinates of the position indicated by the user on the moving body log display section 272.

At step S129, the moving body log module 230 decides, based on the coordinates of the position indicated by the user and recognized at step S128, whether or not the position indicated by the user is within a thumbnail display section 272B, that is, whether or not one of the thumbnail display sections 272B is indicated by the user.

If it is decided at step S129 that the position indicated by the user is not within any thumbnail display section 272B, then the processing returns to step S127.

On the other hand, if it is decided at step S129 that the position indicated by the user is within a thumbnail display section 272B, then the processing advances to step S130, at which the moving body log module 230 outputs the appearance date and time of the zoom still image 272C displayed on the thumbnail display section 272B to the reproduction module 231. Thereafter, the moving body log module 230 ends the processing. In particular, if the user operates the inputting section 206 on the screen 270 of FIG. 15 to indicate a position within a thumbnail display section 272B, then the moving body log module 230 reads out the moving body ID corresponding to the zoom still image 272C displayed in the thumbnail display section 272B from the moving body log information DB 228. Then, the moving body log module 230 reads out and outputs the appearance date and time of the moving body information corresponding to the moving body ID to the reproduction module 231, whereafter it ends the processing.

On the other hand, if it is decided at step S127 that the moving body log display section 272 is not indicated by the user, then the processing advances to step S131, at which the moving body log module 230 decides whether or not a tab 272A is selected by the user. In particular, when the user tries to change the page of the moving body log display section 272 displayed on the screen 270, the user would operate the inputting section 206 to select a tab 272A representing a desired page number Nc. The inputting section 206 supplies an instruction to change the page number N to the page number Nc to the moving body log display section 272 in response to the operation of the user. The moving body log display section 272 decides whether or not an instruction to change the page number N to the page number Nc is received from the inputting section 206.

If a tab 272A is selected by the user at step S131, that is, if an instruction to change the page number N to a page number Nc is received from the inputting section 206, then the processing advances to step S132, at which the moving body log module 230 changes the page number N to the page number Nc desired by the user.

After the process at step S132, the processing advances to step S133, at which the moving body log module 230 sets the display count value K to 0. Thereafter, the processing returns to step S126 to update the display of the moving body log display section 272.

On the other hand, if it is decided at step S131 that a tab 272A is not selected by the user, that is, an instruction to change the page number N to a page number Nc is not received from the inputting section 206, then the processing advances to step S134. At step S134, the moving body log module 230 decides whether or not a target time zone is changed.

In particular, when the user tries to change the target time band, the user would operate the inputting section 206 (for example, an upward or downward arrow mark key of the keyboard) to issue an indication of a position corresponding to a desired target time zone in the recording actual result display section 271 or operate the target time zone selection section 274 to select a desired target time zone. At this time, the inputting section 206 supplies an instruction to change the target time zone to the moving body log module 230 in response to the operation of the user. The moving body log module 230 decides whether or not an instruction to change the target time zone is received from the inputting section 206.

If the target time zone is changed, that is, if an instruction to change the target time zone is received from the inputting section 206 at step S134, then the moving body log module 230 changes the color of the positions of the date of the date display section 271A and the time of the time display section 271C which represent the target time zone of the recording actual result display section 271 to a predetermined color (for example, yellow). Then, the processing returns to step S126, at which the display of the moving body log display section 272 is updated.

On the other hand, if the target time zone is not changed, that is, if an instruction to change the target time zone is not received from the inputting section 206 at step S134, then the processing advances to step S135. At step S135, the moving body log module 230 decides whether or not the target week is changed.

More particularly, if the user intends to change the target week, then the user would operate the inputting section 206 to operate the target week selection section 271B of the recording actual result display section 271 of FIG. 15 to select a desired target week. At this time, the inputting section 206 supplies an instruction to change the target week to the moving body log module 230 in response to the operation of the user. The moving body log module 230 decides whether or not an instruction to change the target week is received from the inputting section 206. It is to be noted that, where the date displayed in the date display section 271A is a date of the week at present, if the user operates the target week selection section 271B to select the next week as a target week, then this operation is invalidated.

If it is decided at step S135 that the target week is changed, that is, an instruction to change the target week is received from the inputting section 206, then the moving body log module 230 returns the processing to step S121 to repeat the processes described above.

On the other hand, if it is decided at step S135 that the target week is not changed, that is, an instruction to change the target week is not received from the inputting section 206, then the processing advances to step S136. At step S136, the moving body log module 230 decides whether or not the OK button 276 is operated.

In particular, if the appearance date and time of a moving body corresponding to the sensor image 151 and the zoom image 152 which are an object of reproduction is determined already, then the user would operate the inputting section 206 to operate the reproduction time selection section 275 to select an appearance date and time. Thereafter, the user would operate the inputting section 206 to operate the OK button 276. At this time, the inputting section 206 supplies information representative of the operation of the OK button 276 to the moving body log module 230 in response to the operation of the user. Then, the moving body log module 230 decides whether or not information representative of an operation of the OK button 276 is received from the inputting section 206.

If it is decided at step S136 that the OK button 276 is not operated, that is, information representing an operation of the OK button 276 is not received from the inputting section 206, then the processing returns to step S127. Consequently, the moving body log module 230 repeats the processes described above.

On the other hand, if it is decided at step S136 that the OK button 276 is operated, that is, information representing an operation of the OK button 276 is received from the inputting section 206, then the processing returns advances to step S137. At step S137, the moving body log module 230 reads out the moving body information including the time of the appearance date and time (in the example of FIG. 15, 17:30) and the date (in the example of FIG. 15, Jan. 13, 2006) corresponding to the recording actual result display section 271E of the recording actual result display section 271 as a date and time of appearance from the moving body information DB 227. Then, the moving body log module 230 outputs the read out moving body information to the reproduction module 231.

After the process at step S137, the processing advances to step S138, at which the moving body log module 230 decides whether or not the close button 277 is operated by the user, that is, whether or not information representative of an operation of the close button 277 is received from the inputting section 206 in response to an operation of the user.

If it is decided at step S138 that the close button 277 is not operated by the user, then the processing returns to step S127 to repeat the processes described hereinabove. On the other hand, if it is decided at step S138 that the close button 277 is operated, then the moving body log module 230 stops the display of the screen 270 and ends the processing.

Figure 26:
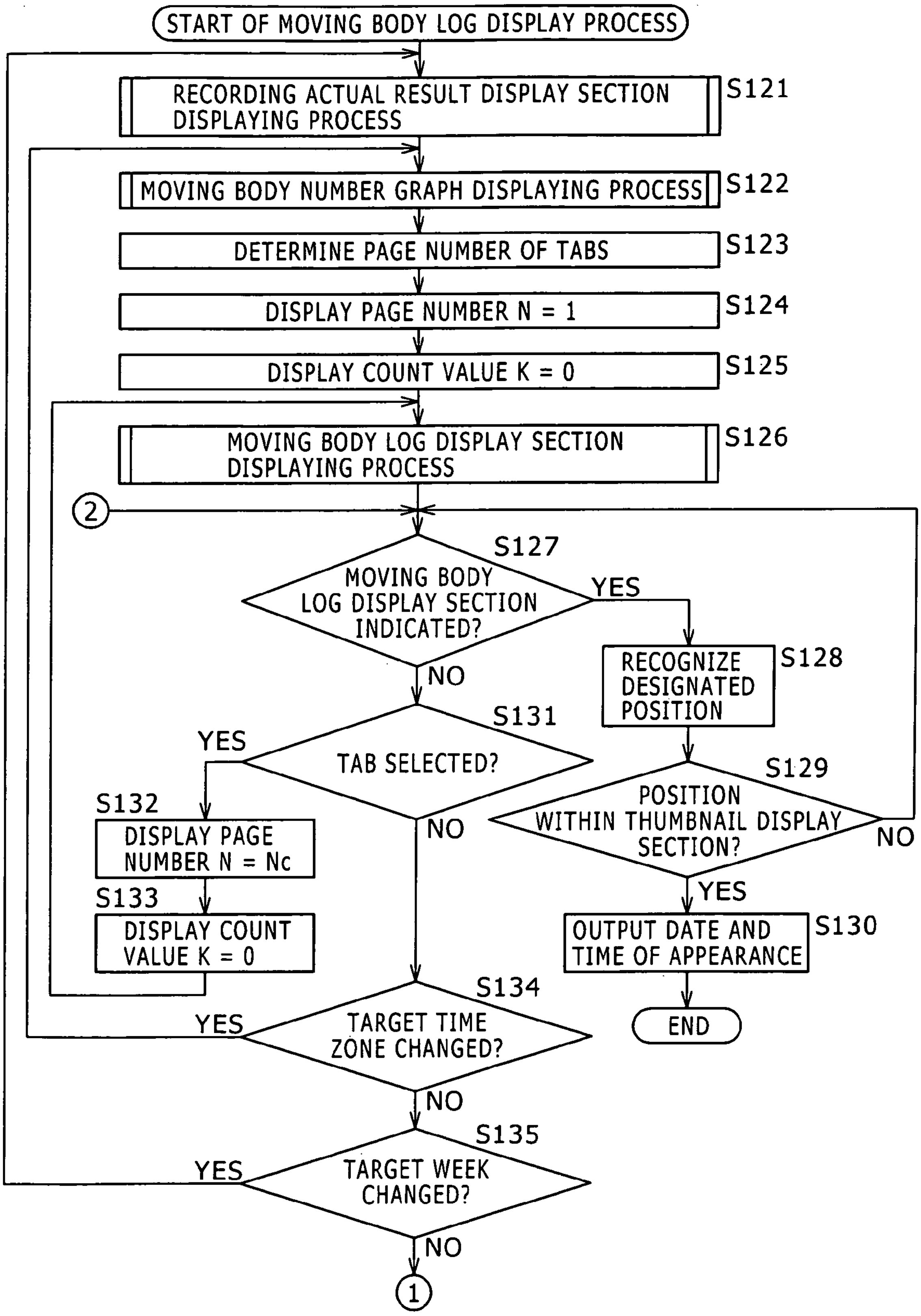
FIGS. 26 and 27 are flow charts illustrating a display process of a screen by a moving body log module shown in FIG. 8.
Figure 28:
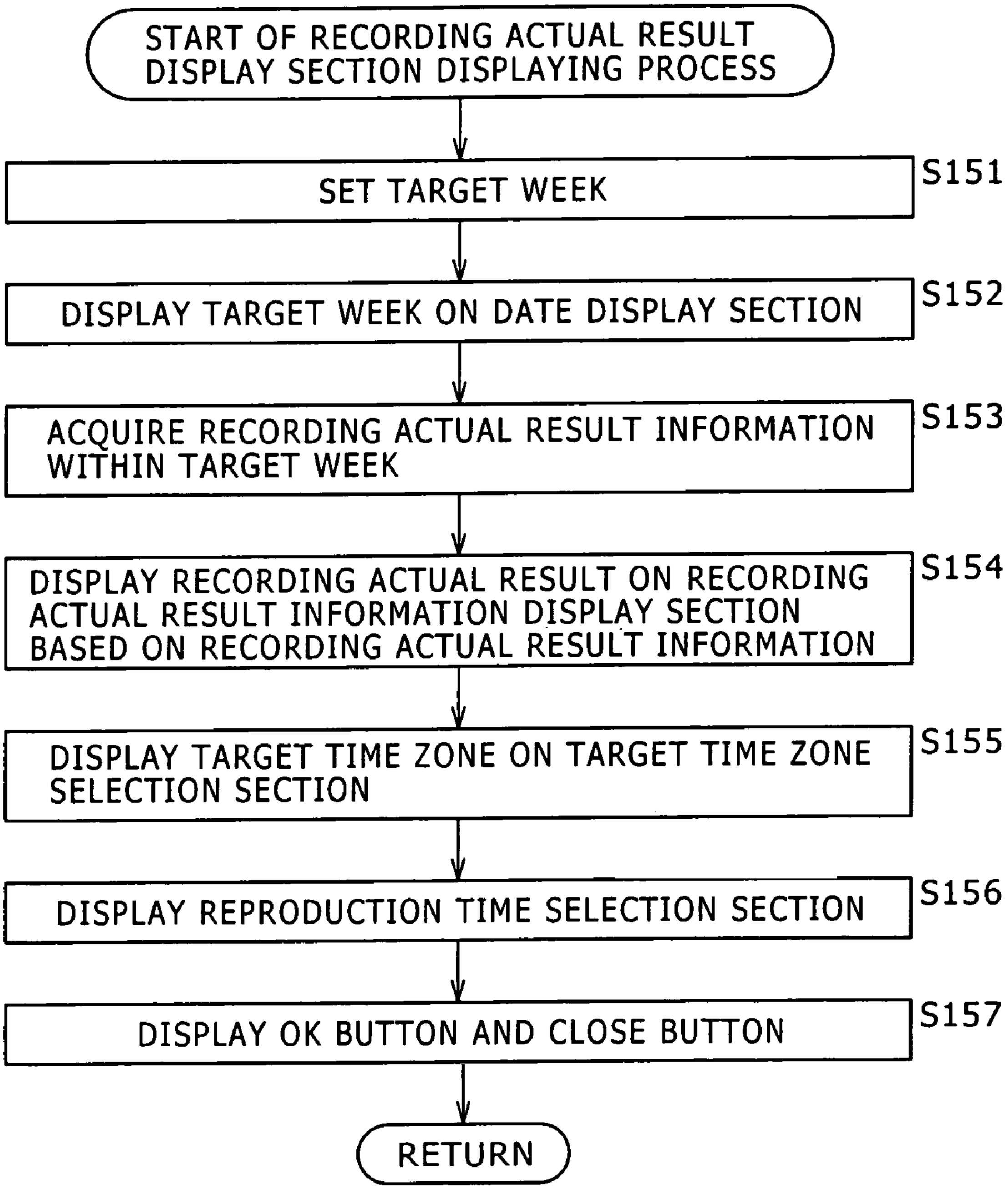
FIG. 28 is a flow chart illustrating a recording actual result information screen displaying process at step S121 of FIG. 26.

Now, a recording actual result information screen displaying process at step S121 of FIG. 26 is described with reference to FIG. 28.

At step S151, the moving body log module 230 sets the target week to the target week changed at step S135 of FIG. 26. It is to be noted that, at step S151 to which the processing comes for the first time, the moving body log module 230 recognizes, for example, based on the date and time information supplied from the counter module 224, the date and time when the playback button 252A of FIG. 14 or the live button 301A of FIG. 17 is operated by the user and sets a predetermined period of time including the date and time to the target time band. Further, the moving body log module 230 sets one week including the date as a target week.

It is to be noted that the target week may be set in a different manner. For example, if the live button 301A is operated by the user, then the moving body log module 230 sets a predetermined period of time including the appearance date and time of a moving body corresponding to the sensor image 151 and the zoom image 152 displayed on the sensor image display section 251 and the zoom image display section 253 (FIG. 17) at the point of time as a target time zone, and one week including the appearance date and time including the date as the target week.

After the process at step S151, the processing advances to step S152, at which the moving body log module 230 causes the target week set at step S151 to be displayed in the date display section 271A. Thereafter, the processing advances to step S153. At step S153, the moving body log module 230 acquires recording actual result information of the target week. Thereafter, the processing advances to step S154.

At step S154, the moving body log module 230 causes a recording actual result representing presence/absence of a record (picture record) of a sensor image 151 and a zoom image 152 based on the recording actual result information acquired at step S153. In particular, the moving body log module 230 indicates, based on the sensor flag and the zoom flag of the recording actual result information, that "there exists no record of a sensor image 151 and a zoom image 152" in transparency, that "there exists a record only of a sensor image 151" in pale-blue and that "there exists a record of both of a sensor image 151 and a zoom image 152" in blue at the position of the date of the date display section 271A and the time of the time display section 271C which represent the date and time corresponding to the recording actual result information.

After the process at step S154, the processing advances to step S155, at which the moving body log module 230 causes the target time zone selection section 274 to display the target time zone and changes the color at the position of the date of the date display section 271A and the time of the time display section 271C which represent the target time zone of the recording actual result display section 271 to a predetermined color (for example, to yellow).

After the process at step S155, the processing advances to step S156, at which the moving body log module 230 causes the reproduction time selection section 275 to be displayed. For example, the first point of time within the target time zone is displayed in the reproduction time selection section 275.

After the process at step S156, the processing advances to step S157, at which the moving body log module 230 causes the OK button 276 and the close button 277 to be displayed. Thereafter, the processing returns to step S121 of FIG. 26 and then advances to step S122.

Now, the moving body number graph displaying process at step S122 of FIG. 26 is described with reference to FIG. 29.

At step S171, the moving body log module 230 acquires the moving body information within the management time zone including the garget time zone from the moving body information DB 227. Thereafter, the processing advances to step S172.

At step S172, the moving body log module 230 determines a maximum number of moving bodies which appear per one minute based on the moving body information acquired at step S171. For example, where the moving body information of FIG. 10 is acquired, since a moving body appears at 10:00 and at 10:05, the number of moving bodies which appear per one minute is 1.

After the process at step S172, the processing advances to step S173, at which the moving body log module 230 determines, for each one minute, the ratio between the number of moving bodies which appear for each one minute and the maximum number of moving bodies determined at step S172. Thereafter, the processing advances to step S174.

At step S174, the moving body log module 230 causes, based on the management time zone and on the maximum number of moving bodies determined at step S172 and further on the ratio determined at step S173, the moving body number graph 273 to display a moving body number graph whose axis of abscissa represents the management time zone and whose axis of ordinate represents the number of moving bodies. For example, where the maximum number of moving bodies determined at step S172 is 26, the moving body log module 230 sets the maximum value of the axis of ordinate of the moving body number graph to 26 as seen in FIG. 15 and causes a bar of a height corresponding to the ratio determined at step S173 to be displayed for each one minute of the management time zone generally as a moving body number graph. It is to be noted that the bars corresponding to all of the appearance points of time displayed in the thumbnail display section 272B may be displayed in colors different from one another. This allows the user to recognize easily at which position of the moving body graph the zoom still image 272C displayed in the thumbnail display section 272B is positioned. After the process at step S174, the processing returns to step S122 of FIG. 26 and then advances to step S123.

Now, the moving body log display section displaying process at step S126 of FIG. 26 is described with reference to FIG. 30.

At step S191, the moving body log module 230 acquires the moving body information within the target time zone from the moving body information DB 227 and decides whether or not the moving body information includes Mth (M=Kmax×(N−1)+k+1) moving body information from the top thereof.

If it is decided at step S191 that the moving body information includes the Mth moving body information from the top, then the processing advances to step S192. At step S192, the moving body log module 230 reads out the moving body log information corresponding to the moving body ID included in the moving body information from the moving body log information DB 228 and selects the zoom still image 272C of the moving body log information as a display object of the thumbnail display section 272B.

After the process at step S192, the processing advances to step S193, at which the moving body log module 230 determines, based on the display count value K, a thumbnail display section 272B in which the display object selected at step S192 should be displayed. For example, for the thumbnail display section 272B, the display count value K corresponding to the zoom stationary image 272C to be displayed in the thumbnail display section 272B is set in advance by the user. For example, the user might set the display count value K so as to increase in order toward the rightward downward direction from the thumbnail display section 272B at a left upper location of the moving body log display section 272. In this instance, where seven thumbnail display sections 272B are arranged in the horizontal direction of the moving body log display section 272 as seen in FIG. 15, if the display count value K is set to 2, then the second thumbnail display section 272B in the second column from the left in the first row of the thumbnail display sections 272B is determined to be the thumbnail display section 272B in which the display object is to be displayed.

After the process at step S193, the processing advances to step S194, at which the moving body log module 230 causes the zoom still image 272C of the display object to be displayed in the thumbnail display section 272B determined at step S193. It is to be noted that, where the moving body log information DB 228 does not include corresponding moving body log information, nothing is displayed in the thumbnail display section 272B determined at step S193.

After the process at step S194, the processing advances to step S195, at which the moving body log module 230 determines the display color of the appearance date and time based on the camera ID of the Mth moving body information from the top of the moving body information acquired at step S191. For example, the moving body log module 230 determines a different display color for each camera ID.

After the process at step S195, the processing advances to step S196, at which the moving body log module 230 decides the time of the appearance date and time of the Mth moving body information from the top of the moving body information acquired at step S191 as an appearance date and time and causes the appearance date and time to be displayed in the display color determined at step S195 in the thumbnail display section 272B.

After the process at step S196, the processing advances to step S197, at which the moving body log module 230 decides whether or not the display count value K is smaller than the number Kmax of thumbnail display sections 272B which can be displayed at a time in the moving body log display section 272. If it is decided that the display count value K is smaller than the number Kmax, then the processing advances to step S198.

At step S198, the moving body log module 230 increments the display count value K by one. Thereafter, the processing returns to step S191 to repeat the processes described above.

If it is decided at step S191 that the moving body information does not include the Mth moving body information from the top thereof, or if it is decided at step S197 that the display count value K is not smaller than the number Kmax of thumbnail display sections 272B which can be displayed at a time in the moving body log display section 272, then the processing returns to step S126 and then advances to step S127.

Figure 27:
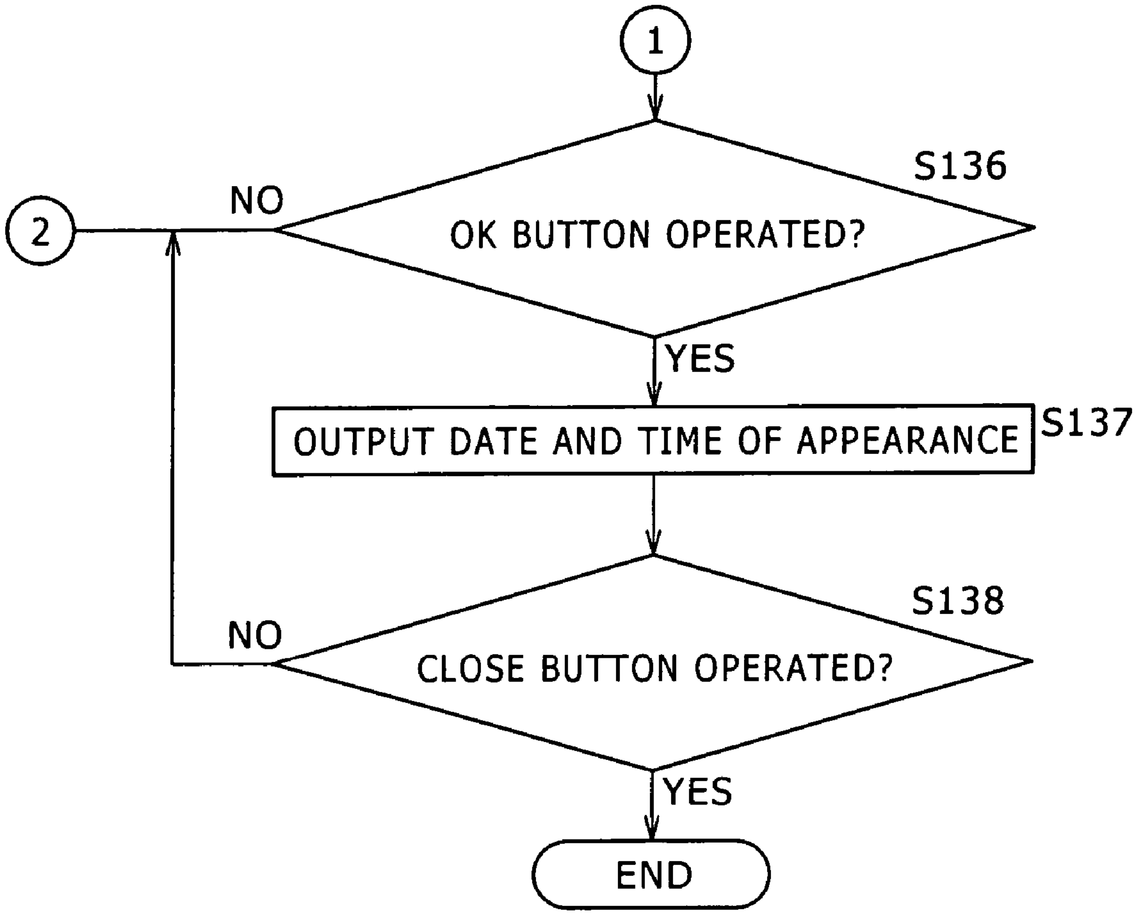

Now, the reproduction process of a sensor image 151 and a zoom image 152 by the reproduction module 231 shown in FIG. 8 is described with reference to FIG. 31. This process is started, for example, when an appearance date and time of a moving body corresponding to a sensor image 151 and a zoom image 152 which make an object of reproduction is supplied from the moving body log module 230 to the reproduction module 231 at step S130 of FIG. 26 or at step S137 of FIG. 27. It is to be noted that, at this time, the reproduction module 231 causes the outputting section 207 to display the screen 300 of FIG. 17.

At step S211, the reproduction module 231 reads out, from the moving body information DB 227, a file corresponding to the management time band including the appearance date and time supplied from the moving body log module 230, and acquires the reproduction starting position and the moving body ID from the moving body information registered in the file and including the appearance date and time.

After the process at step S211, the processing advances to step S212, at which the reproduction module 231 successively reproduces, based on the reproduction starting position and the moving body ID acquired at step S211, the sensor images 151 at and following the reproduction starting position and the zoom images 152 coordinated with the moving body ID and causes the sensor images 151 and the zoom images 152 to be displayed in the sensor image display section 251 (FIG. 17) and the zoom image display section 253, respectively. Thereafter, the processing is ended.

Figure 32:
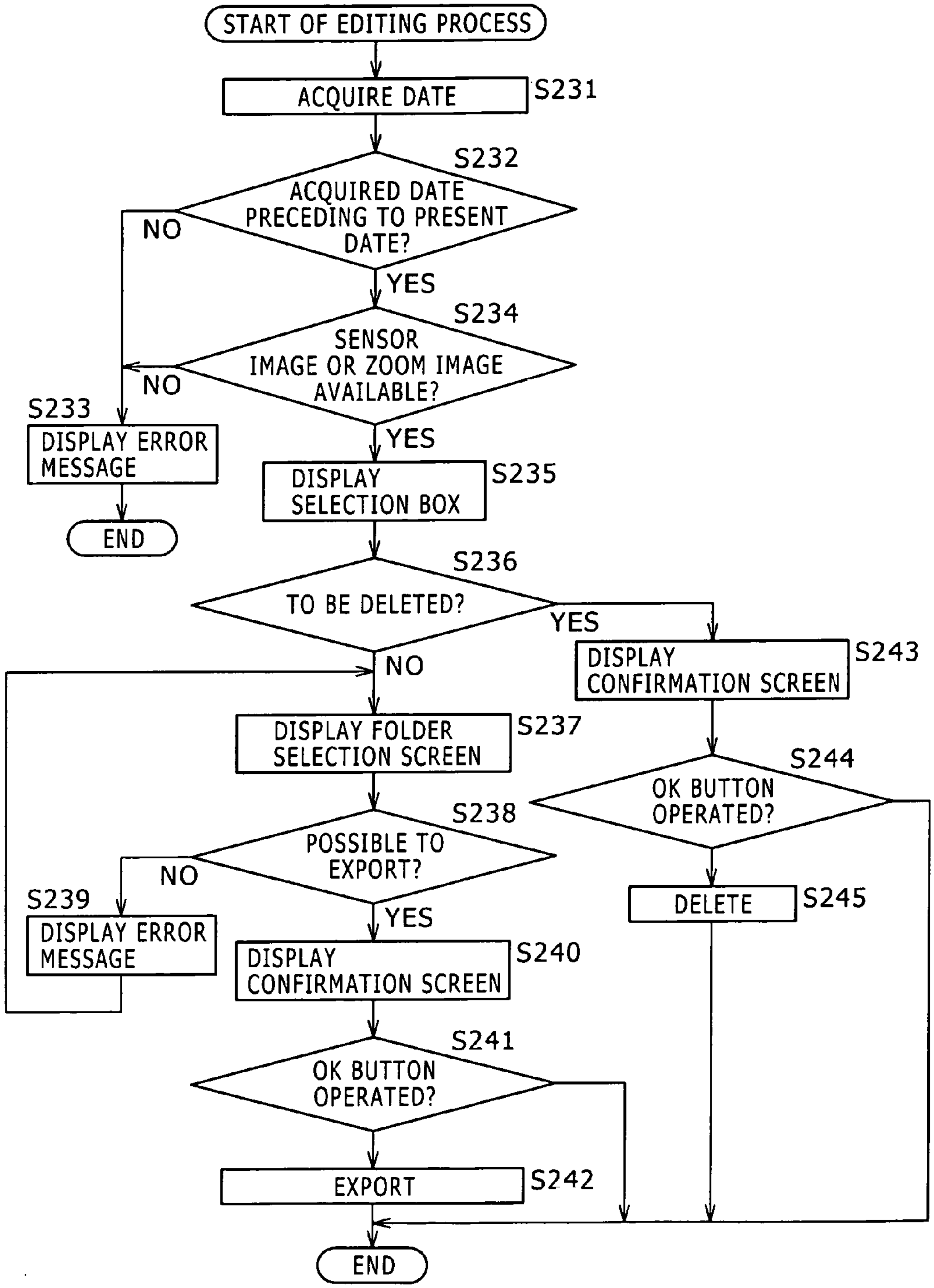
FIG. 32 is a flow chart illustrating an editing process of a sensor image and a zoom image by the client shown in FIG. 6.

Now, an editing process of the sensor images 151 and the zoom images 152 by the client 132 is described with reference to FIG. 32. This editing process is started when the user operates the inputting section 206 to select the date display section 271A of FIG. 18.

At step S231, the moving body log module 230 acquires the date of the date display section 271A selected by the user in response to information representative of the selection of the date display section 271A supplied from the inputting section 206 in response to the operation of the user. Thereafter, the processing advances to step S232.

At step S232, the moving body log module 230 decides, based on the date and time information received from the counter module 224, whether or not the date acquired at step S231 is prior to the date at present. If it is decided that the date acquired at step S231 is not prior to the date at present, then the processing advances to step S233.

At step S233, the moving body log module 230 causes an error message, which represents that deletion or export is impossible, to be displayed. Thereafter, the processing is ended.

On the other hand, if it is decided at step S232 that the date acquired at step S231 is prior to the date at present, then the processing advances to step S234. At step S234, the moving body log module 230 decides whether or not a sensor image 151 or a zoom image 152 of the date acquired at step S231 is available. In particular, the moving body log module 230 reads out all recording actual result information corresponding to the management time zones of the date acquired at step S231 from the recording actual result information DB 229 and decides whether or not at least one of the sensor flags and the zoom flags of the recording actual result information is "1".

If it is decided at step S234 that a sensor image 151 or a zoom image 152 is not available, then the processing advances to step S233, at which the process described above is performed.

On the other hand, if it is decided at step S234 that a sensor image 151 or a zoom image 152 is available, then the processing advances to step S235, at which the moving body log module 230 causes the selection box 321 for selection of deletion or export of FIG. 18 to be displayed. Thereafter, the processing advances to step S236.

At step S236, the moving body log module 230 decides whether or not the sensor image 151 or zoom image 152 should be deleted, that is, whether or not the user operates the inputting section 206 to select deletion of the selection box 321.

If it is decided at step S236 that the sensor image 151 or zoom image 152 should not be deleted, that is, the user operates the inputting section 206 to select the export of the selection box 321, then the processing advances to step S237. At step S237, the moving body log module 230 causes a folder selection screen for selecting a folder of the destination of the export to be displayed. The user would operate the inputting section 206 to select a desired folder as the destination of the export from within the folder selection screen.

After the process at step S237, the processing advances to step S238, at which the moving body log module 230 decides whether or not the sensor image 151 or the zoom image 152 can be exported into the folder selected by the user. If it is decided that the sensor image 151 or the zoom image 152 cannot be exported, then the processing advances to step S239.

At step S239, the moving body log module 230 causes an error message representing that the sensor image 151 or the zoom image 152 cannot be exposed to be displayed. Thereafter, the processing returns to step S237.

On the other hand, if it is decided at step S238 that the sensor image 151 or the zoom image 152 can be exported into the folder selected by the user, then the processing advances to step S240. At step S240, the moving body log module 230 causes the confirmation screen 340 (FIG. 19) for the confirmation of whether or not the sensor image 151 or the zoom image 152 should be exposed to be displayed. Thereafter, the processing advances to step S241.

At step S241, the moving body log module 230 decides whether or not the OK button 341 is operated by the user. If it is decided that the OK button 341 is operated, then the processing advances to step S242, at which the moving body log module 230 supplies the date acquired at step S231 and the export destination selected at step S237 to the reproduction module 231. The reproduction module 231 reads out a file corresponding to the management time zone of the date from the moving body information DB 227 based on the date from the moving body log module 230, and recognizes the reproduction starting position and the moving body ID registered in the read out file. The reproduction module 231 reproduces, based on the recognized reproduction starting position and moving body ID, the sensor image 151 corresponding to the reproduction starting position and the zoom image 152 corresponding to the moving body ID from the display information DB 226. Then, the reproduction module 231 exports the reproduced sensor image 151 and zoom image 152 to the export destination, whereafter the processing is ended.

On the other hand, if it is decided at step S241 that the OK button 341 is not operated, that is, the cancel button 342 is operated, then the processing is ended skipping the step S242.

If it is decided at step S236 that the sensor image 151 or the zoom image 152 should be deleted, that is, the user operates the inputting section 206 to select deletion of the selection box 321, then the processing advances to step S244. At step S244, the moving body log module 230 causes the confirmation screen 340 (FIG. 19) for the confirmation of whether or not deletion should be performed to be displayed, similarly as at step S241. Thereafter, the processing advances to step S244.

At step S244, the moving body log module 230 decides whether or not the OK button 341 is operated by the user similarly as at step S241. If it is decided that the OK button 341 is operated, then the processing advances to step S245, at which the moving body log module 230 supplies the date acquired at step S231 to the reproduction module 231. The reproduction module 231 reads out, based on the date from the moving body log module 230, the file corresponding to the management time zone of the date from the moving body information DB 227 and recognizes the reproduction starting position and the moving body ID registered in the read out file. Then, the reproduction module 231 deletes, based on the recognized reproduction starting position and moving body ID, the sensor image 151 corresponding to the reproduction starting position and the zoom image 152 corresponding to the moving body ID from the display information DB 226. Thereafter, the processing is ended.

On the other hand, if it is decided at step S244 that the OK button 341 is not operated, that is, the cancel button 342 is operated, then the processing is ended skipping the step S245.

It is to be noted that, while the editing process described above involves deletion and export, the editing process is not limited to them but may involve, for example, compression of the sensor image 151 or the zoom image 152. Further, while the editing process is executed for each date selected by the user, the user may select time so that an editing process may be performed for every date and time.

It is to be noted that, while, in the embodiment described above, the monitoring system 10 records sensor an image 151 and a zoom image 152, it may be modified such that a sensor image 151 is not recorded but only a zoom image 152 is recorded. Further, the user may operate the inputting section 206 to select one of an all recording mode in which a sensor image 151 and a zoom image 152 are recorded and a zoom image recording mode in which only a zoom image 152 is recorded.

Figure 33:
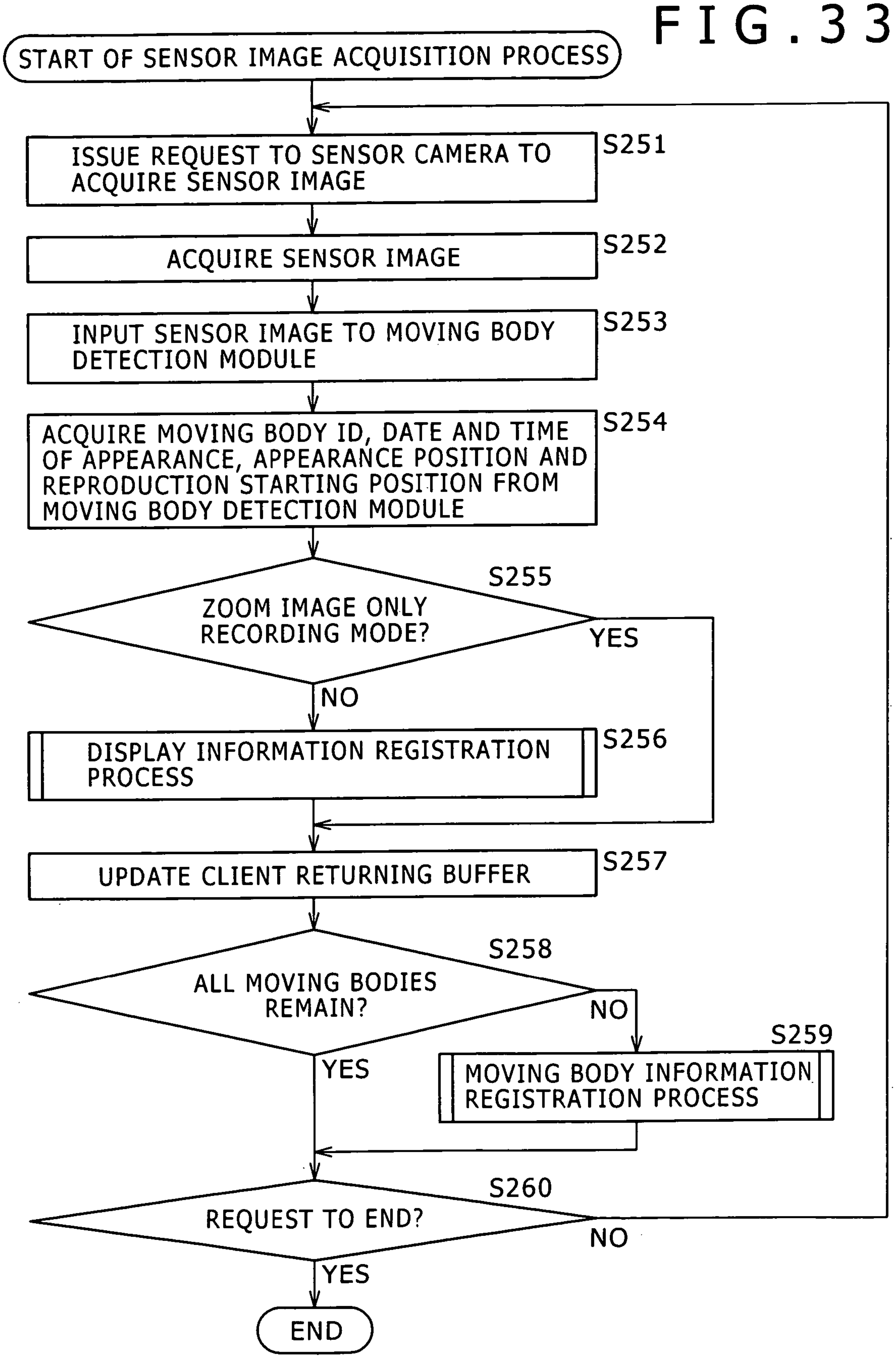
FIG. 33 is a flow chart illustrating a sensor image acquisition process by the sensor image acquisition module shown in FIG. 8.

A sensor image acquisition process by the sensor image acquisition module 221 in this instance is described with reference to FIG. 33.

Processes at steps S251 to S254 are similar to those at steps S1 to S4 of FIG. 20 described hereinabove, respectively, and therefore, the processes are not described here to avoid redundancy.

After the process at step S254, the processing advances to step S255, at which the sensor image acquisition module 221 decides whether or not the recording mode is a zoom image only recording mode. In particular, the inputting section 206 supplies information indicative of selection of the all recording mode or the zoom image only recording mode to the sensor image acquisition module 221 in response to an operation thereof by the user. The sensor image acquisition module 221 receives the information and sets the recording mode to the all recording mode or the zoom image only recording mode in response to the received information. At step S255, the reproduction module 231 decides whether or not the recording mode currently set is the zoom image only recording mode.

If it is decided at step S255 that the recording mode is not the zoom image only recording mode, that is, the recording mode is the all recording mode, then the processing advances to step S256.

On the other hand, if it is decided at step S255 that the recording mode is the zoom image only recording mode, then the processing advances to step S257 skipping the step S256. In particular, the sensor image acquisition module 221 does not record the sensor image 151 into the display information DB 226, and the sensor flag of the recording actual result information of the recording actual result information DB 229 remains 0 representing that there is no record of a sensor image 151.

At steps S256 to S260, processes similar to those at steps S5 to S9 of FIG. 20 are performed, respectively. Therefore, description of the processes is omitted herein to avoid redundancy.

Now, the stored amount of data recorded in the display information DB 226 where the recording mode is the zoom image only recording mode is described with reference to FIG. 34.

Figure 34:
FIG. 34 is a diagrammatic view illustrating a storage capacity of data stored in the display information database shown in FIG. 8.

As seen in FIG. 34, only a zoom image 152 acquired by the zoom camera 122 is recorded into the display information DB 226 only when appearance of a moving body is detected. Accordingly, when compared with the case illustrated in FIG. 13 wherein both of a sensor image 151 and a zoom image 152 are recorded, the amount of data to be recorded into the display information DB 226 can be further reduced.

It is to be noted that sensor images 151 and zoom images 152 may be recorded otherwise such that only those sensor images 151 and zoom images 152 of moving bodies which have priority ranks for zoom image pickup, for example, higher than a threshold value set in advance by the user are recorded. Or, only the zoom images 152 of those moving bodies which have priority ranks higher than a threshold value may be recorded.

It is to be noted that the size of a moving body to be detected by the moving body detection module 222 described hereinabove may be set by the user operating the inputting section 206.

Figure 35:
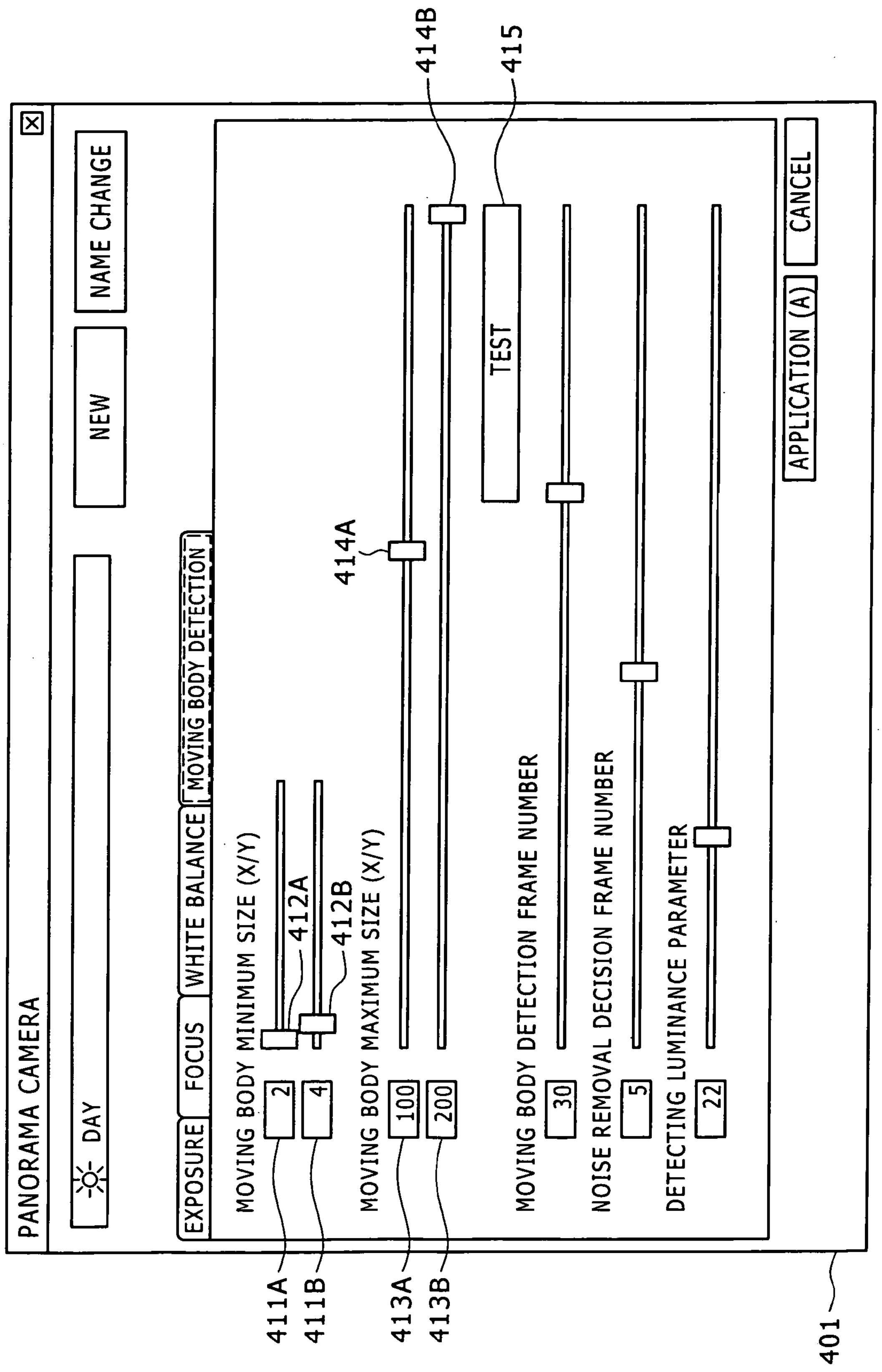
FIG. 35 is a schematic view showing an example of a screen for setting a size of a moving body which may be used in the monitoring system of FIG. 6.

In this instance, when the user operates the inputting section 206, a screen 401 for setting the size of a moving body is displayed on the outputting section 207 as seen in FIG. 35.

Referring to FIG. 35, a text box 411A or a slider 412A is operated in order to set the minimum size (pixel) in the horizontal direction (X direction) of a moving body to be detected by the sensor camera 121. The user would operate the text box 411A to input a numerical value or operate the slider 412A to move the slider 412A in the leftward or rightward direction in FIG. 35 to set a minimum size for a moving body in the horizontal direction.

Another text box 411B or another slider 412B is operated in order to set a minimum vertical direction (Y direction) of a moving body to be detected by the sensor camera 121. Another text box 413A or another slider 414A is operated in order to set a maximum size in the horizontal direction for a moving body to be detected by the sensor camera 121, and a further text box 413B or a further slider 414B is operated in order to set a maximum size in the vertical direction.

A test button 415 is operated in order to visually compare the maximum and minimum sizes for a moving body set in such a manner as described above with the size of a subject of a sensor image 151. When the test button 415 is operated by the user, such a screen 421 as shown in FIG. 36 is displayed on the outputting section 207.

Figure 36:
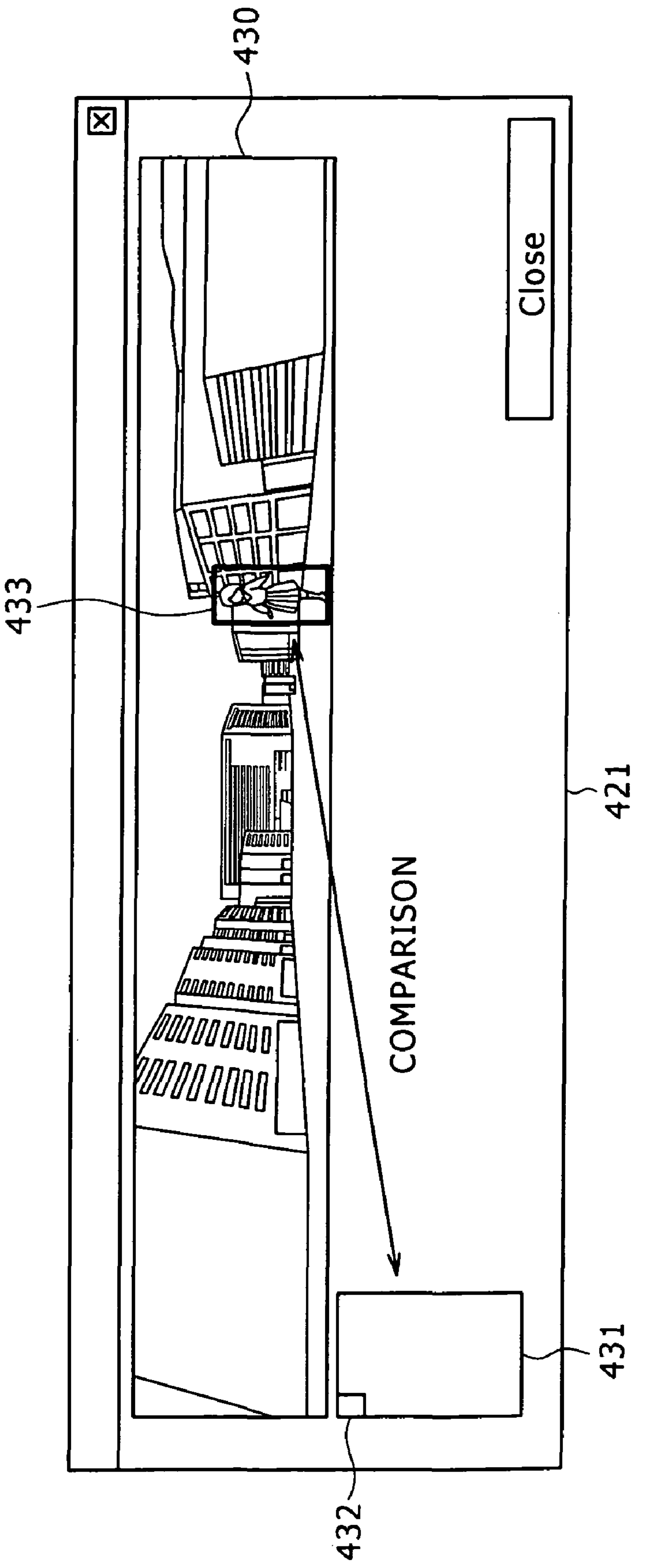
FIG. 36 is a schematic view showing an example of a screen which may be used in the monitoring system of FIG. 6 when a test button is selected.

Referring to FIG. 36, on the screen 421, for example, a sensor image display section 430 for displaying a sensor image 151, a maximum size section 431 for displaying a currently set maximum size for a moving body of an object of detection and a minimum size section 432 for displaying a minimum size for the moving body of the object of detection are displayed.

The user can visually compare, for example, a person 433 of the sensor image 151 displayed in the sensor image display section 430 with the maximum size section 431 and the minimum size section 432 to confirm readily whether the maximum size and the minimum size set by the user itself have reasonable values.

Figure 37:
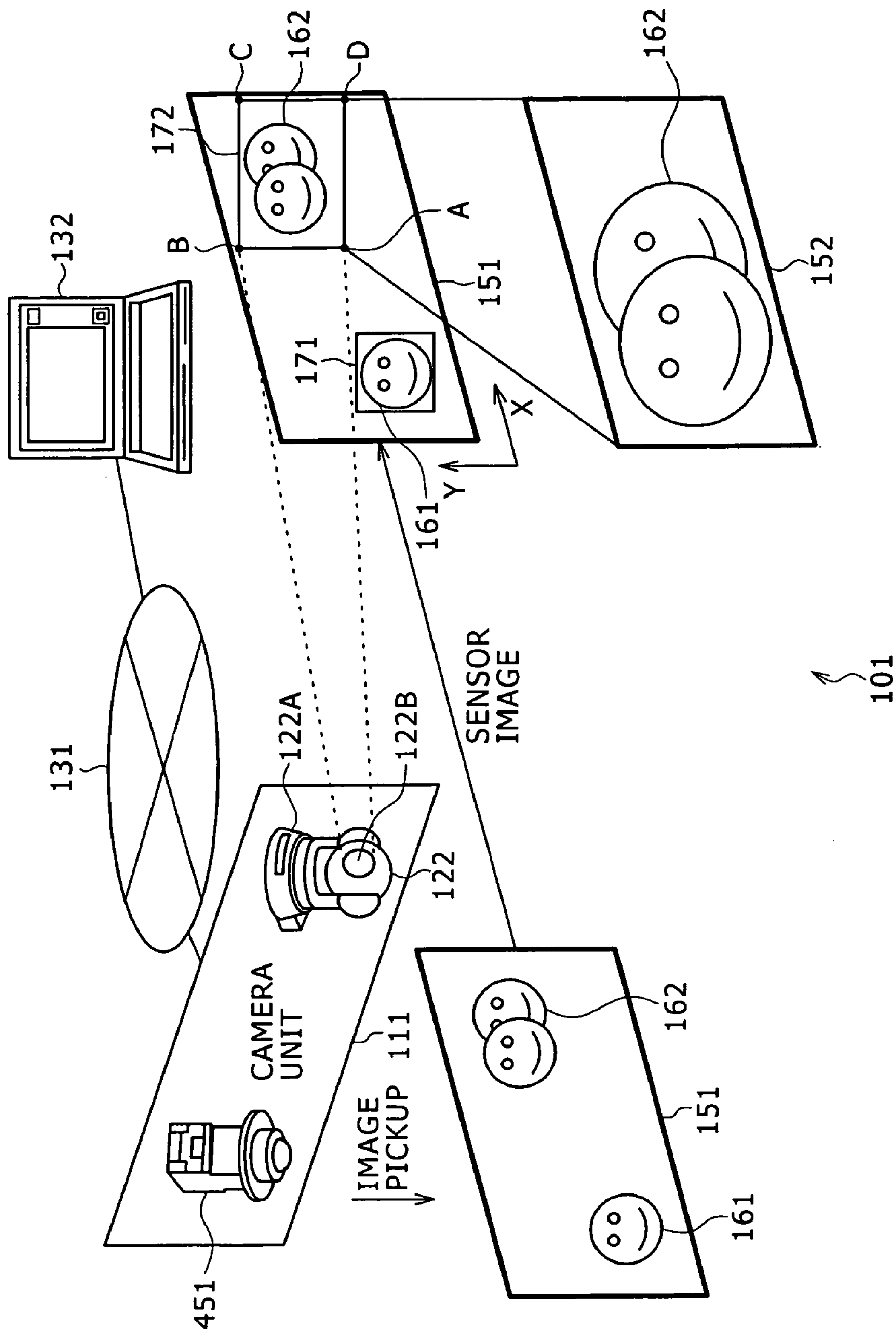
FIGS. 37 and 38 are schematic views showing different examples of the configuration of the monitoring system shown in FIG. 4.

FIG. 37 shows an example of the configuration of another form of the monitoring system 101 of FIG. 6.

The monitoring system 101 of FIG. 37 includes a stationary camera 451 which can perform omnidirectional image pickup over 360 degrees on the real time basis in place of the sensor camera 121 shown in FIG. 6.

Figure 38:
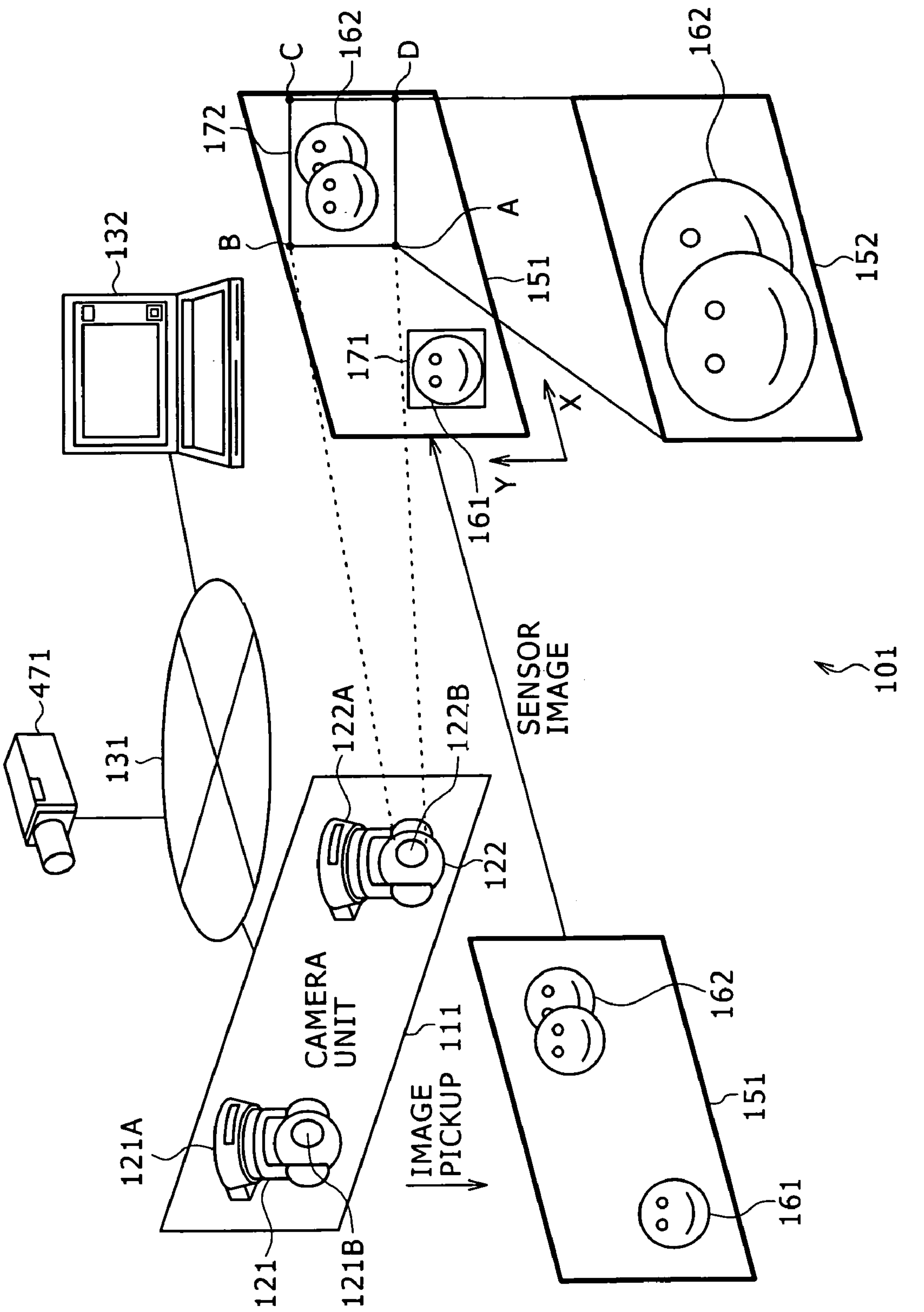

FIG. 38 shows an example of the configuration of a further form of the monitoring system 101 of FIG. 6.

In the monitoring system 101 of FIG. 38, a stationary camera 471 is provided additionally and connected to the network 131. In this instance, the moving body detection module 222 of the client 132 detects also moving bodies in a fixed image, which is moving pictures obtained by image pickup by means of the stationary camera 471, and causes the thumbnail display section 272B (FIG. 15) of the screen 270 to display also a stationary image obtained by capturing the fixed image corresponding to the moving body at a predetermined timing. At this time, the display color (for example, white) of the appearance date and time corresponding to the sensor image 151 acquired by the sensor camera 121 may be made different from the display color (for example, green or yellow) of the appearance date and time displayed in the thumbnail display sections 272B. If the user designates a stationary image displayed in any of the thumbnail display sections 272B, then a fixed image corresponding to the stationary image is reproduced and displayed on the outputting section 207.

In this manner, in the monitoring system 101 of FIG. 38, since moving bodies not only on the sensor image 151 but also on the fixed image are detected, a region to be monitored can be increased. For example, if the stationary camera 471 is installed so as to monitor a fixed region in which many moving bodies appear such as a tollbooth or a gate of a parking area and the camera unit 111 is installed in order to monitor a wide area of the parking area, the entire parking area can be monitored with certainty.

It is to be noted that the blocks of the client 132 of FIG. 8 may be provided not in the client 132 but in the sensor camera 121 or the zoom camera 122.

Further, the application of the monitoring system 101 is not limited to monitoring of the region 21.

Furthermore, the sensor camera 121 and the zoom camera 122 are not limited to pan tilt cameras. Further, while, in the present embodiment, the monitoring system 101 includes two cameras of the sensor camera 121 and the zoom camera 122, the number of cameras is not limited to this, but a single camera may be used to acquire the sensor image 151 and the zoom image 152.

Further, while, in the embodiment described above, the display color of the appearance date and time displayed in any thumbnail display section 272B is determined based on the camera ID of the sensor camera 121, the display color may otherwise be determined based on the camera ID of the zoom camera 122. In this instance, also the camera ID of the zoom camera 122 is registered as moving body log information into the moving body log information DB 228.

In summary, since, in the monitoring system 101, a zoom image 152 coordinated with a moving body ID and a reproduction starting position coordinated with the moving body ID are stored separately in the moving body log information DB 228 and the moving body information DB 227, respectively, where a zoom image 152 corresponding to a sensor image 151 of an object of reproduction is designated, it is possible to read out (search for) a moving body ID corresponding to the zoom image 152 from the moving body log information DB 228 which includes a number of data smaller than that of the moving body information DB 227, read out the reproduction starting position corresponding to the read out moving body ID and reproduce the sensor image 151 stored in the display information DB 226 based on the reproduction starting position. As a result, a sensor image 151 desired by the user can be reproduced readily.

Further, in the monitoring system 101, it is possible to detect, based on a sensor image 151 of a region 21 of a large area obtained as a result of image pickup by means of the sensor camera 121, a moving body in the region 21 and pick up an image of the moving body by means of the zoom camera 122.

It is to be noted here that, in the present specification, the steps which describe the program recorded for causing a computer to execute various processes may be but need not necessarily be processed in a time series in the order as described in the flow charts, and include processes which are executed in parallel or individually (for example, parallel processing or process by an object).

Further, the program may be processed by a single computer or may be processed discretely by a plurality of computers. Furthermore, the program may be transferred to and executed by a computer located remotely.

While a preferred embodiment of the present invention has been described using specific terms, such description is for illustrative purpose only, and it is to be understood that changes and variations may be made without departing from the spirit or scope of the following claims.

What is claimed is:

1. An information processing system, comprising:

a region image pickup section for picking up an image of a predetermined region;

a detection section for detecting moving bodies existing in the predetermined region based on a region image obtained by the image pickup by said region image pickup section;

a moving body image pickup section for picking up an image of the moving bodies detected by said detection section;

a region image storage section for storing the region image obtained by said region image pickup section;

an information storage section for storing, based on a result of the detection by said detection section, moving body information representative of the moving bodies and reproduction information relating to reproduction of the region image from which the moving bodies are detected in a coordinated relationship with each other;

a moving body image storage section for storing moving body images obtained as a result of the image pickup of the moving bodies by said moving body image pickup section in a coordinated relationship with moving body information representative of the moving bodies; and a reproduction section for reading out, when one of the moving body images which corresponds to a region image of an object of reproduction is designated, the moving body information corresponding to the designated moving body image from said moving body image storage section, reading out the reproduction information corresponding to the read out moving body information from said information storage section and reproducing the region image stored in said region image storage section based on the read out reproduction information.

2. An information processing apparatus for controlling image pickup of a subject, comprising:

a region image pickup control section for controlling a region image pickup section, which picks up an image of a predetermined region, to pick up an image of the predetermined region;

a detection section for detecting moving bodies existing in the predetermined region based on a region image obtained by the image pickup by said region image pickup section;

a moving body image pickup control section for controlling a moving body image pickup section, which picks up an image of the moving bodies detected by said detection section, to pick up an image of the moving bodies;

a region image storage section for storing the region image obtained by said region image pickup section;

an information storage section for storing, based on a result of the detection by said detection section, moving body information representative of the moving bodies and reproduction information relating to reproduction of the region image from which the moving bodies are detected in a coordinated relationship with each other;

a moving body image storage section for storing moving body images obtained as a result of the image pickup of the moving bodies by said moving body image pickup section in a coordinated relationship with moving body information representative of the moving bodies; and a reproduction section for reading out, when one of the moving body images which corresponds to a region image of an object of reproduction is designated, the moving body information corresponding to the designated moving body image from said moving body image storage section, reading out the reproduction information corresponding to the readout moving body information from said information storage section and reproducing the region image stored in said region image storage section based on the read out reproduction information.

3. The information processing apparatus according to claim 2, further comprising:

a display control section for controlling a display section, which is provided for displaying a predetermined image, to display the moving body images; and a designation section for designating one of the moving bodies displayed on said display section as a moving body image corresponding to the region image of the object of reproduction;

said reproduction section reproducing, when the moving body image corresponding to the region image of the object of reproduction is designated by said designation section, the region image.

4. An information processing method for an information processing apparatus, which includes a region image storage section and a moving body image storage section for storing images and an information storage section for storing information, for controlling image pickup of a subject, comprising the steps of:

controlling a region image pickup section, which picks up an image of a predetermined region, to pick up an image of the predetermined region;

detecting moving bodies existing in the predetermined region based on a region image obtained by the image pickup by said region image pickup section;

controlling a moving body image pickup section, which picks up an image of the moving bodies detected by the process at the detection step, to pick up an image of the moving bodies;

causing the region image obtained by said region image pickup section to be stored into said region image storage section;

causing, based on a result of the detection by the process at the detection step, moving body information representative of the moving bodies and reproduction information relating to reproduction of the region image from which the moving bodies are detected to be stored in a coordinated relationship with each other into said information storage section;

causing moving body images obtained as a result of the image pickup of the moving bodies by said moving body image pickup section to be stored in a coordinated relationship with moving body information representative of the moving bodies into said moving body image storage section; and reading out, when one of the moving body images which corresponds to a region image of an object of reproduction is designated, the moving body information corresponding to the designated moving body image from said moving body image storage section, reading out the reproduction information corresponding to the read out moving body information from said information storage section and reproducing the region image stored in said region image storage section based on the read out reproduction information.

5. A computer-readable medium storing a computer program for being executed by a computer which controls an information processing apparatus which includes a region image storage section and a moving body image storage section for storing images and an information storage section for storing information, for controlling image pickup of a subject, comprising the steps of:

controlling a region image pickup section, which picks up an image of a predetermined region, to pick up an image of the predetermined region;

detecting moving bodies existing in the predetermined region based on a region image obtained by the image pickup by said region image pickup section;

controlling a moving body image pickup section, which picks up an image of the moving bodies detected by the process at the detection step, to pick up an image of the moving bodies;

causing the region image obtained by said region image pickup section to be stored into said region image storage section;

causing, based on a result of the detection by the process at the detection step, moving body information representative of the moving bodies and reproduction information relating to reproduction of the region image from which the moving bodies are detected to be stored in a coordinated relationship with each other into said information storage section;

causing moving body images obtained as a result of the image pickup of the moving bodies by said moving body image pickup section to be stored in a coordinated relationship with moving body information representative of the moving bodies into said moving body image storage section; and reading out, when one of the moving body images which corresponds to a region image of an object of reproduction is designated, the moving body information corresponding to the designated moving body image from said moving body image storage section, reading out the reproduction information corresponding to the read out moving body information from said information storage section and reproducing the region image stored in said region image storage section based on the read out reproduction information.

6. An information processing system comprising:

a processor programmed to control an information processing apparatus which includes a region image storage section and a moving body image storage section for storing images and an information storage section for storing information, for controlling image pickup of a subject is recorded;

means for controlling a region image pickup section, which picks up an image of a predetermined region, to pick up an image of the predetermined region;

means for detecting moving bodies existing in the predetermined region based on a region image obtained by the image pickup by said region image pickup section;

means for controlling a moving body image pickup section, which picks up an image of the moving bodies detected by the means for detecting, to pick up an image of the moving bodies;

means for causing the region image obtained by said region image pickup section to be stored into said region image storage section;

means for causing, based on a detection result from the means for detecting, moving body information representative of the moving bodies and reproduction information relating to reproduction of the region image from which the moving bodies are detected to be stored in a coordinated relationship with each other into said information storage section;

means for causing moving body images obtained as a result of the image pickup of the moving bodies by said moving body image pickup section to be stored in a coordinated relationship with moving body information representative of the moving bodies into said moving body image storage section; and means for reading out, when one of the moving body images which corresponds to a region image of an object of reproduction is designated, the moving body information corresponding to the designated moving body image from said moving body image storage section, reading out the reproduction information corresponding to the read out moving body information from said information storage section and reproducing the region image stored in said region image storage section based on the read out reproduction information.

* * * * *